(12) United States Patent
Venkatakrishnan et al.

(10) Patent No.: US 11,421,523 B2
(45) Date of Patent: Aug. 23, 2022

(54) REAL-TIME WELL CONSTRUCTION PROCESS INFERENCE THROUGH PROBABILISTIC DATA FUSION

(71) Applicant: Schlumberger Technology Corporation, Sugar Land, TX (US)

(72) Inventors: Sai Venkatakrishnan, Katy, TX (US); Sylvain Chambon, Katy, TX (US); James P. Belaskie, Missour City, TX (US); Yingwei Yu, Katy, TX (US); Mohammad Khairi Hamzah, Katy, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 274 days.

(21) Appl. No.: 16/605,799

(22) PCT Filed: Jun. 27, 2018

(86) PCT No.: PCT/US2018/039672
§ 371 (c)(1),
(2) Date: Oct. 16, 2019

(87) PCT Pub. No.: WO2019/005908
PCT Pub. Date: Jan. 3, 2019

(65) Prior Publication Data
US 2021/0285316 A1    Sep. 16, 2021

Related U.S. Application Data

(60) Provisional application No. 62/525,481, filed on Jun. 27, 2017.

(51) Int. Cl.
*E21B 44/00* (2006.01)
*E21B 44/10* (2006.01)
(Continued)

(52) U.S. Cl.
CPC .............. *E21B 44/10* (2013.01); *E21B 47/12* (2013.01); *G06N 7/005* (2013.01); *E21B 2200/20* (2020.05); *E21B 2200/22* (2020.05)

(58) Field of Classification Search
CPC ...... E21B 44/00; E21B 44/10; E21B 2200/22; G06Q 10/04; G06Q 10/06; G06Q 10/0631; G06N 7/005
See application file for complete search history.

(56) References Cited

U.S. PATENT DOCUMENTS

| 5,316,091 A | 5/1994 | Rasi et al. |
| 5,508,915 A | 4/1996 | Tsao et al. |

(Continued)

FOREIGN PATENT DOCUMENTS

| WO | 2009/039453 A2 | 3/2009 |
| WO | 2016154723 A1 | 10/2016 |

OTHER PUBLICATIONS

Borjas et al., Real-Time Drilling Engineering: Hydraulics and T D Modeling for Predictive Interpretation While Drilling, SPE 150069. Society of Petroleum Engineers. SPE Intelligent Energy International, Mar. 27-29, Utrecht, The Netherlands. Mar. 27-27, 2012. 8 pages.

(Continued)

*Primary Examiner* — Tara Schimpf
(74) *Attorney, Agent, or Firm* — Alec J. McGinn

(57) ABSTRACT

A method includes acquiring data during rig operations where the rig operations include operations that utilize a bit to drill rock and where the data include different types of data; analyzing the data utilizing a probabilistic mixture model for modes, a detection engine for trends and a network model for an inference based at least in part on at least one of a mode and a trend; and outputting information (Continued)

as to the inference where the inference characterizes a relationship between the bit and the rock.

20 Claims, 30 Drawing Sheets

(51) Int. Cl.
*E21B 47/12* (2012.01)
*G06N 7/00* (2006.01)

(56) References Cited

U.S. PATENT DOCUMENTS

| | | | |
|---|---|---|---|
| 6,549,854 | B1 | 4/2003 | Malinverno et al. |
| 7,003,439 | B2 | 2/2006 | Aldred et al. |
| 8,752,648 | B2 | 6/2014 | Goebel et al. |
| 2002/0103630 | A1 | 8/2002 | Aldred et al. |
| 2004/0124012 | A1* | 7/2004 | Dunlop ............... E21B 44/00 175/57 |
| 2009/0194330 | A1 | 8/2009 | Gray |
| 2011/0225111 | A1 | 9/2011 | Ringer |
| 2012/0188091 | A1 | 7/2012 | Calleja et al. |
| 2013/0075160 | A1 | 3/2013 | Yang et al. |
| 2013/0133948 | A1 | 5/2013 | Lovorn |
| 2013/0341093 | A1 | 12/2013 | Jardine et al. |
| 2014/0116776 | A1 | 5/2014 | Marx et a. |
| 2014/0360257 | A1 | 12/2014 | Indo et al. |
| 2015/0090498 | A1 | 4/2015 | Hareland |
| 2015/0134257 | A1 | 5/2015 | Erge et al. |
| 2016/0145991 | A1 | 5/2016 | Yarus et al. |
| 2016/0281490 | A1 | 9/2016 | Samuel |
| 2017/0122092 | A1 | 5/2017 | Harmer |
| 2018/0171774 | A1* | 6/2018 | Ringer ............... E21B 41/0092 |

OTHER PUBLICATIONS

Salminen et al., Stuck-Pipe Prediction Using Automated Real-Time Modeling and Data Analysis. Society of Petroleum Engineers IADC/SPE-178888-MS. IADC/SPE Drilling Conference and Exhibition, Mar. 1-3, 2016, Fort Worth, Texas, USA. 20 pages.

Abimbola, et al., "Safety and risk analysis of managed pressure drilling operation using bayesian network", Elsevier, 2015, pp. 133-144.

Schlumberger Oilfield, Pack Off, 2020 Schlumberger Oilfield, p. 1, (Year 2020).

International Preliminary Report on Patentability for the equivalent International patent application PCT/US2018/039672 dated Jan. 9, 2020.

International Search Report and Written Opinion for the equivalent International patent application PCT/US2018/039672 dated Sep. 13, 2018.

\* cited by examiner

REAL-TIME WELL CONSTRUCTION PROCESS INFERENCE THROUGH PROBABILISTIC DATA FUSION

RELATED APPLICATIONS

This application claims priority to and the benefit of a US Provisional Application having Ser. No. 62/525,481, filed 27 Jun. 2017, which is incorporated by reference herein. This application incorporates by reference herein a US Provisional Application having Ser. No. 62/437,619, filed 21 Dec. 2016, and a U.S. Non-Provisional Application having Ser. No. 15/846,661, filed 19 Dec. 2017.

BACKGROUND

A resource field can be an accumulation, pool or group of pools of one or more resources (e.g., oil, gas, oil and gas) in a subsurface environment. A resource field can include at least one reservoir. A reservoir may be shaped in a manner that can trap hydrocarbons and may be covered by an impermeable or sealing rock. A bore can be drilled into an environment where the bore may be utilized to form a well that can be utilized in producing hydrocarbons from a reservoir.

A rig can be a system of components that can be operated to form a bore in an environment, to transport equipment into and out of a bore in an environment, etc. As an example, a rig can include a system that can be used to drill a bore and to acquire information about an environment, about drilling, etc. A resource field may be an onshore field, an offshore field or an on- and offshore field. A rig can include components for performing operations onshore and/or offshore. A rig may be, for example, vessel-based, offshore platform-based, onshore, etc.

Field planning can occur over one or more phases, which can include an exploration phase that aims to identify and assess an environment (e.g., a prospect, a play, etc.), which may include drilling of one or more bores (e.g., one or more exploratory wells, etc.). Other phases can include appraisal, development and production phases.

SUMMARY

A method can include acquiring data during rig operations where the rig operations include operations that utilize a bit to drill rock and where the data include different types of data; analyzing the data utilizing a probabilistic mixture model for modes, a detection engine for trends and a network model for an inference based at least in part on at least one of a mode and a trend; and outputting information as to the inference where the inference characterizes a relationship between the bit and the rock. A system can include a processor; memory accessible to the processor; processor-executable instructions stored in the memory and executable by the processor to instruct the system to: acquire data during rig operations where the rig operations include operations that utilize a bit to drill rock and where the data include different types of data; analyze the data utilizing a probabilistic mixture model for modes, a detection engine for trends and a network model for an inference based at least in part on at least one of a mode and a trend; and output information as to the inference where the inference characterizes a relationship between the bit and the rock. One or more computer-readable storage media can include computer-executable instructions, executable to instruct a computer to: acquire data during rig operations where the rig operations include operations that utilize a bit to drill rock and where the data include different types of data; analyze the data utilizing a probabilistic mixture model for modes, a detection engine for trends and a network model for an inference based at least in part on at least one of a mode and a trend; and output information as to the inference where the inference characterizes a relationship between the bit and the rock. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Well planning is a part of a well construction process by which a path of a well can be mapped, so as to reach a reservoir, for example, to produce fluids therefrom. As an example, constraints can be imposed on a design of a well, for example, a well trajectory may be constrained via one or more physical phenomena that may impact viability of a bore, ease of drilling, etc. Thus, for example, one or more constraints may be imposed based at least in part on known geology of a subterranean domain or, for example, presence of other wells in the area (e.g., collision avoidance). As an example, one or more other constraints may be imposed, for example, consider one or more constraints germane to capabilities of tools being used and/or one or more constraints related to drilling time and risk tolerance.

As an example, a well plan can be generated based at least in part on imposed constraints and known information. As an example, a well plan may be provided to a well owner, approved, and then implemented by a drilling service provider (e.g., a directional driller or "DD").

As an example, a well design system can account for one or more capabilities of a drilling system or drilling systems that may be utilized at a wellsite. As an example, a drilling engineer may be called upon to take such capabilities into account, for example, as one or more of various designs and specifications are created.

As an example, a well design system, which may be a well planning system, may take into account automation. For example, where a wellsite includes wellsite equipment that can be automated, for example, via a local and/or a remote automation command, a well plan may be generated in digital form that can be utilized in a well drilling system where at least some amount of automation is possible and desired. For example, a digital well plan can be accessible by a well drilling system where information in the digital well plan can be utilized via one or more automation mechanisms of the well drilling system to automate one or more operations at a wellsite.

Figure 1:
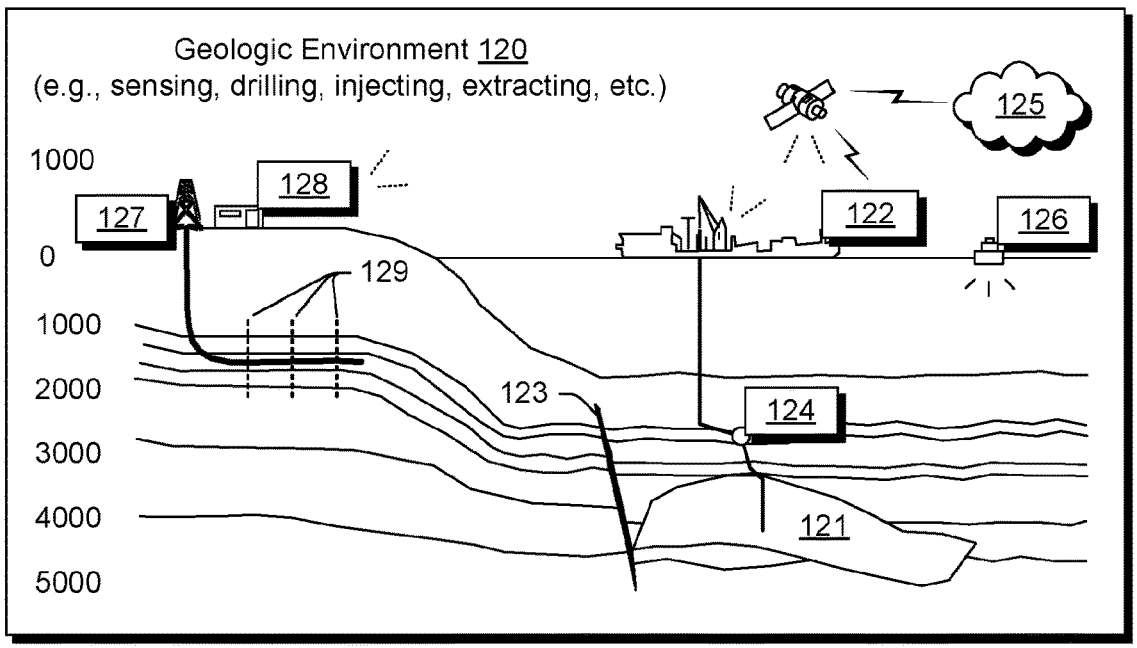
FIG. 1 illustrates examples of equipment in a geologic environment.
Figure 1:
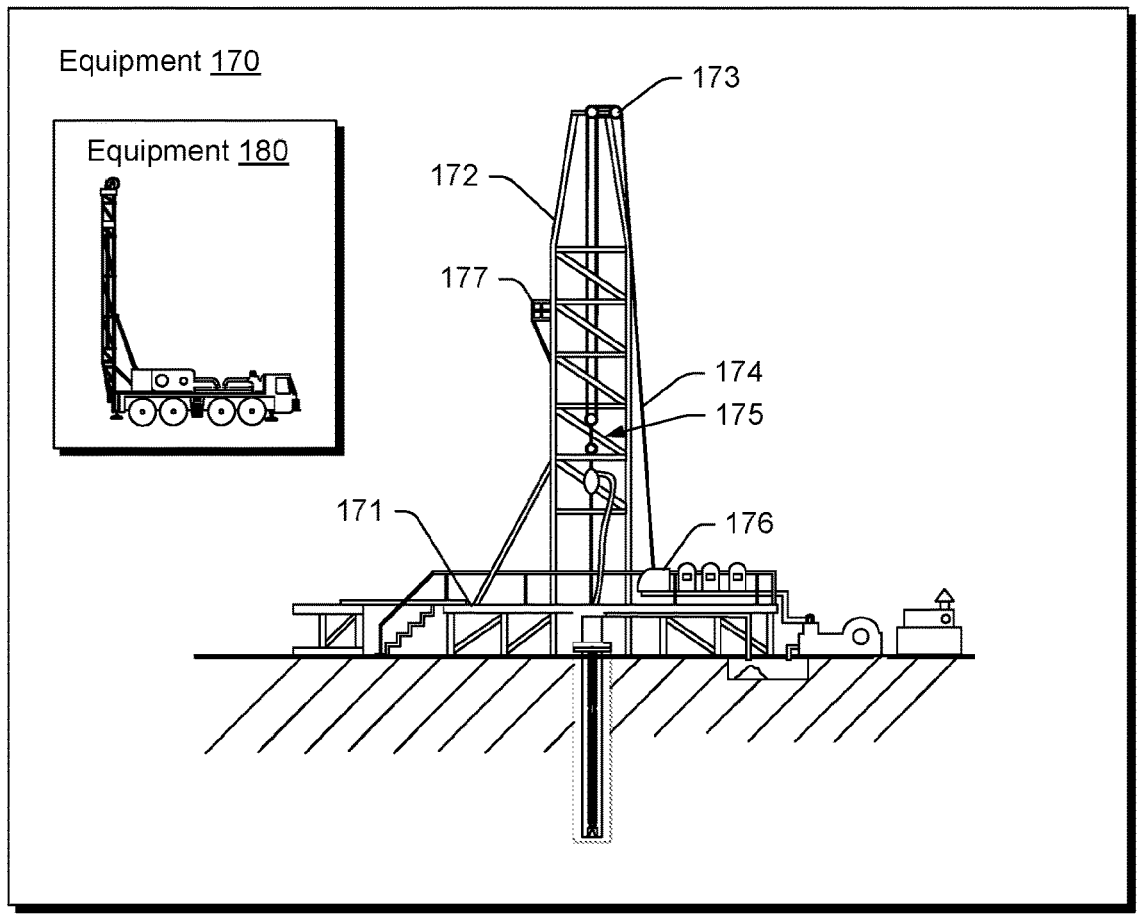

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

Figure 2:
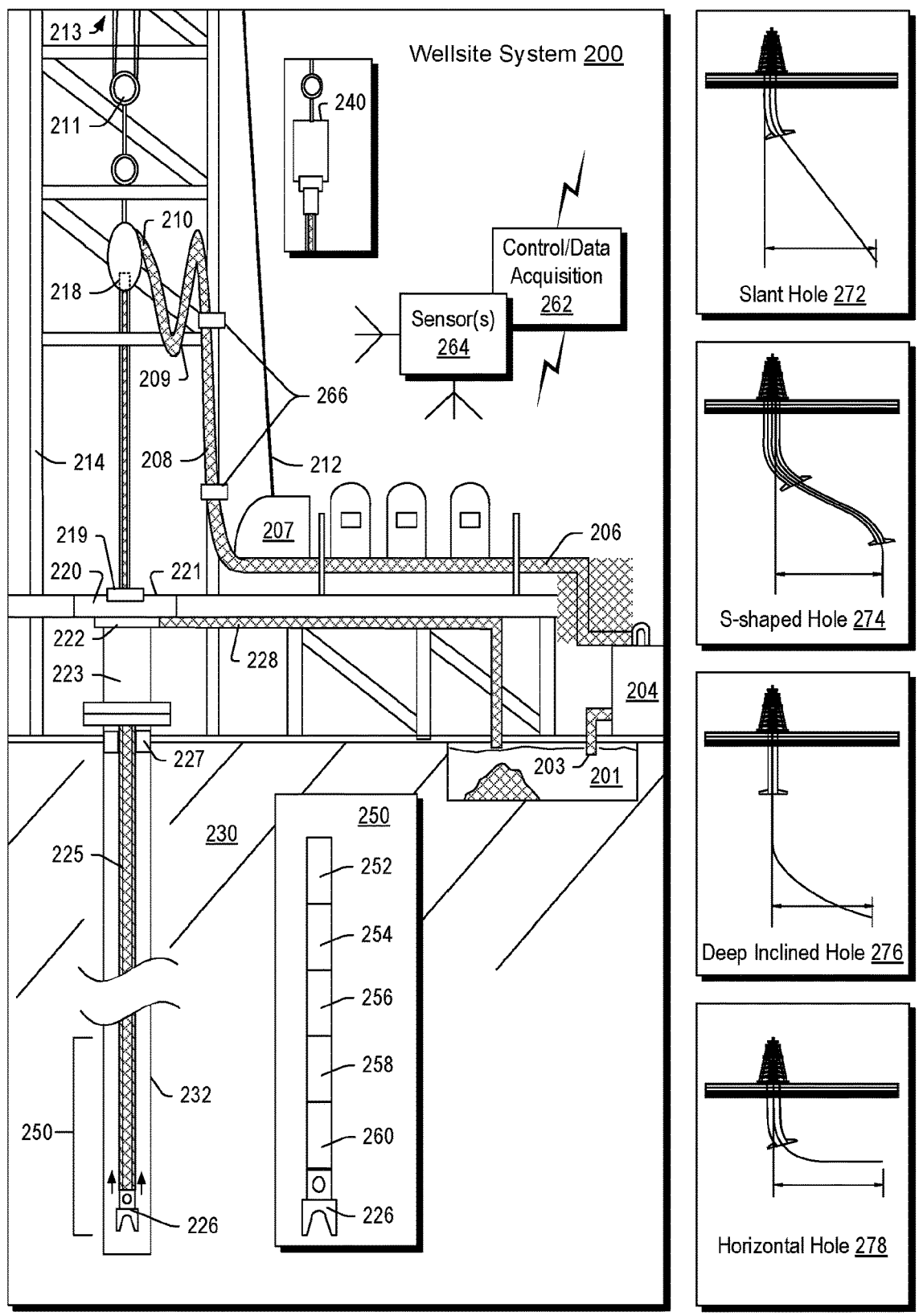
FIG. 2 illustrates an example of a system and examples of types of holes.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system and motor 260, and the drill bit 226.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (AND) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
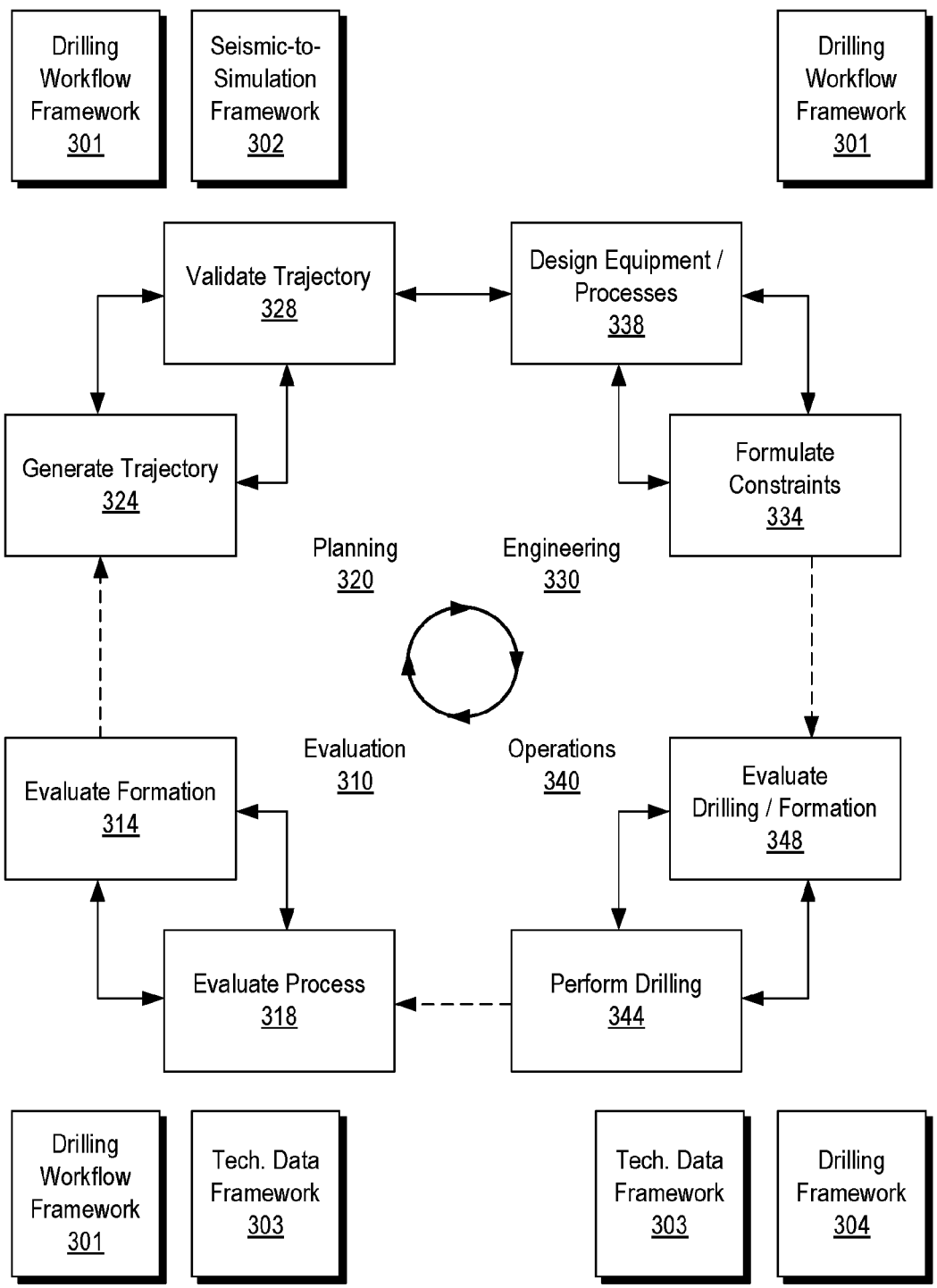
FIG. 3 illustrates an example of a system.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as a evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 can be, for example, the PETREL® framework (Schlumberger Limited, Houston, Tex.) and the technical data framework 303 can be, for example, the TECHLOG® framework (Schlumberger Limited, Houston, Tex.).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on predefined classes, for example, to facilitate modeling, analysis, simulation, etc. An example of an object-based framework is the MICROSOFT™ .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

As an example, a framework can include an analysis component that may allow for interaction with a model or model-based results (e.g., simulation results, etc.). As to simulation, a framework may operatively link to or include a simulator such as the ECLIPSE® reservoir simulator (Schlumberger Limited, Houston Tex.), the INTERSECT® reservoir simulator (Schlumberger Limited, Houston Tex.), etc.

The aforementioned PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

As an example, one or more frameworks may be interoperative and/or run upon one or another. As an example, consider the framework environment marketed as the OCEAN® framework environment (Schlumberger Limited, Houston, Tex.), which allows for integration of add-ons (or plug-ins) into a PETREL® framework workflow. The OCEAN® framework environment can leverage .NET™ tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. The framework may include the OCEAN® framework where the model simulation layer can include or operatively link to the PETREL® model-centric software package that hosts OCEAN® framework applications. In an example embodiment, the PETREL® software may be considered a data-driven application. The PETREL® software can include a framework for model building and visualization. Such a model may include one or more grids.

As an example, the model simulation layer may provide domain objects, act as a data source, provide for rendering and provide for various user interfaces. Rendering may provide a graphical environment in which applications can display their data while the user interfaces may provide a common look and feel for application user interface components.

As an example, domain objects can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project can be accessed and restored using the model simulation layer, which can recreate instances of the relevant domain objects.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL® software, for example, that operates on seismic data, seismic attribute(s), etc. As an example, a workflow can include generating one or more control signals and issuing one or more control signals to one or more pieces of equipment that can perform one or more actions in a field operation.

As an example, seismic data can be data acquired via a seismic survey where sources and receivers are positioned in a geologic environment to emit and receive seismic energy where at least a portion of such energy can reflect off subsurface structures. As an example, a seismic data analysis framework or frameworks (e.g., consider the OMEGA® framework, marketed by Schlumberger Limited, Houston, Tex.) may be utilized to determine depth, extent, properties, etc. of subsurface structures. As an example, seismic data analysis can include forward modeling and/or inversion, for example, to iteratively build a model of a subsurface region of a geologic environment. As an example, a seismic data analysis framework may be part of or operatively coupled to a seismic-to-simulation framework (e.g., the PETREL® framework, etc.).

As an example, a workflow may be a process implementable at least in part in the OCEAN® framework. As an example, a workflow may include one or more worksteps that access a module such as a plug-in (e.g., external executable code, etc.).

As an example, a framework may provide for modeling petroleum systems. For example, the modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG® framework. As an example, the TECHLOG® framework can be interoperable with one or more other frameworks such as, for example, the PETREL® framework.

Figure 4:
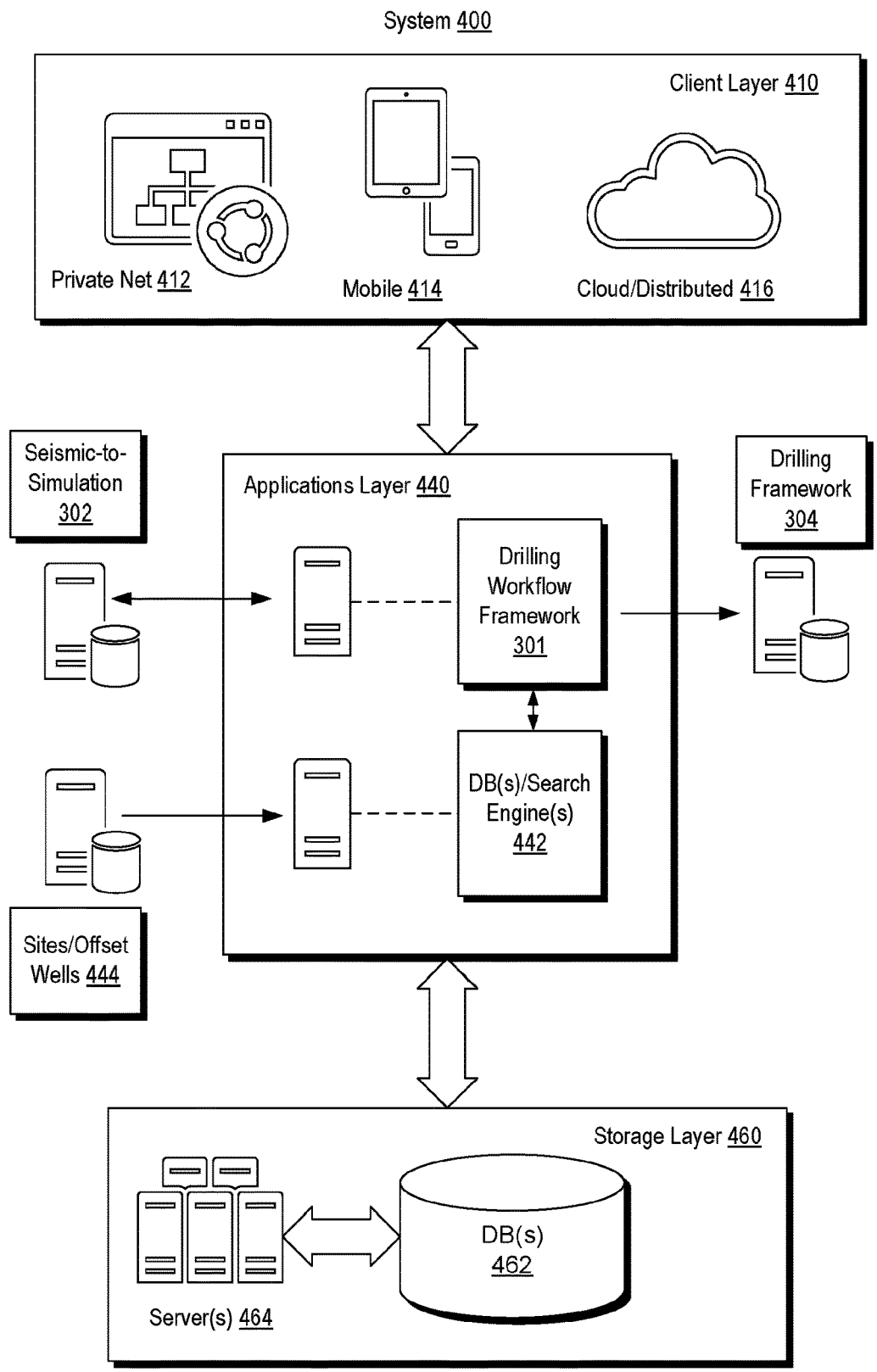
FIG. 4 illustrates an example of a system.

FIG. 4 shows an example of a system 400 that includes a client layer 410, an applications layer 440 and a storage layer 460. As shown the client layer 410 can be in communication with the applications layer 440 and the applications layer 440 can be in communication with the storage layer 460.

The client layer 410 can include features that allow for access and interactions via one or more private networks 412, one or more mobile platforms and/or mobile networks 414 and via the "cloud" 416, which may be considered to include distributed equipment that forms a network such as a network of networks.

In the example of FIG. 4, the applications layer 440 includes the drilling workflow framework 301 as mentioned with respect to the example of FIG. 3. The applications layer 440 also includes a database management component 442 that includes one or more search engines modules.

As an example, the database management component 442 can include one or more search engine modules that provide for searching one or more information that may be stored in one or more data repositories. As an example, the STUDIO E&P™ knowledge environment (Schlumberger Ltd., Houston, Tex.) includes STUDIO FIND™ search functionality, which provides a search engine. The STUDIO FIND™ search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND™ search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more modules may optionally be implemented within a framework or, for example, in a manner operatively coupled to a framework (e.g., as an add-on, a plug-in, etc.). As an example, a module for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 4, the applications layer 440 can include communicating with one or more resources such as, for example, the seismic-to-simulation framework 302, the drilling framework 304 and/or one or more sites, which may be or include one or more offset wellsites. As an example, the applications layer 440 may be implemented for a particular wellsite where information can be processed as part of a workflow for operations such as, for example, operations performed, being performed and/or to be performed at the particular wellsite. As an example, an operation may involve directional drilling, for example, via geosteering.

In the example of FIG. 4, the storage layer 460 can include various types of data, information, etc., which may be stored in one or more databases 462. As an example, one or more servers 464 may provide for management, access, etc., to data, information, etc., stored in the one or more databases 462. As an example, the module 442 may provide for searching as to data, information, etc., stored in the one or more databases 462.

As an example, the module 442 may include features for indexing, etc. As an example, information may be indexed at least in part with respect to wellsite. For example, where the applications layer 440 is implemented to perform one or more workflows associated with a particular wellsite, data, information, etc., associated with that particular wellsite may be indexed based at least in part on the wellsite being an index parameter (e.g., a search parameter).

As an example, the system 400 of FIG. 4 may be implemented to perform one or more portions of one or more workflows associated with the system 300 of FIG. 3. For example, the drilling workflow framework 301 may interact with the technical data framework 303 and the drilling framework 304 before, during and/or after performance of one or more drilling operations. In such an example, the one or more drilling operations may be performed in a geologic environment (see, e.g., the environment 150 of FIG. 1) using one or more types of equipment (see, e.g., equipment of FIGS. 1 and 2).

Figure 5:
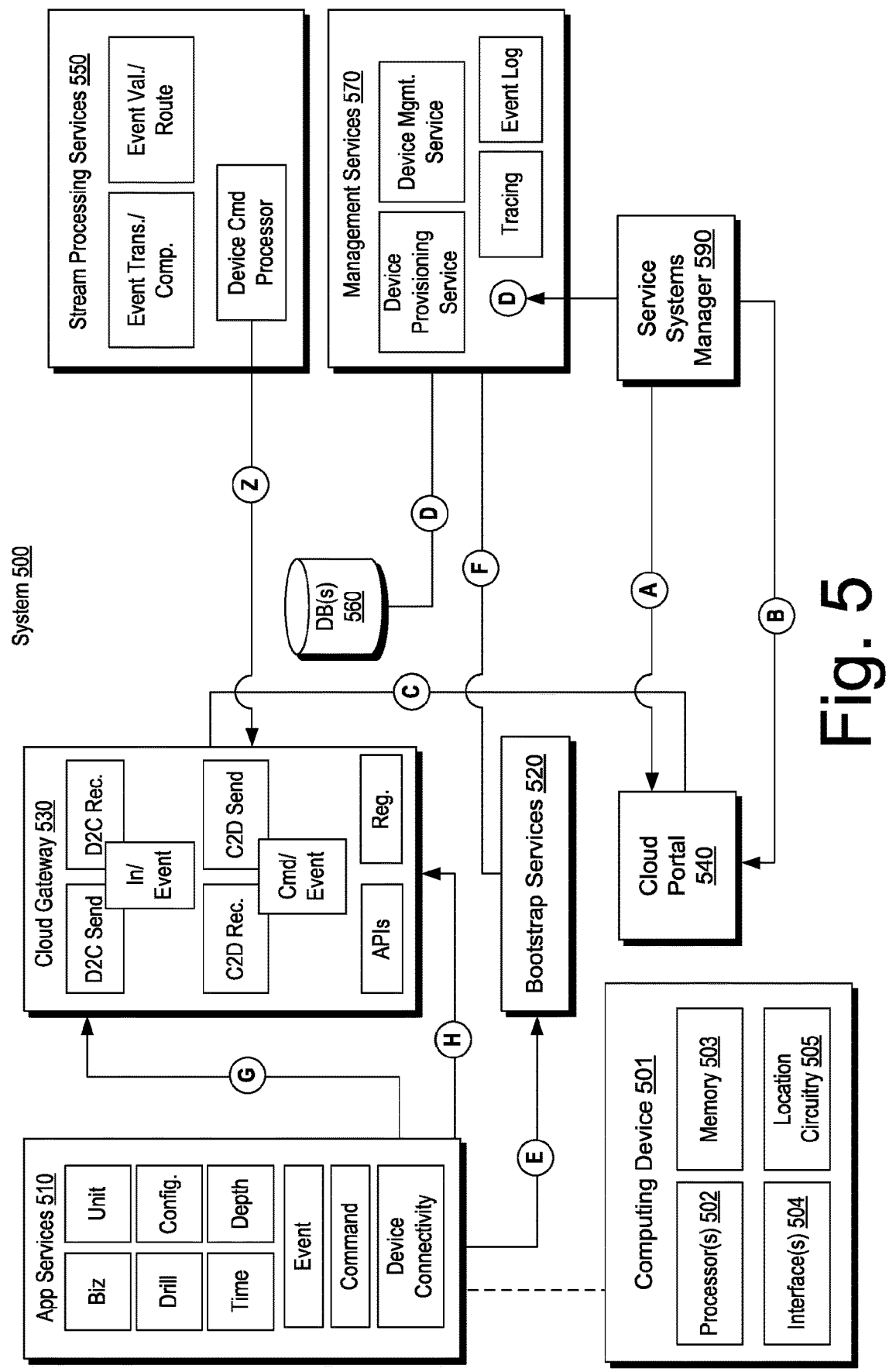
FIG. 5 illustrates an example of a system.

FIG. 5 shows an example of a system 500 that includes a computing device 501, an application services block 510, a bootstrap services block 520, a cloud gateway block 530, a cloud portal block 540, a stream processing services block 550, one or more databases 560, a management services block 570 and a service systems manager 590.

In the example of FIG. 5, the computing device 501 can include one or more processors 502, memory 503, one or more interfaces 504 and location circuitry 505 or, for example, one of the one or more interfaces 504 may be operatively coupled to location circuitry that can acquire local location information. For example, the computing device 501 can include GPS circuitry as location circuitry such that the approximate location of the computer device 501 can be determined. While GPS is mentioned (Global Positioning System), location circuitry may employ one or more types of locating techniques. For example, consider one or more of GLONASS, GALILEO, BeiDou-2, or another system (e.g., global navigation satellite system, "GNSS"). As an example, location circuitry may include cellular phone circuitry (e.g., LTE, 3G, 4G, etc.). As an example, location circuitry may include WiFi circuitry.

As an example, the application services block 510 can be implemented via instructions executable using the computing device 501. As an example, the computing device 501 may be at a wellsite and part of wellsite equipment. As an example, the computing device 501 may be a mobile computing device (e.g., tablet, laptop, etc.) or a desktop computing device that may be mobile, for example, as part of wellsite equipment (e.g., doghouse equipment, rig equipment, vehicle equipment, etc.).

As an example, the system 500 can include performing various actions. For example, the system 500 may include a token that is utilized as a security measure to assure that information (e.g., data) is associated with appropriate permission or permissions for transmission, storage, access, etc.

In the example of FIG. 5, various circles are shown with labels A to H. As an example, A can be a process where an administrator creates a shared access policy (e.g., manually, via an API, etc.); B can be a process for allocating a shared access key for a device identifier (e.g., a device ID), which may be performed manually, via an API, etc.); C can be a process for creating a "device" that can be registered in a device registry and for allocating a symmetric key; D can be a process for persisting metadata where such metadata may be associated with a wellsite identifier (e.g., a well ID) and where, for example, location information (e.g., GPS based information, etc.) may be associated with a device ID and a well ID; E can be a process where a bootstrap message passes that includes a device ID (e.g., a trusted platform module (TPM) chip ID that may be embedded within a device) and that includes a well ID and location information such that bootstrap services (e.g., of the bootstrap services block 520) can proceed to obtain shared access signature (SAS) key(s) to a cloud service endpoint for authorization; F can be a process for provisioning a device, for example, if not already provisioned, where, for example, the process can include returning device keys and endpoint; G can be a process for getting a SAS token using an identifier and a key; and H can be a process that includes being ready to send a message using device credentials. Also shown in FIG. 5 is a process for getting a token and issuing a command for a well identifier (see label Z).

As an example, Shared Access Signatures can be an authentication mechanism based on, for example, SHA-256 secure hashes, URIs, etc. As an example, SAS may be used by one or more Service Bus services. SAS can be implemented via a Shared Access Policy and a Shared Access Signature, which may be referred to as a token. As an example, for SAS applications using the AZURE™ .NET™ SDK with the Service Bus, .NET™ libraries can use SAS authorization through the SharedAccessSignatureTokenProvider class.

As an example, where a system gives an entity (e.g., a sender, a client, etc.) a SAS token, that entity does not have the key directly, and that entity cannot reverse the hash to obtain it. As such, there is control over what that entity can access and, for example, for how long access may exist. As an example, in SAS, for a change of the primary key in the policy, Shared Access Signatures created from it will be invalidated.

As an example, the system 500 of FIG. 5 can be implemented for provisioning of rig acquisition system and/or data delivery.

As an example, a method can include establishing an Internet of Things (IoT) hub or hubs. As an example, such a hub or hubs can include one or more device registries. In such an example, the hub or hubs may provide for storage of metadata associated with a device and, for example, a per-device authentication model. As an example, where location information indicates that a device (e.g., wellsite equipment, etc.) has been changed with respect to its location, a method can include revoking the device in a hub.

As an example, such an architecture utilized in a system such as, for example, the system 500, may include features of the AZURE™ architecture (Microsoft Corporation, Redmond, Wash.) and/or one or more other cloud architectures. As an example, the cloud portal block 540 can include one or more features of an AZURE™ portal that can manage, mediate, etc. access to one or more services, data, connections, networks, devices, etc.

As an example, the system 500 can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Figure 6:
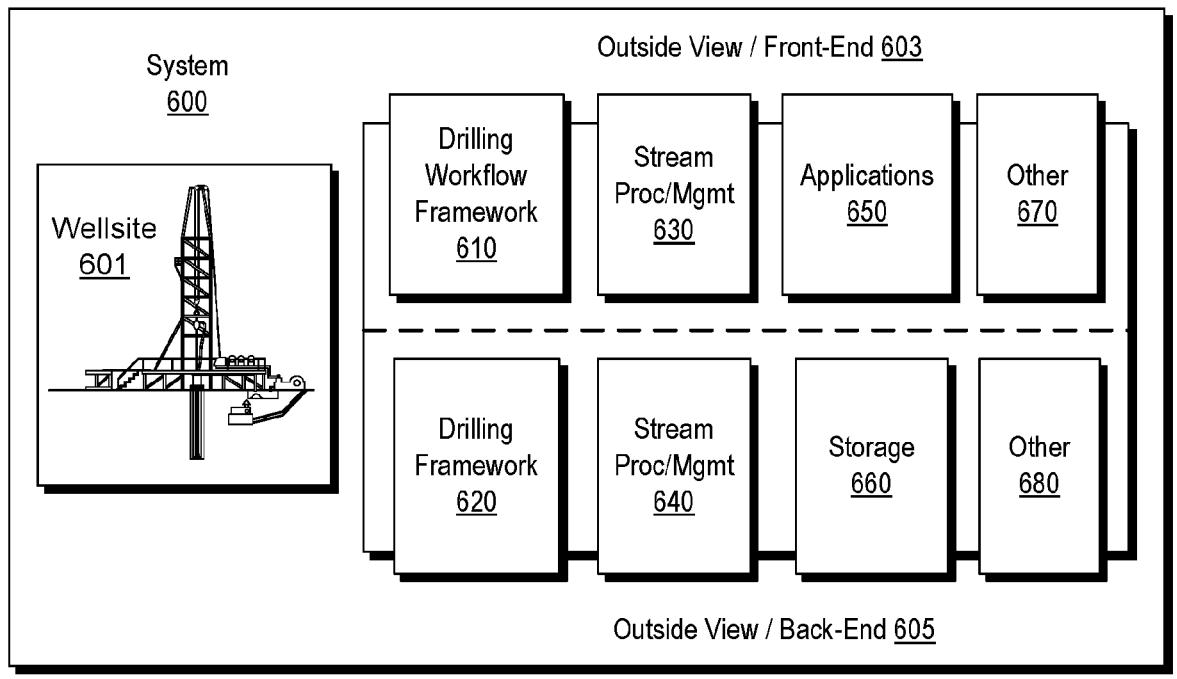
FIG. 6 illustrates an example of a system and an example of a scenario.
Figure 6:
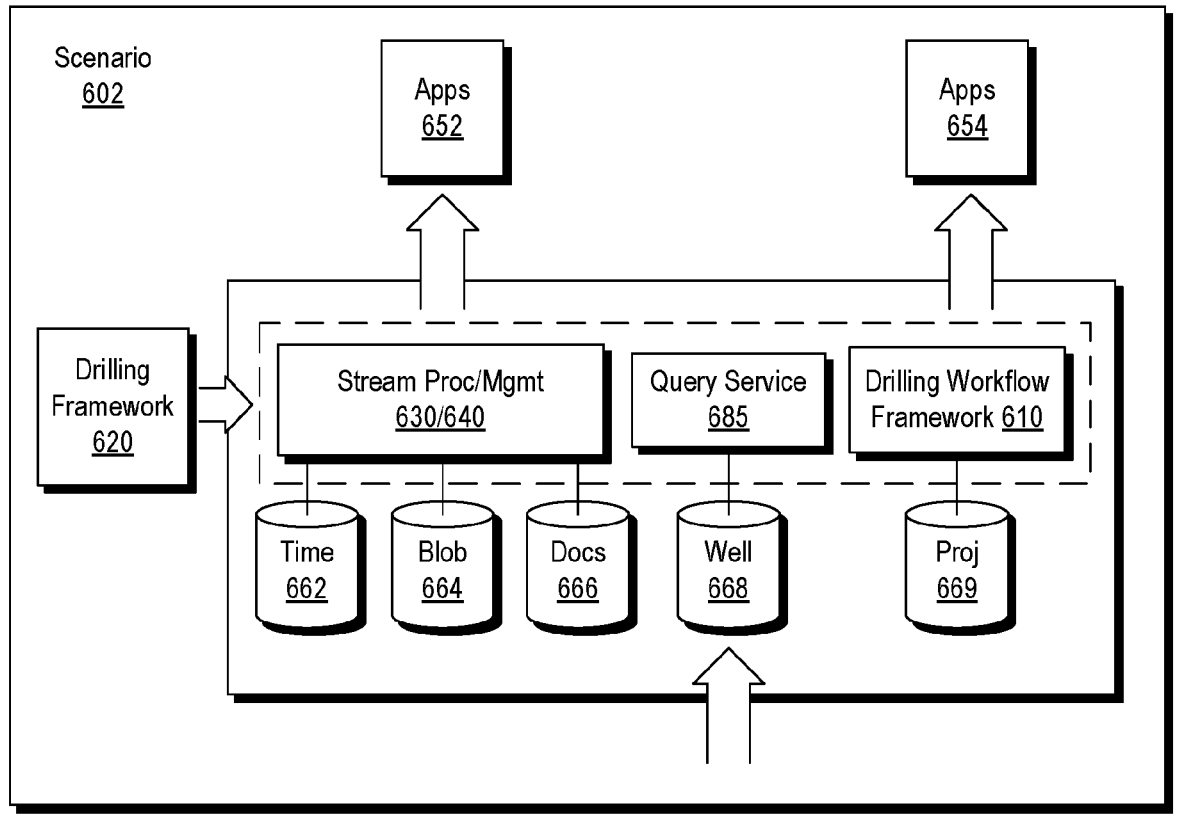

FIG. 6 shows an example of a system 600 associated with an example of a wellsite system 601 and also shows an example scenario 602. As shown in FIG. 6, the system 600 can include a front-end 603 and a back-end 605 from an outside or external perspective (e.g., external to the wellsite system 601, etc.). In the example of FIG. 6, the system 600 includes a drilling framework 620, a stream processing and/or management block 640, storage 660 and optionally one or more other features that can be defined as being back-end features. In the example of FIG. 6, the system 600 includes a drilling workflow framework 610, a stream processing and/or management block 630, applications 650 and optionally one or more other features that can be defined as being front-end features.

As an example, a user operating a user device can interact with the front-end 603 where the front-end 603 can interact with one or more features of the back-end 605. As an example, such interactions may be implemented via one or more networks, which may be associated with a cloud platform (e.g., cloud resources, etc.).

As to the example scenario 602, the drilling framework 620 can provide information associated with, for example, the wellsite system 601. As shown, the stream blocks 630 and 640, a query service 685 and the drilling workflow framework 610 may receive information and direct such information to storage, which may include a time series database 662, a blob storage database 664, a document database 666, a well information database 668, a project(s) database 669, etc. As an example, the well information database 668 may receive and store information such as, for example, customer information (e.g., from entities that may be owners of rights at a wellsite, service providers at a wellsite, etc.). As an example, the project database 669 can include information from a plurality of projects where a project may be, for example, a wellsite project.

As an example, the system 600 can be operable for a plurality of wellsites, which may include active and/or inactive wellsites and/or, for example, one or more planned wellsites. As an example, the system 600 can include various components of the system 300 of FIG. 3. As an example, the system 600 can include various components of the system 400 of FIG. 4. For example, the drilling workflow framework 610 can be a drilling workflow framework such as the drilling workflow framework 301 and/or, for example, the drilling framework 620 can be a drilling framework such as the drilling framework 304.

Figure 7:
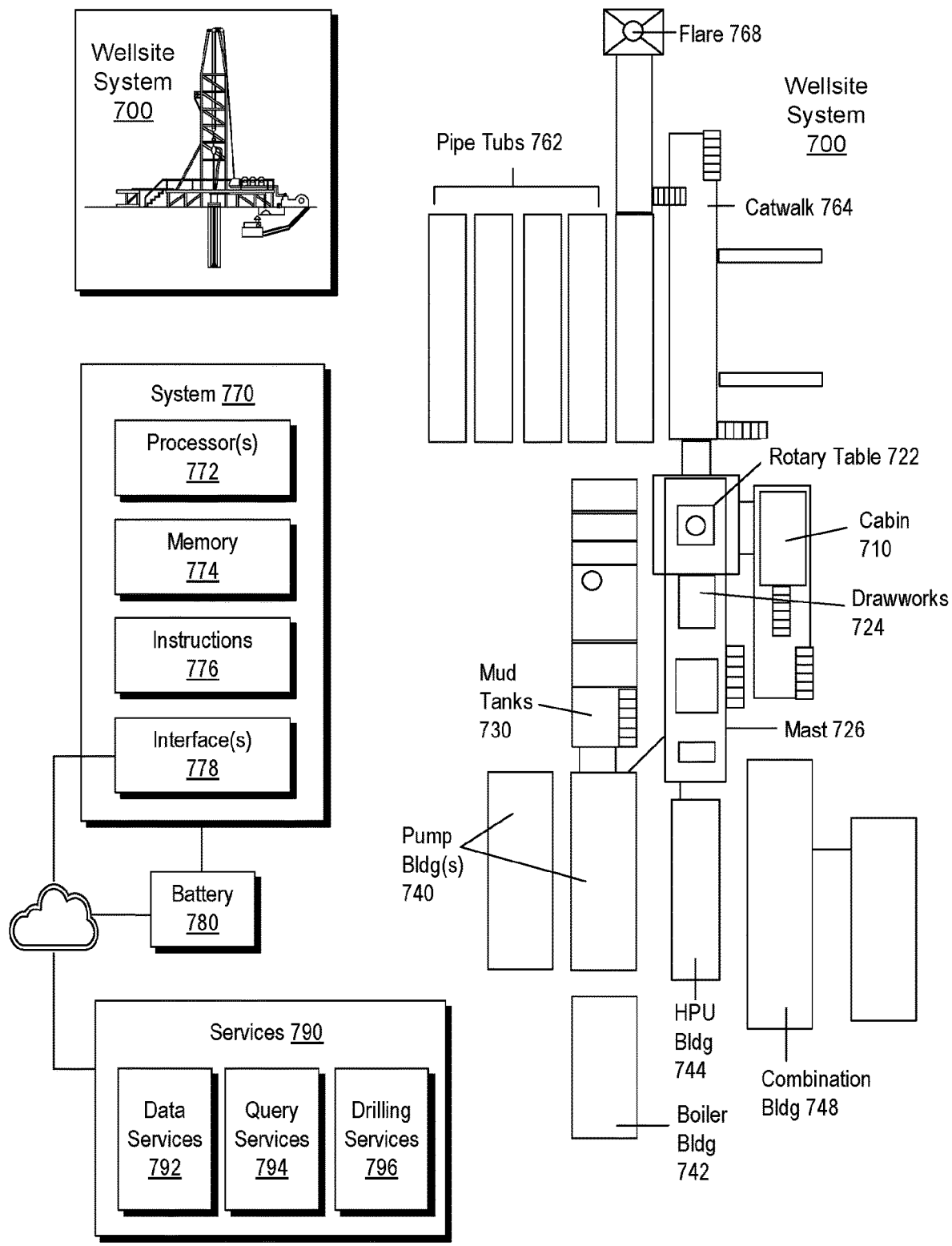
FIG. 7 illustrates an example of a wellsite system.

FIG. 7 shows an example of a wellsite system 700, specifically, FIG. 7 shows the wellsite system 700 in an approximate side view and an approximate plan view along with a block diagram of a system 770.

In the example of FIG. 7, the wellsite system 700 can include a cabin 710, a rotary table 722, drawworks 724, a mast 726 (e.g., optionally carrying a top drive, etc.), mud tanks 730 (e.g., with one or more pumps, one or more shakers, etc.), one or more pump buildings 740, a boiler building 742, an HPU building 744 (e.g., with a rig fuel tank, etc.), a combination building 748 (e.g., with one or more generators, etc.), pipe tubs 762, a catwalk 764, a flare 768, etc. Such equipment can include one or more associated functions and/or one or more associated operational risks, which may be risks as to time, resources, and/or humans.

As shown in the example of FIG. 7, the wellsite system 700 can include a system 770 that includes one or more processors 772, memory 774 operatively coupled to at least one of the one or more processors 772, instructions 776 that can be, for example, stored in the memory 774, and one or more interfaces 778. As an example, the system 770 can include one or more processor-readable media that include processor-executable instructions executable by at least one of the one or more processors 772 to cause the system 770 to control one or more aspects of the wellsite system 700. In such an example, the memory 774 can be or include the one or more processor-readable media where the processor-executable instructions can be or include instructions. As an example, a processor-readable medium can be a computer-readable storage medium that is not a signal and that is not a carrier wave.

FIG. 7 also shows a battery 780 that may be operatively coupled to the system 770, for example, to power the system 770. As an example, the battery 780 may be a back-up battery that operates when another power supply is unavailable for powering the system 770. As an example, the battery 780 may be operatively coupled to a network, which may be a cloud network. As an example, the battery 780 can include smart battery circuitry and may be operatively coupled to one or more pieces of equipment via a SMBus or other type of bus.

In the example of FIG. 7, services 790 are shown as being available, for example, via a cloud platform. Such services can include data services 792, query services 794 and drilling services 796. As an example, the services 790 may be part of a system such as the system 300 of FIG. 3, the system 400 of FIG. 4 and/or the system 600 of FIG. 6.

As an example, a system such as, for example, the system 300 of FIG. 3 may be utilized to perform a workflow. Such a system may be distributed and allow for collaborative workflow interactions and may be considered to be a platform (e.g., a framework for collaborative interactions, etc.).

As an example, one or more systems can be utilized to implement a workflow that can be performed collaboratively. As an example, the system 300 of FIG. 3 can be operated as a distributed, collaborative well-planning system. The system 300 can utilize one or more servers, one or more client devices, etc. and may maintain one or more databases, data files, etc., which may be accessed and modified by one or more client devices, for example, using a web browser, remote terminal, etc. As an example, a client device may modify a database or data files on-the-fly, and/or may include "sandboxes" that may permit one or more client devices to modify at least a portion of a database or data files optionally off-line, for example, without affecting a database or data files seen by one or more other client devices. As an example, a client device that includes a sandbox may modify a database or data file after completing an activity in the sandbox.

In some examples, client devices and/or servers may be remote with respect to one another and/or may individually include two or more remote processing units. As an example, two systems can be "remote" with respect to one another if they are not physically proximate to one another; for example, two devices that are located at different sides of a room, in different rooms, in different buildings, in different cities, countries, etc. may be considered "remote" depending on the context. In some embodiments, two or more client devices may be proximate to one another, and/or one or more client devices and a server may be proximate to one another.

As an example, various aspects of a workflow may be completed automatically, may be partially automated, or may be completed manually, as by a human user interfacing with a software application. As an example, a workflow may be cyclic, and may include, as an example, four stages such as, for example, an evaluation stage (see, e.g., the evaluation equipment 310), a planning stage (see, e.g., the planning equipment 320), an engineering stage (see, e.g., the engineering equipment 330) and an execution stage (see, e.g., the operations equipment 340). As an example, a workflow may commence at one or more stages, which may progress to one or more other stages (e.g., in a serial manner, in a parallel manner, in a cyclical manner, etc.).

As an example, a workflow can commence with an evaluation stage, which may include a geological service provider evaluating a formation (see, e.g., the evaluation block 314). As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory (see, e.g., the generation block 324), which may involve execution of one or more G&G software packages. Examples of such software packages include the PETREL® framework. As an example, a G&G service provider may determine a well trajectory or a section thereof, based on, for example, one or more model(s) provided by a formation evaluation (e.g., per the evaluation block 314), and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design (see, e.g., the validation block 328). Such a validation process may include evaluating physical properties, calculations, risk tolerances, integration with other aspects of a workflow, etc. As an example, one or more parameters for such determinations may be maintained by a server and/or by the first engineering service provider; noting that one or more model (s), well trajectory(ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom-hole assembly (BHA) design, fluid design, and/or the like, to implement a well trajectory (see, e.g., the design block 338). In some embodiments, a second engineering service provider may perform such design using one of more software applications. Such designs may be stored in one or more databases maintained by one or more servers, which may, for example, employ STUDIO® framework tools, and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like (see, e.g., the formulation block 334). As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters (see, e.g., the blocks 344 and 348). As an example, operating parameters, formation encountered, data collected while drilling (e.g., using logging-while-drilling or measuring-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review (see, e.g., the evaluation block 318). As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in any gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc. basis.

Well planning can include determining a path of a well that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

As an example, a system can allow for a reduction in waste, for example, as may be defined according to LEAN.

In the context of LEAN, consider one or more of the following types of waste: Transport (e.g., moving items unnecessarily, whether physical or data); Inventory (e.g., components, whether physical or informational, as work in process, and finished product not being processed); Motion (e.g., people or equipment moving or walking unnecessarily to perform desired processing); Waiting (e.g., waiting for information, interruptions of production during shift change, etc.); Overproduction (e.g., production of material, information, equipment, etc. ahead of demand); Over Processing (e.g., resulting from poor tool or product design creating activity); and Defects (e.g., effort involved in inspecting for and fixing defects whether in a plan, data, equipment, etc.). As an example, a system that allows for actions (e.g., methods, workflows, etc.) to be performed in a collaborative manner can help to reduce one or more types of waste.

As an example, a system can be utilized to implement a method for facilitating distributed well engineering, planning, and/or drilling system design across multiple computation devices where collaboration can occur among various different users (e.g., some being local, some being remote, some being mobile, etc.). In such a system, the various users via appropriate devices may be operatively coupled via one or more networks (e.g., local and/or wide area networks, public and/or private networks, land-based, marine-based and/or areal networks, etc.).

As an example, a system may allow well engineering, planning, and/or drilling system design to take place via a subsystems approach where a wellsite system is composed of various subsystem, which can include equipment subsystems and/or operational subsystems (e.g., control subsystems, etc.). As an example, computations may be performed using various computational platforms/devices that are operatively coupled via communication links (e.g., network links, etc.). As an example, one or more links may be operatively coupled to a common database (e.g., a server site, etc.). As an example, a particular server or servers may manage receipt of notifications from one or more devices and/or issuance of notifications to one or more devices. As an example, a system may be implemented for a project where the system can output a well plan, for example, as a digital well plan, a paper well plan, a digital and paper well plan, etc. Such a well plan can be a complete well engineering plan or design for the particular project.

Figure 8:
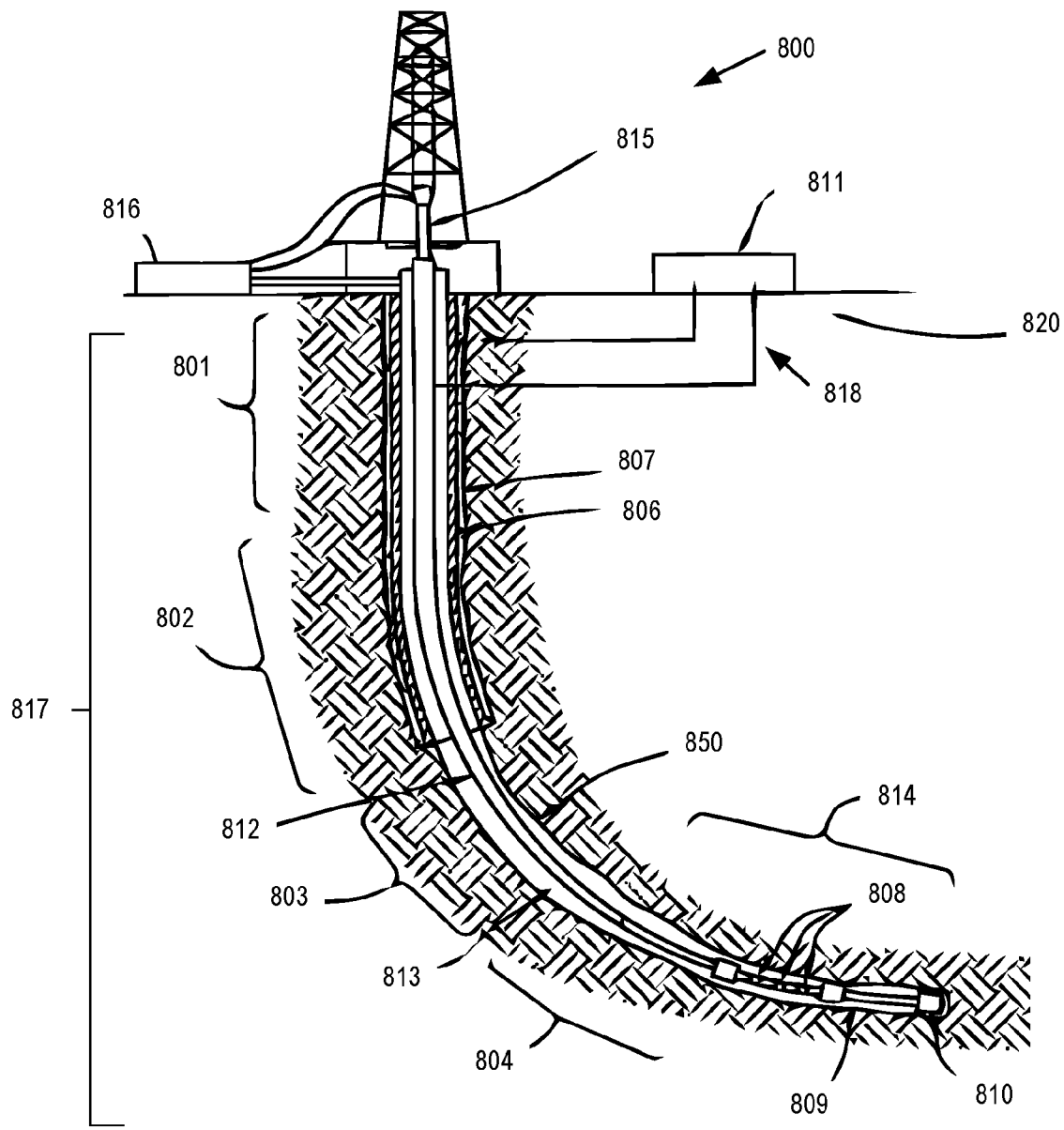
FIG. 8 illustrates an example of a system.

FIG. 8 shows a schematic diagram depicting an example of a drilling operation of a directional well in multiple sections. The drilling operation depicted in FIG. 8 includes a wellsite drilling system 800 and a field management tool 820 for managing various operations associated with drilling a bore hole 850 of a directional well 817. The wellsite drilling system 800 includes various components (e.g., drillstring 812, annulus 813, bottom hole assembly (BHA) 814, kelly 815, mud pit 816, etc.). As shown in the example of FIG. 8, a target reservoir may be located away from (as opposed to directly under) the surface location of the well 817. In such an example, special tools or techniques may be used to ensure that the path along the bore hole 850 reaches the particular location of the target reservoir.

As an example, the BHA 814 may include sensors 808, a rotary steerable system 809, and a bit 810 to direct the drilling toward the target guided by a pre-determined survey program for measuring location details in the well. Furthermore, the subterranean formation through which the directional well 817 is drilled may include multiple layers (not shown) with varying compositions, geophysical characteristics, and geological conditions. Both the drilling planning during the well design stage and the actual drilling according to the drilling plan in the drilling stage may be performed in multiple sections (e.g., sections 801, 802, 803 and 804) corresponding to the multiple layers in the subterranean formation. For example, certain sections (e.g., sections 801 and 802) may use cement 807 reinforced casing 806 due to the particular formation compositions, geophysical characteristics, and geological conditions.

In the example of FIG. 8, a surface unit 811 may be operatively linked to the wellsite drilling system 800 and the field management tool 820 via communication links 818. The surface unit 811 may be configured with functionalities to control and monitor the drilling activities by sections in real-time via the communication links 818. The field management tool 820 may be configured with functionalities to store oilfield data (e.g., historical data, actual data, surface data, subsurface data, equipment data, geological data, geophysical data, target data, anti-target data, etc.) and determine relevant factors for configuring a drilling model and generating a drilling plan. The oilfield data, the drilling model, and the drilling plan may be transmitted via the communication link 818 according to a drilling operation workflow. The communication links 818 may include a communication subassembly.

During various operations at a wellsite, data can be acquired for analysis and/or monitoring of one or more operations. Such data may include, for example, subterranean formation, equipment, historical and/or other data. Static data can relate to, for example, formation structure and geological stratigraphy that define the geological structures of the subterranean formation. Static data may also include data about a bore, such as inside diameters, outside diameters, and depths. Dynamic data can relate to, for example, fluids flowing through the geologic structures of the subterranean formation over time. The dynamic data may include, for example, pressures, fluid compositions (e.g. gas oil ratio, water cut, and/or other fluid compositional information), and states of various equipment, and other information.

The static and dynamic data collected via a bore, a formation, equipment, etc. may be used to create and/or update a three dimensional model of one or more subsurface formations. As an example, static and dynamic data from one or more other bores, fields, etc. may be used to create and/or update a three dimensional model. As an example, hardware sensors, core sampling, and well logging techniques may be used to collect data. As an example, static measurements may be gathered using downhole measurements, such as core sampling and well logging techniques. Well logging involves deployment of a downhole tool into the wellbore to collect various downhole measurements, such as density, resistivity, etc., at various depths. Such well logging may be performed using, for example, a drilling tool and/or a wireline tool, or sensors located on downhole production equipment. Once a well is formed and completed, depending on the purpose of the well (e.g., injection and/or production), fluid may flow to the surface (e.g., and/or from the surface) using tubing and other completion equipment. As fluid passes, various dynamic measurements, such as fluid flow rates, pressure, and composition may be monitored. These parameters may be used to determine various characteristics of a subterranean formation, downhole equipment, downhole operations, etc.

To facilitate the processing and analysis of data, simulators may be used to process data. Data fed into the simulator(s) may be historical data, real time data or combinations thereof. Simulation through one or more of the simulators may be repeated or adjusted based on the data received. As an example, oilfield operations can be provided with wellsite and non-wellsite simulators. The wellsite simulators may include a reservoir simulator, a wellbore simulator, and a surface network simulator. The reservoir simulator may solve for hydrocarbon flowrate through the reservoir and into the wellbores. The wellbore simulator and surface network simulator may solve for hydrocarbon flowrate through the wellbore and the surface gathering network of pipelines.

Figure 9:
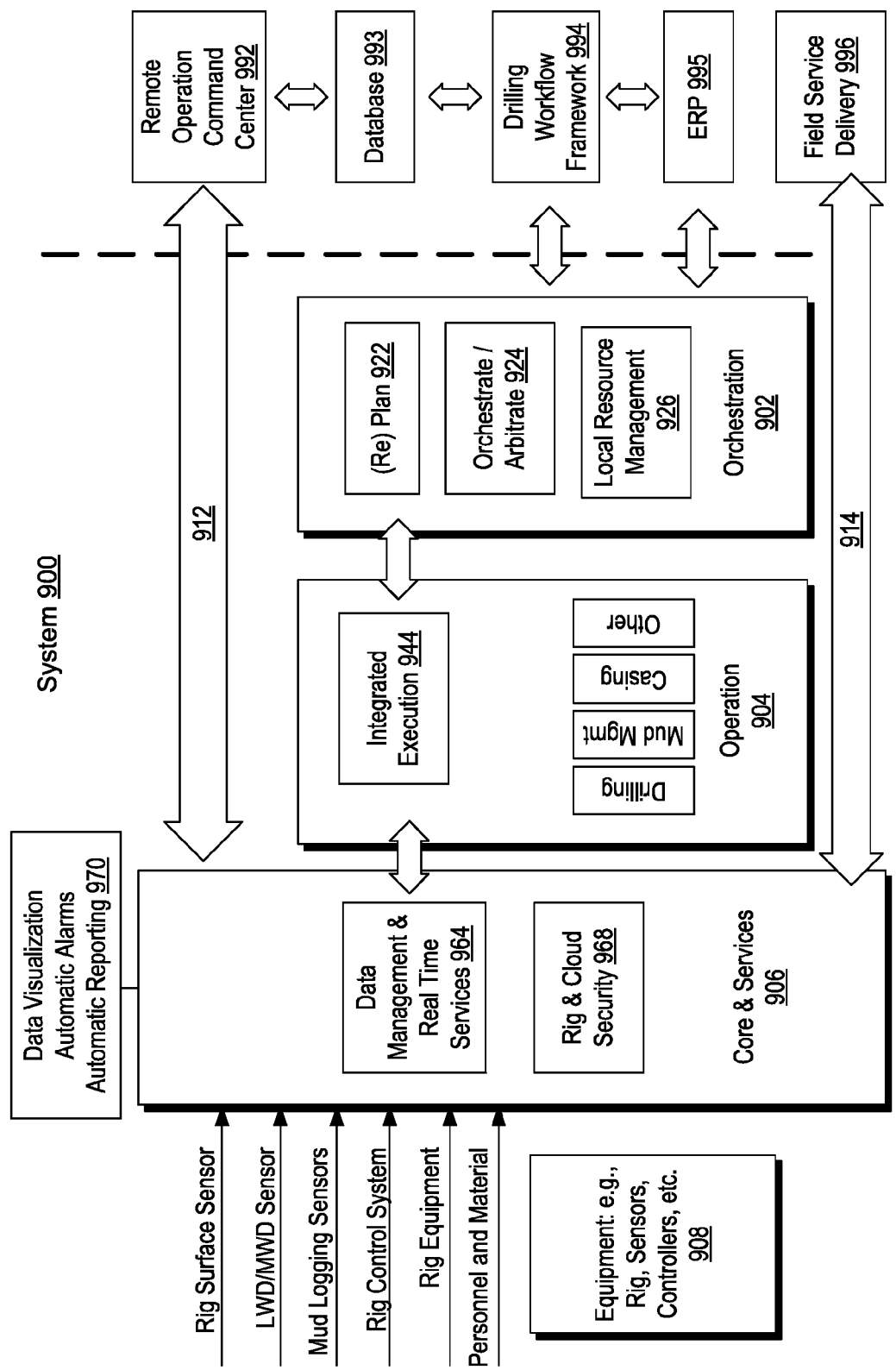
FIG. 9 illustrates an example of a system.

FIG. 9 shows an example of a system 900 that includes various components that can be local to a wellsite and includes various components that can be remote from a wellsite. As shown, the system 900 includes an orchestration block 902, an operation block 904, a core and services block 906 and an equipment block 908. These blocks may be labeled in one or more manners other than as shown in the example of FIG. 9. In the example of FIG. 9, the blocks 902, 904, 906 and 908 can be defined by one or more of operational features, functions, relationships in an architecture, etc.

As an example, the blocks 902, 904, 906 and 908 may be described in a pyramidal architecture where, from peak to base, a pyramid includes the block 902, the block 904, the core and services block 906 and the equipment block 908.

As an example, the block 902 can be associated with a well management level (e.g., well planning and/or orchestration) and can be associated with a rig management level (e.g., rig dynamic planning and/or orchestration). As an example, the block 904 can be associated with a process management level (e.g., rig integrated execution as field operations). As an example, the core and services block 906 can be associated with a data management level (e.g., sensor, instrumentation, inventory, etc.). As an example, the equipment block 908 can be associated with a wellsite equipment level (e.g., wellsite subsystems, etc.).

As an example, the block 902 may receiving information from a drilling workflow framework and/or one or more other sources, which may be remote from a wellsite.

In the example of FIG. 9, the block 902 includes a plan/replan block 922, an orchestrate/arbitrate block 924 and a local resource management block 926. In the example of FIG. 9, the block 904 includes an integrated execution block 944, which can include or be operatively coupled to blocks for various subsystems of a wellsite such as a drilling subsystem, a mud management subsystem (e.g., a hydraulics subsystem), a casing subsystem (e.g., casings and/or completions subsystem), and, for example, one or more other subsystems. In the example of FIG. 9, the core and services block 906 includes a data management and real-time services block 964 (e.g., real-time or near real-time services) and a rig and cloud security block 968 (see, e.g., the system 500 of FIG. 5 as to provisioning and various type of security measures, etc.). In the example of FIG. 9, the equipment block 908 is shown as being capable of providing various types of information to the core and services block 906. For example, consider information from a rig surface sensor, a LWD/MWD sensor, a mud logging sensor, a rig control system, rig equipment, personnel, material, etc. In the example, of FIG. 9, a block 970 can provide for one or more of data visualization, automatic alarms, automatic reporting, etc. As an example, the block 970 may be operatively coupled to the core and services block 906 and/or one or more other blocks.

As mentioned, a portion of the system 900 can be remote from a wellsite. For example, to one side of a dashed line appear a remote operation command center block 992, a database block 993, a drilling workflow framework block 994, an enterprise resource planning (ERP) block 995 and a field services delivery block 996. Various blocks that may be remote can be operatively coupled to one or more blocks that may be local to a wellsite system. For example, a communication link 912 is illustrated in the example of FIG. 9 that can operatively couple the blocks 906 and 992 (e.g., as to monitoring, remote control, etc.), while another communication link 914 is illustrated in the example of FIG. 9 that can operatively couple the blocks 906 and 996 (e.g., as to equipment delivery, equipment services, etc.). Various other examples of possible communication links are also illustrated in the example of FIG. 9.

As an example, the system 900 of FIG. 9 may be a field management tool. As an example, the system 900 of FIG. 9 may include a drilling framework (see, e.g., the drilling frameworks 304 and 620). As an example, blocks in the system 900 of FIG. 9 that may be remote from a wellsite may include various features of the services 790 of FIG. 7.

As an example, a wellbore can be drilled according to a drilling plan that is established prior to drilling. Such a drilling plan, which may be a well plan, can set forth equipment, pressures, trajectories and/or other parameters that define drilling process for a wellsite. As an example, a drilling operation may then be performed according to the drilling plan (e.g., well plan). As an example, as information is gathered, a drilling operation may deviate from a drilling plan. Additionally, as drilling or other operations are performed, subsurface conditions may change. Specifically, as new information is collected, sensors may transmit data to one or more surface units. As an example, a surface unit may automatically use such data to update a drilling plan (e.g., locally and/or remotely).

As an example, the drilling workflow framework 994 can be or include a G&G system and a well planning system. As an example, a G&G system corresponds to hardware, software, firmware, or a combination thereof that provides support for geology and geophysics. In other words, a geologist who understands the reservoir may decide where to drill the well using the G&G system that creates a three-dimensional model of the subsurface formation and includes simulation tools. The G&G system may transfer a well trajectory and other information selected by the geologist to a well planning system. The well planning system corresponds to hardware, software, firmware, or a combination thereof that produces a well plan. In other words, the well plan may be a high-level drilling program for the well. The well planning system may also be referred to as a well plan generator.

In the example of FIG. 9, various blocks can be components that may correspond to one or more software modules, hardware infrastructure, firmware, equipment, or any combination thereof. Communication between the components may be local or remote, direct or indirect, via application programming interfaces, and procedure calls, or through one or more communication channels.

As an example, various blocks in the system 900 of FIG. 9 can correspond to levels of granularity in controlling operations of associated with equipment and/or personnel in an oilfield. As shown in FIG. 9, the system 900 can include the block 902 (e.g., for well plan execution), the block 904 (e.g., process manager collection), the core and services block 906, and the equipment block 908.

The block 902 may be referred to as a well plan execution system. For example, a well plan execution system corresponds to hardware, software, firmware or a combination thereof that performs an overall coordination of the well construction process, such as coordination of a drilling rig and the management of the rig and the rig equipment. A well plan execution system may be configured to obtain the general well plan from well planning system and transform the general well plan into a detailed well plan. The detailed well plan may include a specification of the activities involved in performing an action in the general well plan, the days and/or times to perform the activities, the individual resources performing the activities, and other information.

As an example, a well plan execution system may further include functionality to monitor an execution of a well plan to track progress and dynamically adjust the plan. Further, a well plan execution system may be configured to handle logistics and resources with respect to on and off the rig. As an example, a well plan execution system may include multiple sub-components, such as a detailer that is configured to detail the well planning system plan, a monitor that is configured to monitor the execution of the plan, a plan manager that is configured to perform dynamic plan management, and a logistics and resources manager to control the logistics and resources of the well. In one or more embodiments, a well plan execution system may be configured to coordinate between the different processes managed by a process manager collection (see, e.g., the block 904). In other words, a well plan execution system can communicate and manage resource sharing between processes in a process manager collection while operating at, for example, a higher level of granularity than process manager collection.

As to the block 904, as mentioned, it may be referred to as a process manager collection. In one or more embodiments, a process manager collection can include functionality to perform individual process management of individual domains of an oilfield, such as a rig. For example, when drilling a well, different activities may be performed. Each activity may be controlled by an individual process manager in the process manager collection. A process manager collection may include multiple process managers, whereby each process manager controls a different activity (e.g., activity related to the rig). In other words, each process manager may have a set of tasks defined for the process manager that is particular to the type of physics involved in the activity. For example, drilling a well may use drilling mud, which is fluid pumped into well in order to extract drill cuttings from the well. A drilling mud process manager may exist in a process manager collection that manages the mixing of the drilling mud, the composition, testing of the drilling mud properties, determining whether the pressure is accurate, and performing other such tasks. The drilling mud process manager may be separate from a process manager that controls movement of drill pipe from a well. Thus, a process manager collection may partition activities into several different domains and manages each of the domains individually. Amongst other possible process managers, a process manager collection may include, for example, a drilling process manager, a mud preparation and management process manager, a casing running process manager, a cementing process manager, a rig equipment process manager, and other process managers. Further, a process manager collection may provide direct control or advice regarding the components above. As an example, coordination between process managers in a process manager collection may be performed by a well plan execution system.

As to the core and service block 906 (e.g., a core services block or CS block), it can include functionality to manage individual pieces of equipment and/or equipment subsystems. As an example, a CS block can include functionality to handle basic data structure of the oilfield, such as the rig, acquire metric data, produce reports, and manages resources of people and supplies. As an example, a CS block may include a data acquirer and aggregator, a rig state identifier, a real-time (RT) drill services (e.g., near real-time), a reporter, a cloud, and an inventory manager.

As an example, a data acquirer and aggregator can include functionality to interface with individual equipment components and sensor and acquire data. As an example, a data acquirer and aggregator may further include functionality to interface with sensors located at the oilfield.

As an example, a rig state identifier can includes functionality to obtain data from the data acquirer and aggregator and transform the data into state information. As an example, state information may include health and operability of a rig as well as information about a particular task being performed by equipment.

As an example, real-time (RT) drill services can include functionality to transmit and present information to individuals and/or transmit information to one or more pieces of equipment (e.g., control signals, commands, etc.). As an example, the RT drill services can include functionality to transmit information to individuals involved according to roles and, for example, device types of each individual (e.g., mobile, desktop, etc.). In one or more embodiments, information presented by RT drill services can be context specific, and may include a dynamic display of information so that a human user may view details about items of interest.

As an example, in one or more embodiments, a reporter can include functionality to generate reports. For example, reporting may be based on requests and/or automatic generation and may provide information about state of equipment and/or people.

As an example, a wellsite "cloud" framework can correspond to an information technology infrastructure locally at an oilfield, such as an individual rig in the oilfield. In such an example, the wellsite "cloud" framework may be an "Internet of Things" (IoT) framework. As an example, a wellsite "cloud" framework can be an edge of the cloud (e.g., a network of networks) or of a private network.

As an example, an inventory manager can be a block that includes functionality to manage materials, such as a list and amount of each resource on a rig.

In the example of FIG. 9, the equipment block 908 can correspond to various controllers, control unit, control equipment, etc. that may be operatively coupled to and/or embedded into physical equipment at a wellsite such as, for example, rig equipment. For example, the equipment block 908 may correspond to software and control systems for individual items on the rig. As an example, the equipment block 908 may provide for monitoring sensors from multiple subsystems of a drilling rig and provide control commands to multiple subsystem of the drilling rig, such that sensor data from multiple subsystems may be used to provide control commands to the different subsystems of the drilling rig and/or other devices, etc. For example, a system may collect temporally and depth aligned surface data and downhole data from a drilling rig and transmit the collected data to data acquirers and aggregators in core services, which can store the collected data for access onsite at a drilling rig or offsite via a computing resource environment.

In one or more embodiments, a method can include performing dynamic scheduling of a plan, which can include rescheduling of a plan. In such an example, a plan may be revised at least in part. As an example, a plan can be a well plan or, for example, a portion of a well plan. As an example, various components at various levels of granularity may be configured to continually monitor performance of tasks at a corresponding level of granularity of a component and, for example, update the plan based on state information about the performance of tasks.

As used in the following discussion, components in different levels of granularity may each have an individual plan that is based on the level of granularity. For example, a well plan execution system plan can be an overall plan for a well or entire oilfield while a process manager collection process manages performance of domain plans that can be specific to a respective process of a manager's domain. As an example, a well plan execution system may monitor and schedule tasks at a level that differs from that of an individual process manager level. For example, a well plan execution system may controls the execution of activities by process managers. As an example, a well plan execution system may enable interrelationships between process managers such that, for example, control information due to a delay of one process manager is transmitted to another process manager.

As an example, a plan can be a set of events or activities to be carried out to change the state of a well or a component thereof from a first state to a second state (e.g., a desired state) for the well or component thereof. In such an example, a plan may define, for one or more events: a list of any tasks in the plan that are to precede the task, an action to which the task relates, and a condition for the task. The condition may be, for example, an authorizing precondition detailing criterion that is to happen before the task may be performed, a confirming condition defining when performance of the task is complete, and a failure condition defining when the performance of the task may be in error. For example, the failure condition may be the value of states of oilfield equipment that is indicative of a failure to comply with the plan and a call for rescheduling.

Performing tasks according to the plan may include, based upon a determination that one or more defined predecessor tasks for one or more tasks have been completed, and further starting at least one task of the plan, independently of time, based upon a determination that a pre-authorizing condition has been met. Performance of a task may be continually monitored to check for a failure condition being satisfied, and to check whether any confirming condition is satisfied. In some embodiments, the plan is scheduled according to time. In other embodiments, management of the plan is time independent.

As an example, one or more obstacles may occur in implementation of a plan. Thus, for example, in one or more embodiments, a method may continuously reassess state(s) of a system; regenerate a plan that regenerates a sequence of tasks in a second way (e.g., an optimal way). In one or more embodiments, regeneration can be performed continually taking into account a current state of an oilfield and a second state of the oilfield (e.g., desired state of the oilfield). In some embodiments, regeneration of a plan is performed when a failure condition is determined to exist.

In some embodiments, each portion of a system can be continuously and/or continually reassessed as to its state and a method can include generating a plan based on current state(s) to achieve a desired state for one or more portions of the system. In other words, the process managers of process manager collection, when executing a plan, may continually obtain state information from equipment (e.g., one or more subsystems through the core services) to identify one or more relevant states of the system. If the state information indicates a delay or failure condition, then the corresponding process managers of process manager collection may re-plan to achieve the desired state. For example, the process manager may automatically regenerate the sequence of tasks within the domain or level of granularity of the process manager.

If the re-planning is not possible in a process manager's domain, then re-planning may be elevated to a next level of granularity. For example, the re-planning from a particular process manager's domain may be elevated to the well plan execution system domain (e.g., passed from one level to another level).

As an example, a well planning system may have engineering expertise to make design choices for an overall plan. In such a scenario, a well plan execution system may regenerate a plan optionally without involving the well planning system, for example, as long as the new plan does not substantially alter engineering of the well. In particular, a well plan execution system might track resources that are being used by each of a plurality of process managers, but might not, for example, track one or more individual tasks of each of the plurality of process managers. Thus, when a process manager is re-planning, a well plan execution system might track which resources are available before, during, and/or after re-planning without having data regarding the details of the plan. In some embodiments the same re-planning may be used for multiple process managers and, in in some cases, a well plan execution system. In other embodiments, at least some components of the system may use a different re-planning engine.

In one or more embodiments, dependency information is maintained at various levels of granularity and managed at the various levels of granularity. Thus, if a component performs planning (e.g., re-planning, etc.) that cause a delay in a dependent task, the component may institute a change in the dependent task. If the change is with respect to a different domain, then the component may notify the process manager directly, or notify well plan execution system of the change.

As an example, a method can be a real-time well construction process that includes inference through probabilistic data fusion. Such a method can be implemented as part of a control system, which may be utilized in one or more well construction operations. As an example, such a method may be implemented using one or more of the systems of FIGS. 2, 3, 4, 5, 6, 7, 8 and 9.

As an example, a well construction process automation system can include one or more interfaces that can receive information for tracking one or more of equipment, a wellbore, and a process with a relatively high degree of confidence, which can help to assure for safe and efficient operations.

A system can include circuitry that performs robust state detection. Such circuitry can include a processor and executable-instructions that process information. Such circuitry can operate using one or more models, which may have associated degrees of uncertainty. Such circuitry can operate using information from one or more sensors where such information may include noise, artifacts, etc.

As an example, a control system can utilize information to determine one or more types of bit-rock interactions. For example, such a system can acquire various types of information and process that information to determine status of a bit with respect to rock. Such a status may be a contact status where a bit is interacting with rock via contact between the bit and the rock. As a bit may be tens of meters or hundreds of meters or more in a borehole, bit-rock interactions can be uncertain as definitive sensor measurements may be unavailable. Further, transmission of information acquired by one or more sensors of a drillstring may be affected by various conditions (e.g., movement, fluid flow, pressures, vibrations, quality of transmission medium or media, etc.). As an example, a system can include an interface for acquiring information and circuitry for processing such information in a probabilistic manner to infer a bit-rock interaction, which may be inferred as occurring in real-time.

As an example, a system can receive data and analyze data for well construction state inference, for example, to infer one or more types of bit-rock interaction.

As an example, a system can utilize one or more probabilistic mixture models. A probabilistic mixture model (PMM) can be a trained model (e.g., or trainable model) that is adapted based on input sensor data, for example, for series data, which can include time and/or depth series data. Examples of data can be input sensor data stream from a surface torque sensor and from a hook load sensor. A trained PMM can be adapted in a manner that accounts for noise and suitable priors.

A trained PMM can be utilized in an online system for classification of observations related to an underlying state of operations (e.g. on bottom drilling bit-rock interaction versus off bottom rotating where a bit is not interacting with rock to further a borehole). As an example, a system can provide for multiple classified observables from different types of measurements that can be subsequently fused into states, for example, using a Bayesian network, giving a robust state detection under uncertainty. In such an example, the states can correspond to operational states, which may include different types of operational states for a bit with respect to rock.

In various examples, a system can utilize trained models trained via drilling mechanics knowledge, for example, in the interpretation of classifications (e.g., via PMM approach) as well as in inference generation (e.g., via a Bayesian network model approach).

In various trials, an example system was implemented for a rigsite where the system received real sensor data (hook load and surface torque) for the inference of specified states of bit-rock interaction, including states such as, for example: (a) no interaction, (b) bit fully engaged with formation, and (c) in transition.

In the trials, streaming input data were utilized to continuously learn a probabilistic mixture model (PMM) in a manner that allowed for tracking of levels. For example, hook load can be modeled as a mixture of several distributions that evolve as well construction progresses (e.g., stages of a well, etc.) correlated to a drill string being in slips, out of slips off bottom, or on bottom rotating. Observations inferred from mixture models can include various levels of confidence. A system's implementation of a Bayesian network can allow for fusion of information into a robust system state (e.g., bit-rock interaction, etc.).

As an example, a system can utilize a Bayesian network backed by a mixture model to provide fast, adaptive and robust detection of one or more states from drilling operation time series data with complex temporally correlated patterns. By learning from data and using priors from domain experts, inference features of such a system can optionally be operated without user tuned thresholds or parameters. A system, as being or including a computational framework with appropriate interfaces, can include features for implementing a probabilistic Bayesian approach to characterize and act on uncertainty in drilling systems (e.g., rigsite systems, etc.). Such a system can be extensible in that, for example, additional observations drawn from new types of measurements can be integrated to detect additional states and/or reduce uncertainty in a core set of states.

As an example, a system can operate to extract elementary features from data channels (e.g., raw, filtered, etc.) where the system includes categorical variables with probabilities for each possible value. Such a system can include defined feature types such as, for example, levels and trends. In such an example, the levels can include level states and the trends can include trend states. As an example, level states may be discerned from data using a probabilistic mixture model (PMM) such as, for example, a Gaussian mixture model (GMM). As an example, trend states may be discerned using change detection (e.g., a change detection engine, etc.). As an example, a system can provide for fusion of extracted features to infer one or more "hidden" states, which can include one or more states that are not readily observable. For example, consider a state of a bit that is defined with respect to material such as rock of a formation that is being drilled into as part of a construction process that forms a well where the well can be utilized for injection and/or production of fluid (e.g., liquid and/or gas).

Figure 25:
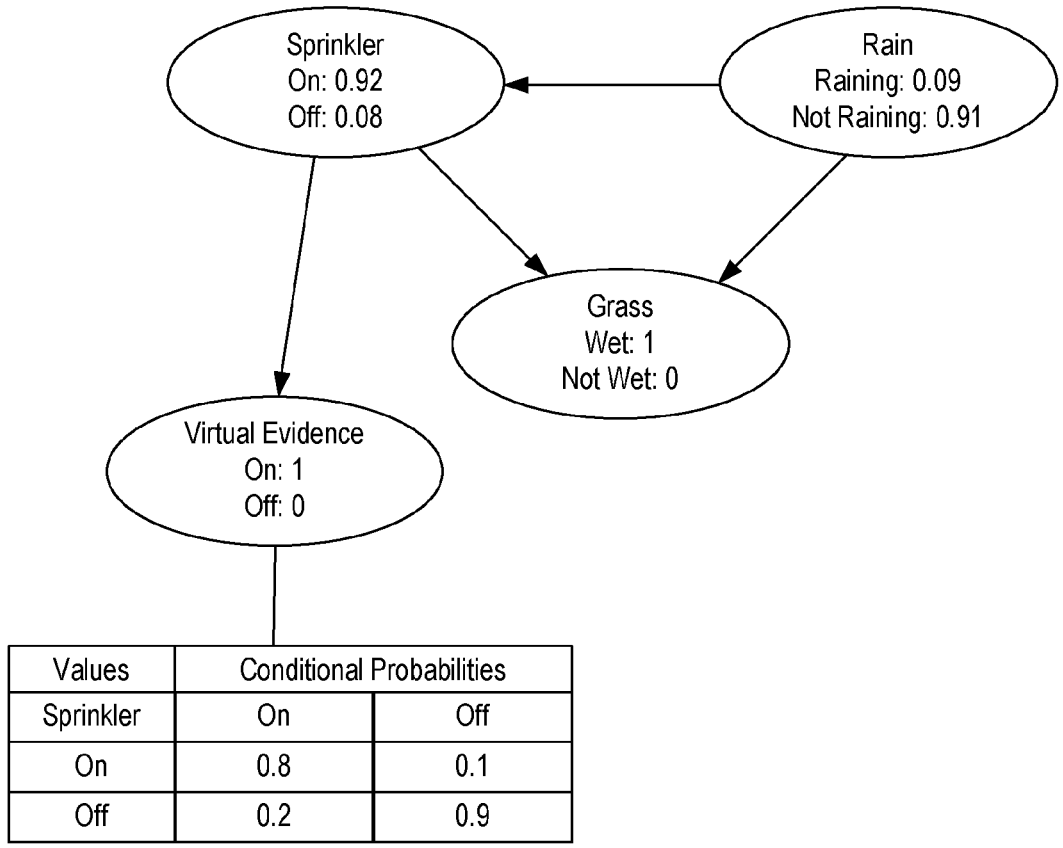
FIG. 25 illustrates an example of a method that includes a Bayesian belief network.

As an example, a system can utilize levels modeled via a GMM, trends detected via a change detection engine, a domain modeled as a Bayesian network (e.g., a Bayesian Belief Network or BNN) that can provide for fusion of information as evidence where feature probabilities are used through a "virtual" evidence paradigm (see, e.g., FIG. 25). As an example, so-called "hard" evidence can for levels (e.g., as analyzed via one or more GMMs) and, for example, so-called "virtual" evidence can be through trends as probabilities such as, for example, a probability of being on-bottom as determined from drillstring movement (e.g., and/or being off bottom) and a probability of a trend as to a block position (e.g., decreasing, stationary, or increasing). As an example, one or more probability tables may be utilized where information therein may be based at least in part on domain expertise (e.g., expert knowledge, etc.) and/or via refinement in a BBN model and/or via statistical learning of probability tables.

In a BNN, beliefs can be defined as the probability that a variable will be in a certain state based on an addition of evidence in a current situation. A special case of beliefs are the a priori beliefs that are based solely on prior information. A priori beliefs can be stored in data structures in a computational system as one or more conditional probability tables (e.g., or other format). Evidence can be defined as being information about a current situation. As an example, a BNN method can consider as evidence a definite finding that a node X has a particular value x (e.g., X=x). This kind of evidence often can be referred to as specific evidence or hard evidence. For example, in the context of medicine, suppose that the patient has flu, then it would be Flu=True, which is specific evidence. On the other hand, the evidence might be simply a probability distribution over the node X. For example, suppose a doctor is not completely sure whether the patient has an allergy or not. The doctor, through expert knowledge in the doctor's domain, thinks that the patient has an allergy but the doctor is approximately 70 percent sure as to that thought. Such evidence in a BNN can be referred to as virtual evidence (e.g., or likelihood evidence or soft evidence). Virtual evidence may be defined as a generalization of standard evidence (e.g., hard evidence) in a BNN. Virtual evidence may be specified when a specific state of a discrete variable is unknown, yet information exists about chances of the discrete variable being in particular states.

Virtual evidence can be defined to be a probability of evidence. Virtual evidence can be utilized for incorporating uncertainty of evidence into a BNN. For example, virtual evidence can be included by adding a virtual evidence node as a child of a regular evidence node in a network (see, e.g., child node in FIG. 25 and associated conditional probabilities). In such an example, evidence can be set as virtual evidence on a virtual evidence (VE) child node rather than on its parent node directly. This virtual evidence may be set via a conditional probability table for the VE child node. As the VE child node is a descendant of its parent node, Bayesian inference can be utilized to update the probability of the parent node. For example, consider a weather scenario where a node Cloudy includes a child VE Cloudy. In such an example, virtual evidence can be set as Cloudy=0.75 and not Cloudy=0.25, then a probability can be calculated P(Cloudy|VE Cloudy) as follows (P(VE Cloudy|Cloudy) P(Cloudy)/P(VE Cloudy). The parent node Cloudy may be in a graph with another node, Rain where Cloudy can influence Rain.

As an example, a computational framework can include one or more data structures that include one or more probabilities (e.g., probability tables, etc.) that store values that may be based on expert knowledge (e.g., one or more drillers, etc.). While expert knowledge is mentioned, such a system may include one or more data structures with such one or more probabilities that are estimates, which may be based on information of a database from offset wells, information from a collection of operational personal, information based on one or more physical models, etc. As an example, virtual evidence may be provided as to one or more pieces of equipment such as one or more sensors where output may be uncertain, noisy, etc. For example, uncertainty of a value output by a sensor can be characterized via one or more conditional probabilities, which may be associated with a child node as a VE node that has a corresponding parent node. Such uncertainty may be determined via operation of the sensor in controlled conditions and in situ during one or more field operations and/or in controlled conditions that mimic in situ conditions. An analysis of performance may demonstrate that a probability can be assigned to a value for one or more in situ conditions that can occur during field operations. Such a probability may be specified in a data structure as associated with a virtual evidence (VE) node that has an associated parent node.

As an example, virtual evidence can be utilized to handle observation uncertainty drawn for instance from noisy sensors or indirect measurements. As an example, rig sensor data can be utilized to compute virtual evidence (e.g., as one or more child nodes, etc.) for variables such as, for example, on-bottom from drillstring movement and block position trend.

Figure 10:
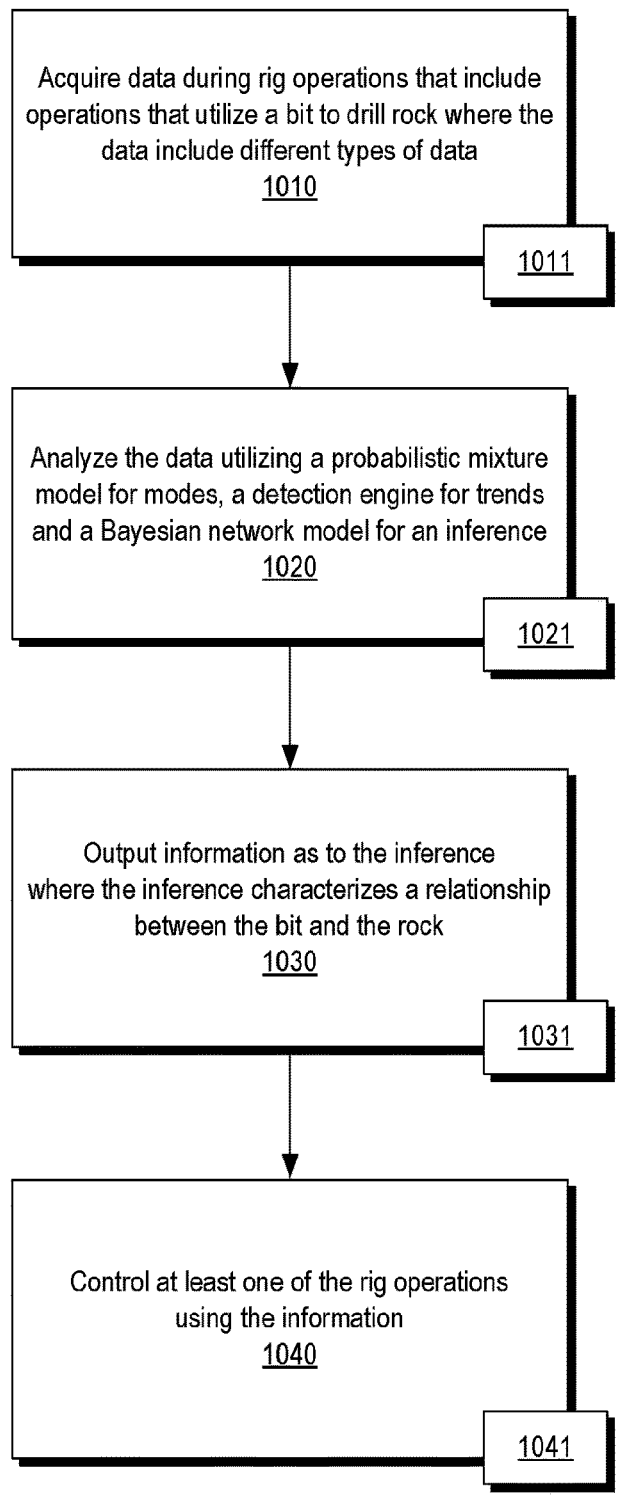
FIG. 10 illustrates an example of a method.

FIG. 10 shows an example of a method 1000 that includes an acquisition block 1010 for acquiring data during rig operations that include operations that utilize a bit to drill rock where the data include different types of data; an analysis block 1020 for analyzing the data utilizing a probabilistic mixture model for modes, a detection engine for trends and a Bayesian network model for an inference; and an output block 1030 for outputting information as to the inference where the inference characterizes a relationship between the bit and the rock. The method 1000 can also include a control block 1040 for controlling at least one of the rig operations using the information. As mentioned, a system can include one or more interfaces that can acquire one or more types of data, which can include series data such as time and/or depth series data.

The method 1000 is shown in FIG. 10 in association with various computer-readable medium (CRM) blocks 1011, 1021, 1031, and 1041. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1000. As an example, a CRM block can be a computer-readable storage medium that is non-transitory, not a carrier wave and not a signal. As an example, such blocks can include instructions that can be stored in memory such as the memory 794 of the system 790 and can be executable by one or more of the processors 793 of the system 790. As an example, the method 1000 may be performed in a system such as one or more of the systems of FIG. 2, FIG. 3, FIG. 4, FIG. 5, FIG. 6, FIG. 7, FIG. 8, FIG. 9, FIG. 11, FIG. 15, FIG. 26, FIG. 29 or FIG. 30.

Figure 11:
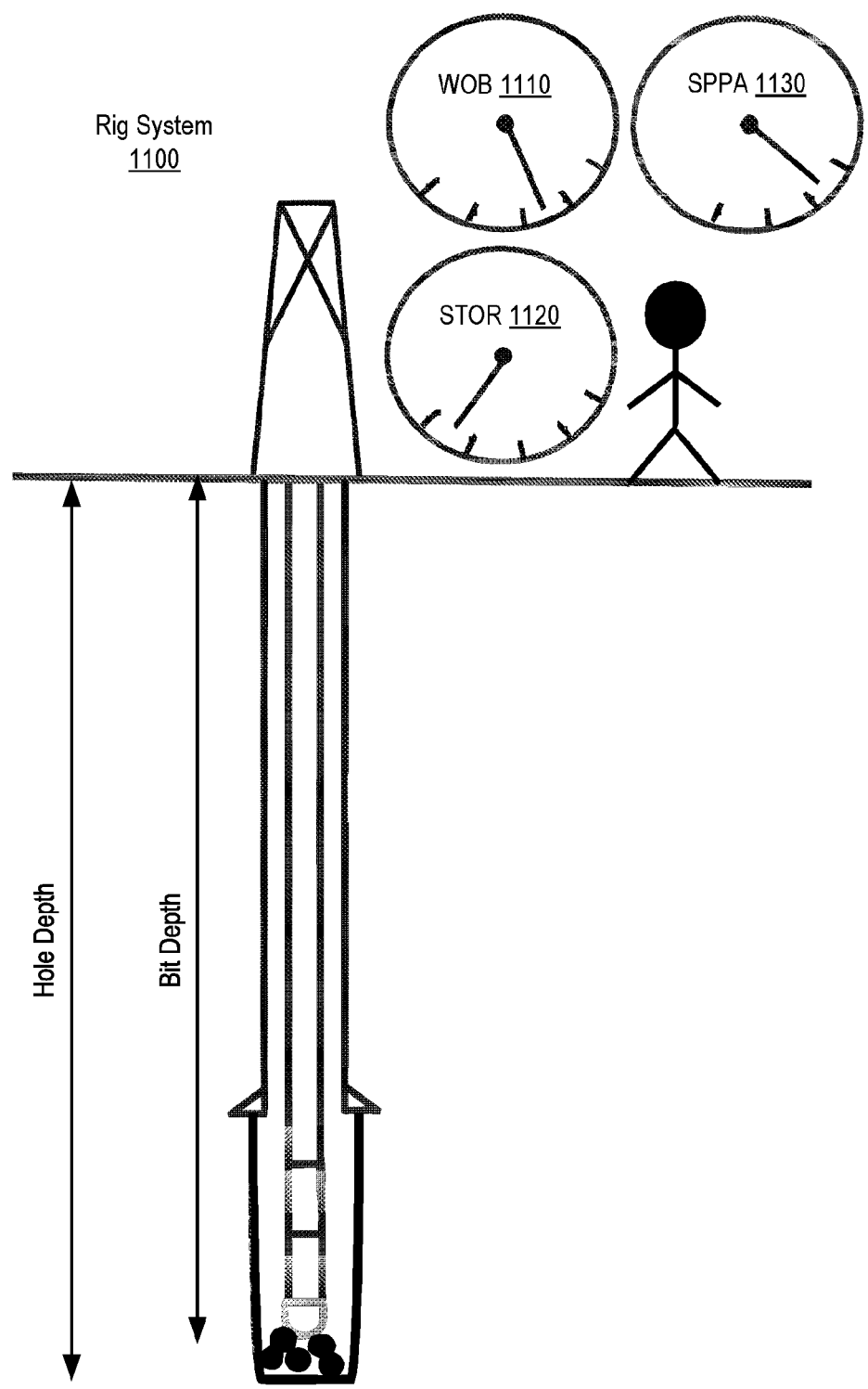
FIG. 11 illustrates an example of a system.

FIG. 11 shows an example of a rig system 1100 that includes a rig that can be utilized to perform operations that utilize a bit to drill rock. In the example of FIG. 11, a substantially vertical system is illustrated with a hole depth and a bit depth. Where the bit depth is equal to the hole depth, the bit can be in contact with the bottom of the hole (BOH). However, contact can occur with or without weight (e.g., weight on bit or WOB) and can occur with or without rotation of the bit (e.g., bit rotation or BR). As an example, an operation can include moving a bit closer to the bottom of the hole and an operation can include moving a bit away from the bottom of the hole.

In the example of FIG. 11, the rig system 1100 includes various sensors that can receive signals and covert the signals to digital data, which can be transmitted, for example, as a data stream. In such an example, a data stream can be a stream of real-time data. For example, as the weight on bit (WOB) changes during a drilling operation, the data stream can be a time series of data that includes values that vary over time correspondingly as the WOB varies.

As an example, consider a measurement of weight made with a hydraulic gauge attached to a dead line of a drilling line. As the tension increases in the drilling line, more hydraulic fluid is forced through the gauge, turning the hands of the indicator, causing a digital response, etc. The weight that is measured tends to includes substantially everything exerting tension on the drilling line, including the traveling block(s) and the drilling line itself. Hence, to have an accurate weight measurement of a drillstring, the driller can make a zero offset adjustment to account for the traveling block(s) and items other than the drillstring. With adjustments, the indicated weight will represent the drillstring (e.g., drillpipe and bottom hole assembly (BHA)).

During drilling operations, a driller may be interested in the measured weight for one or more operations. As mentioned, the weight of interest can be the weight applied to the bit on the bottom of the hole (WOB). As an example, a driller can take the rotating and hanging off bottom weight, say 136,200 kg, and subtract from that the amount of rotating on bottom weight, say 113,500 kg, to get a bit weight of 22,700 kg. Various rigs can include a weight indicator that has a second indicator dial that can be set to read zero ("zeroed") with the drillstring hanging free, where the second indicator dial works backwards from the main indicator dial. After proper zeroing, a weight set on bottom (that takes weight away from the main dial), has the effect of adding weight to this secondary dial, so that the driller can read weight on bit directly from the dial.

As may be appreciated, weight on bottom (WOB) can be approximate. Factors such as friction, fluid, debris, buoyancy, etc. can have effects on WOB measurements (e.g., as scalar values), stability of WOB measurements, etc. Hysteresis can exist such that WOB measurements differ depending on a direction of a drillstring moving in a hole. For example, moving in a direction of gravity may result in different time series data than moving in a direction contrary to gravity.

During the drilling process, a driller can seek to identify the state of a bit engaging with the bottom of the hole, which can involve use of more than one type of measurement, which can be via different types of sensors of a rig system. As an example, a driller may think that a bit is on bottom, engaging with rock on the bottom of a whole. As an example, one or more thoughts of a driller as to one or more operational conditions, etc., may be specified quantitatively in the form of one or more probabilities (e.g., as one or more data structures).

As an example, a surface hookload measurement can drop as soon as the bottom of the hole is engaged with the bit and the surface torque measurement can show an increased torque demand as the bit interacts with a formation (e.g., rock) and, if there is a downhole motor, surface pressure can increase, signaling an increase in differential pressure as the motor drills away. Such physical indicators can be present on the rig floor with relatively adequate fidelity and provide a sense of awareness for the driller that the equipment being operates is operating to crush through rock and make steady progress drilling ahead. The way a driller infers an operational state as being one of on or off bottom is generally through experience and with some amount of uncertainty as one or more transition states can exist between the two states of on and off bottom.

An approach to infer that the bit is on bottom can be by utilizing bit depth and hole depth measurements. A system can infer that the bit is on bottom whenever the depth tracking system observes the bit depth and hole depth measurements to be equal within a small tolerance. Such an approach can be sufficient for depth tracking, but it tends to lack the additional breadth of indicators if an automated system (e.g., or semi-automated system) is to identify drill on or drill off periods. Thus, to implement control (e.g., some degree of automation), a more complex state detection system can be implemented that accounts for states in addition to the states of the bit being on or off bottom.

As an example, a method can provide for robust state detection using a Gaussian mixture model (GMM) for clustering in combination with other indicators fused within a Bayesian belief network (BBN), to identify a state of a bit as it transitions from being off bottom in a wellbore to a ramp up of engagement with a formation and sustaining an intended weight on bit to drill ahead. The result of such a state detection approach can provide a binary answer of either being off or on bottom and can also infer transition states that can be leveraged for future state detection algorithms.

As mentioned with respect to the method 1000 of FIG. 10, a method can include analysis via a probabilistic mixture model and a Bayesian network model. For example, a method can include making state estimations based on the extraction of elementary observed pieces of information from sensed data and the fusion of these observations as a combined answer for a "hidden" state in question. For example, a hidden state can be a bit-rock interaction state.

A particular example of a PMM is a Gaussian mixture model (GMM), which can be utilized for learning and classification of signal levels. A method can also utilize a change detection method for learning and classification of signal trends. As an example, a method can include fusing of learned level states and trend states with additional observations for hidden state inference. In such an approach, level states can be states associated with physical conditions that are influenced by bit-rock interaction(s) while trend states can be states associated with physical conditions that directly influence bit-rock interaction(s). In such an approach, the bit-rock interaction(s) are "sandwiched" between physical conditions that can cause bit-rock interaction(s) and physical conditions that can be results of bit-rock interaction(s). As an example, a block position can be input for a trend state (e.g., with states decreasing, stationary and increasing) and hookload levels can be input for a level state (e.g., with states of in slips, off bottom and on bottom). In such an example, bit-rock interactions can be represented as states including, for example, ramping up, fully engaged, ramping down and no interaction.

As mentioned, a PMM may be utilized to learn and classify states where such a PMM can be a GMM. A Gaussian mixture model is a probabilistic model that assumes that observed data points are generated from a mixture of a finite number of Gaussian distributions which can include unknown parameters.

Below is an Example of a Univariate Model for a GMM:

$$p(x) = \sum_{i=1}^{k} \phi_i \mathcal{N}(x \mid \mu_i, \sigma_i) \tag{1}$$

$$\mathcal{N}(x \mid \mu_i, \sigma_i) = \frac{1}{\sigma_i \cdot \sqrt{2\pi}} e^{\left(-\frac{(x-\mu_i)^2}{2\sigma_i^2}\right)} \tag{2}$$

$$\sum_{i=1}^{k} \phi_i = 1 \tag{3}$$

Figure 12:
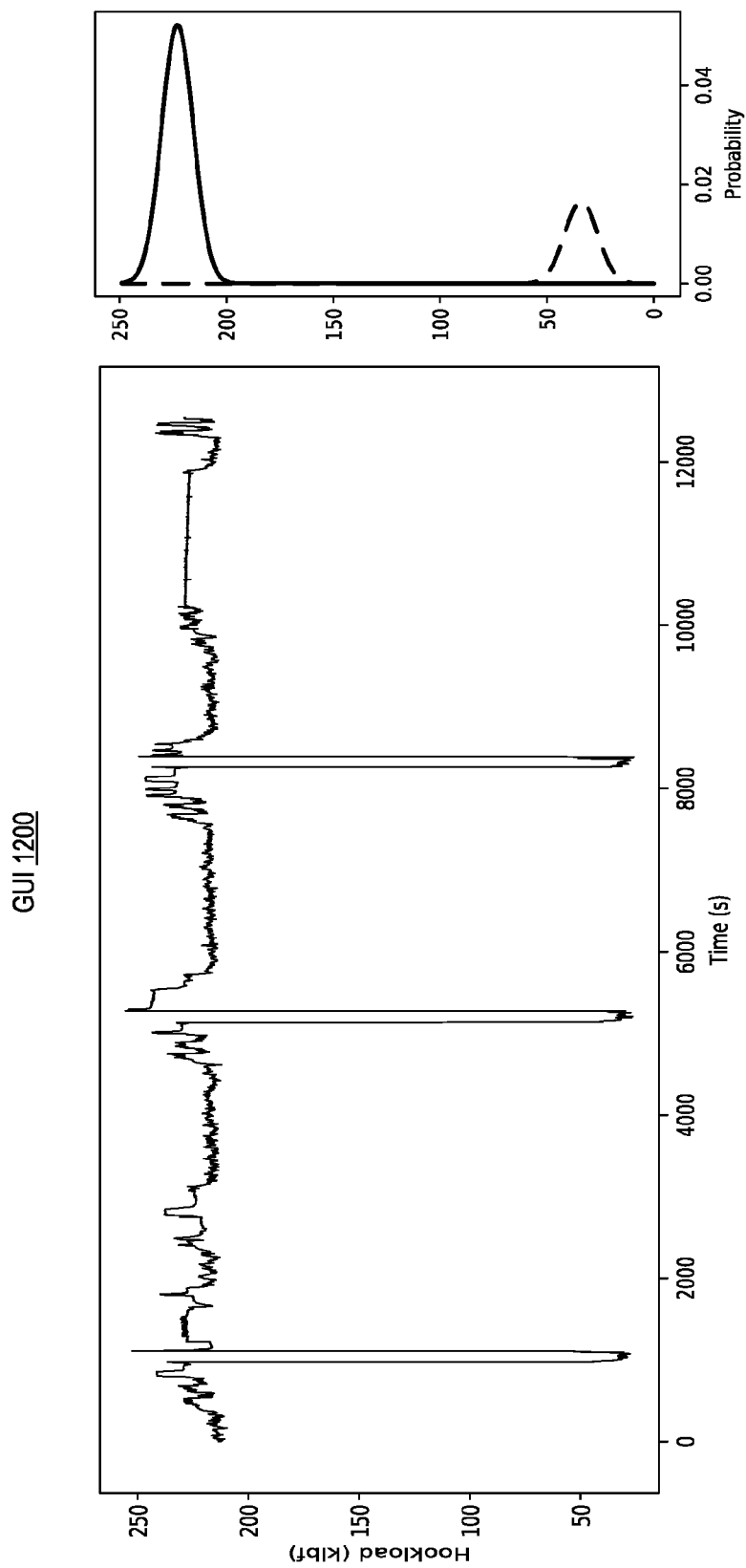
FIG. 12 illustrates an example of a graphical user interface.

FIG. 12 shows an example graphical user interface (GUI) 1200 that includes plots of hookload data (e.g., as a data stream, etc.) and of distributions that can be defined via distribution equations such as a Gaussian distribution equations as in a GMM. In the example of FIG. 12, a method can include receiving the hookload data and generating the distributions, which can be part of a GMM learning process that involves learning multiple distributions where the multiple distributions are associated with multiple states. In the example of FIG. 12, the states are relatively distinct and give rise to Gaussian distributions with different means and different standard deviations (e.g., parameters that can define a Gaussian distribution).

More specifically, FIG. 12 shows a univariate Gaussian mixture model with two clusters or modes (e.g., a multi-modal distribution within the hookload data). The two clusters or modes are Gaussian kernels of data, as shown in the hookload data plot. One cluster or mode is for a Gaussian distribution around 100 kkgf, while the other cluster or mode is for a Gaussian distribution around 20 kkgf (scaled up 10 times for better visualization). Thus, through GMM learning, two states can be discerned from the hookload data, which may be a live data stream, previously acquired data, etc. As an example, a GMM learning process may occur in real-time based on real-time data streamed to a system. In such an example, a GUI may be rendered to a display such as the GUI 1200 that includes a plot of the data and a plot of a distribution of the data where evidence of multiple modes may appear to indicate that evidence of multiple states exists in the data. In such an example, a user may view the modes as they evolve (e.g., come into existence, change, etc.) over time as operations are occurring at a rig site (e.g., or rig sites).

Given a univariate model's parameters, the conditional probability that a data point x belongs to cluster $C_i$ is:

$$p(C_i \mid x) = \frac{p(x, C_i)}{p(x)} = \frac{p(x \mid C_i)p(C_i)}{\sum_{j=1}^{k} p(x \mid C_j)p(C_j)} = \frac{\phi_i \mathcal{N}(x \mid \mu_i, \sigma_i)}{\sum_{j=1}^{k} \phi_j \mathcal{N}(x \mid \mu_j, \sigma_j)} \quad (4)$$

In the equations (1) to (4),
$\mathcal{N}(x \mid \mu_i, \sigma_i)$ is the probability density function of a Gaussian distribution with mean $\mu_i$ and standard deviation $\sigma_i$, and
$\phi_i$ is the weight of cluster $C_i$ in a GMM.

The use of Gaussian mixture model is an example of an approach that provides a computational framework for classifying a hidden state (or hidden states) of a system by modeling observation samples as drawn from a Gaussian, which can vary over time depending on hidden state(s). For example, during rotary drilling, torque (e.g., surface torque level) may be modeled as no rotation, off bottom rotation and on bottom rotation where these are deemed to be a set of predefined hidden states. In such an example, torque data (e.g., surface torque or STOR) can be analyzed (e.g., via a GMM) such that each of these states can be identified (e.g., analysis by "observing" the torque data stream).

Figure 13:
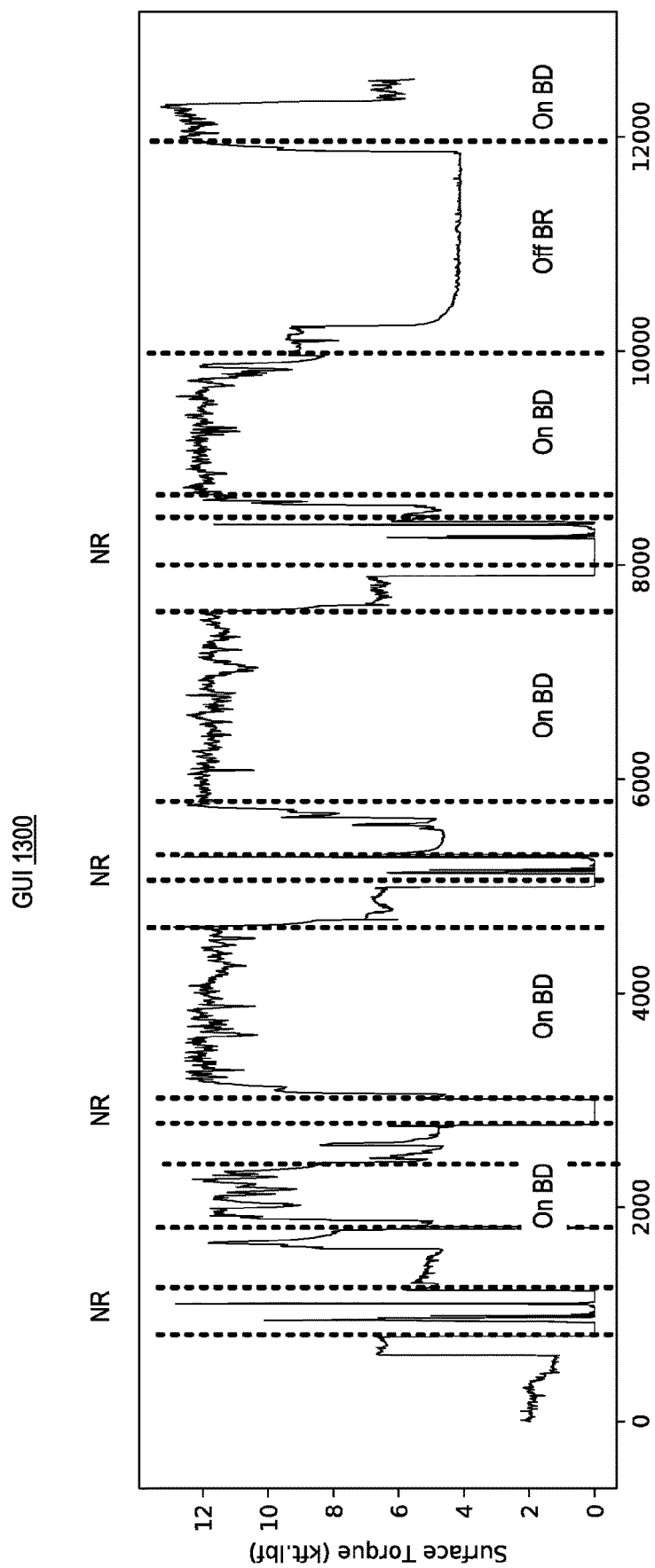
FIG. 13 illustrates an example of a graphical user interface.

FIG. 13 shows an example GUI 1300 of surface torque data versus time where a GMM approach has been applied for learning different states as being associated with a plurality of individual distributions, defined as individual Gaussian distributions. As shown in FIG. 13, states include not rotating (no rotation or NR), on bottom drilling (On BD), and off bottom rotation (Off BR). The NR state can be an in slips state. The GUI 1300 shows transitions from one state to another state as well as multiple occurrences of each of the states over the period of operational time. In particular, transitions are as follows from Off BR to NR, to Off BR, to On BD, to Off BR, to NR, to Off BR, to On BD, to Off BR, to NR, to Off BR, to On BD, to Off BR, to NR, to Off BR, to On BD, to Off BR, to On BD. In such an example, a hole may become deeper where the On BD state is occurring. The time periods of On BD can be analyzed for purposes of torque in relationship to formation being drilled into, which may provide information as to type of formation and/or one or more other conditions being experienced during On BD. The data in the GUI 1300 can be analyzed for non-productive time (NPT) where operations are not making a contribution to penetration such that rate of penetration (ROP) is decreased.

A Gaussian mixture model can work with a data stream incrementally for classifying states from a learned model. As to handling learning of a GMM from a data stream incrementally, a method can include performing various actions, which may include making an assumption that the individual means of individual different states evolve over time with gradual rather than abrupt changes. As mentioned, a mean can be a parameter of a Gaussian distribution and a GMM can include multiple individual means for corresponding multiple individual distributions.

Example Pseudocode Sequential Learning and Prediction Using GMM:

---

Initialize: Define an initial GMM by (i) Number of clusters: k, (ii) Cluster
means: p and (iii) Cluster variances: σ (iv) Cluster weights: w. Empty buffer for learning: B
Function: Predict -continued Parameters: Data point to classify x
    Given an existing GMM (w, μ, σ)
    For each Cluster C in GMM (w, μ, σ)
        Use Equation (4) to compute probabilities of membership of data point to C
    End For
    Update B with new data point
    If B is full
        UpdateGMM(B)
        Empty(B)
    End If
    Return computed probabilities
Function: UpdateGMM
    Parameters: Buffer of points to update GMM: B, GMM (w, μ, σ)
    For each bin B
        Update means: μ, variances: σ, cluster weights: w using Equations 1, 2, and 3
    End For

---

In the foregoing example pseudocode, a computational framework can implement a memory storage device with a data buffer, as represented by B. Such a buffer can be implemented for buffering of points to update a GMM. For example, an update can be to one or more parameters of a GMM that correspond to one or more distributions. As an example, a distribution can be a prior distribution (e.g., a Gaussian with a mean, variance, etc.) or a newly evolving distribution.

As an example, a distribution may diminish in time such that the corresponding state is no longer a part of a GMM. As an example, a noise or other type of threshold criterion may be utilized for determining when a distribution is to be "recognized". For example, a distribution may be deemed viable when a certain number of data points have been processed as giving rise to the distribution. As an example, a forgetting factor may be applied, which may expedite deletion of an old distribution that is unlikely to occur again, which may help to diminish confusion between a relevant distribution and an old distribution that is no longer relevant. As an example, where a distribution has not been added to for a period of time (e.g., days or week(s)), that distribution may be diminished and/or deleted in one or more manners, which can reduce a number of states, which can simplify operation of a state-based computational framework (e.g., a computational state machine), which may be part of a control system.

As an example, a method can include learning and classifying states via change detection method. For example, consider a computational framework that utilizes a change detection engine on a plurality of single data channels to learn an underlying model for measurements of interest, and to generate real-time probabilities for a signal of a single data channel to increase, decrease or remain stationary. For example, as mentioned, block position can be a type of data that can trend such that it can be defined as decreasing, stationary or increasing. As an example, a method can be implemented for change detection optionally without utilization of a predefined window size(s), which can result in a full range of segment sizes being appropriately identified. In other words, a method can operate without a priori information as to what is a window size.

Figure 14:
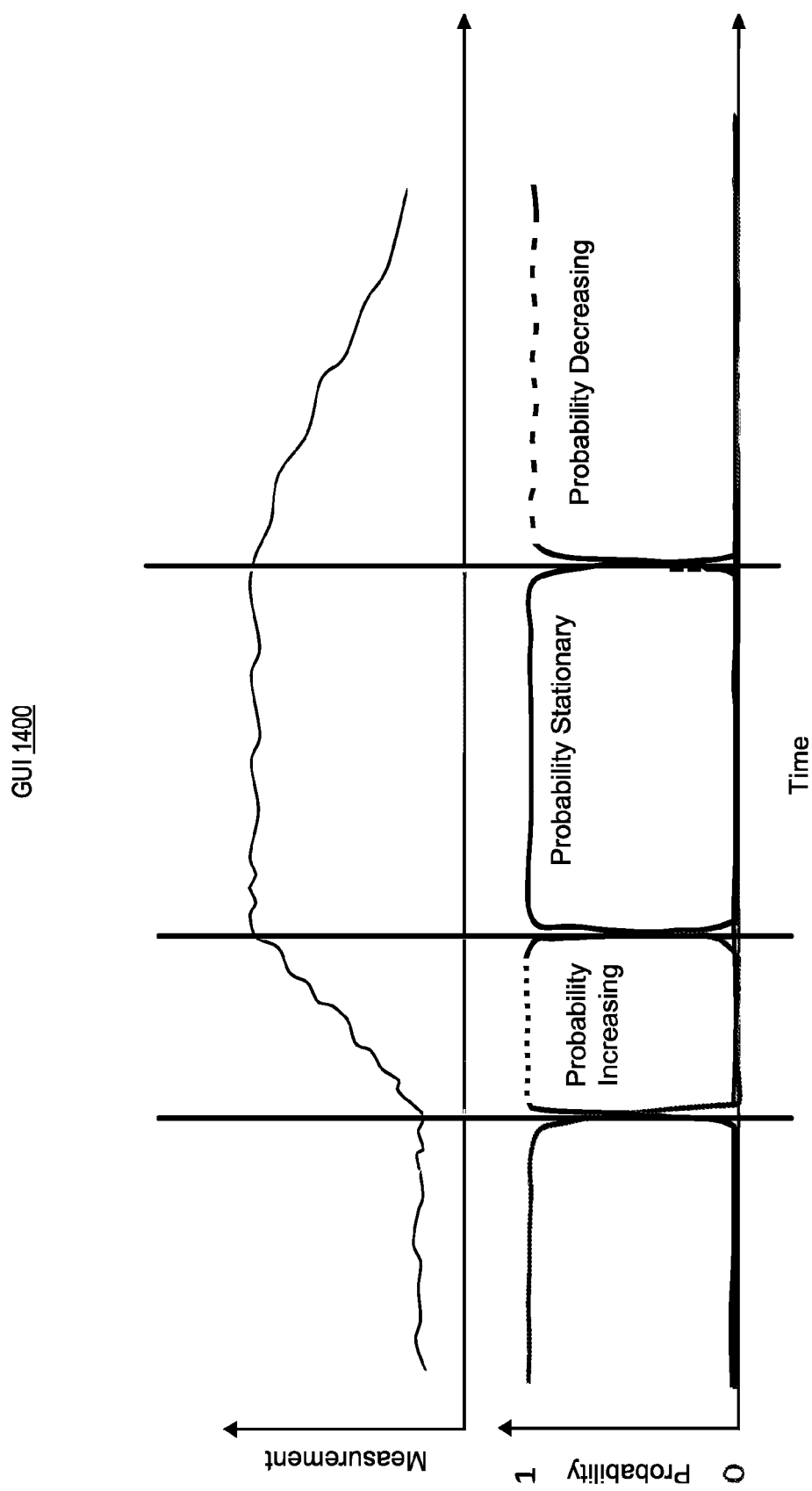
FIG. 14 illustrates an example of a graphical user interface.

FIG. 14 shows an example of a GUI 1400 that includes a plot of sensor data and a plot of probabilities as to some examples of trends, which include stationary (e.g., probability of being stationary), increasing (e.g., probability of increasing) and decreasing (e.g., probability of decreasing). A change detection method can include acquiring data, which can be live streaming data during an ongoing rig operation. For example, the measurement in the GUI 1400 can be block position where the method detects probabilities of behavior of the block, which are associated with actions that can have a direct effect on bit-rock interaction(s). As shown in FIG. 14, the measurement has a high probability of being stationary, which is followed by an increasing probability of increasing (e.g., with a decrease in probability of being stationary), followed by a trend toward a return to being stationary where the scalar value of the measurement is not the same as the prior period of time where the scalar value of the measurement provided a high probability of being stationary. As shown in the example of FIG. 14, probabilities as to trends can be independent of absolute values of measurements and can, rather, be based on changes in the values of the measurements with respect to time (e.g., consider a derivative, a slope, a difference between two scalars, a changing mean value, etc.).

As an example, a system can include learning various states using sensor data and fusing learned states, which can include processing of one or more other observations (e.g., data from a rig operation, rig operations, etc.). As an example, a fusion process can implement a Bayesian belief network, which may be a single network or a network that includes sub-networks. A Bayesian belief network is an example of a type of Bayesian network.

As an example, a Bayesian network can include weights where the weights are associated with sensor data acquired from equipment such as equipment in a field that performs one or more field operations. For example, a Bayesian network can include weights that are applied to data-based numbers where the data are acquired from equipment at a rigsite, which can include surface and downhole equipment.

In terms of an arc of a graph of a network (e.g., directed acyclic graph (DAG), etc.), an individual arc may have a weight or value associated with it, indicating a strength of interaction between nodes that the arc connects. The nature of such a weight can be application dependent. For example, it may represent a cost associated with a particular action, the strength of a connection between two nodes or, in the case of probabilistic models, the probability that a particular event will occur. As an example, a Bayesian belief network (e.g., a Bayesian network) can be conducive to understanding a scenario or scenarios as they can be constructed such that a parent(s) of a variable can be a direct cause (e.g., toward a state, of a state, etc.). Such an approach can help to facilitate a process of determining weights for arcs that connect nodes of a network (e.g., assessment of conditional probabilities, etc.). As mentioned, an approach can, for example, include accounting for results, which may be conditions, behaviors, etc., that are a consequence of a state or states, which may be evidenced, in some instances, during a transition to a state or states. As an example, a Bayesian network can be formulated with factors that have a direct effect on a state or states and with factors that are influenced by such a state or states (e.g., or temporal transition(s) thereto).

As an example, a Bayesian network can be implemented as part of a computational framework that includes one or more interfaces (e.g., one or more network interfaces, etc.) that can receive data acquired at one or more sites such as one or more rigsites. As an example, a computational framework can include one or more processors, memory, interfaces, etc. As mentioned, a computational framework can include receiving data, which may include sensor data from one or more sensors. As an example, a computational framework can provide for sensor fusion utilizing at least in part a Bayesian network (e.g., or Bayesian networks).

Sensor fusion refers to a class of problems where data from various sources can be integrated to arrive at an interpretation of a situation (e.g., a scenario). For example, data from various rigsite sensors, which may be for different sampling rates, different data formats, different units, etc., can be integrated to determine a status of one or more rigsite operations, which may include one or more operations that are associated with drilling. As an example, a sensor fusion approach may include receiving data from a plurality of sensors where a state can be discerned for a system by integrating at least a portion of the received data.

As an example, parameters of a Bayesian network may be tuned as one or more conditional probability tables, which may be relative weights of the Bayesian network. In such an example, data can be used to tune parameters where the parameters have physical meaning as they refer to input indicators.

As an example, a computational framework may include one or more analysis engines. As an example, an analysis engine can include one or more features of the APACHE STORM engine (Apache Software Foundation, Forest Hill, Md.). As an example, a method can include implementing a topology that includes a directed acyclic graph (DAG). For example, the APACHE STORM application can include utilization of a topology that includes a DAG. A DAG can be a finite directed graph with no directed cycles that includes many vertices (e.g., nodes) and edges, with each edge directed from one vertex to another, such that there is no way to start at any vertex v and follow a consistently-directed sequence of edges that eventually loops back to v again. As an example, a DAG can be a directed graph that includes a topological ordering, a sequence of vertices such that individual edges are directed from earlier to later in the sequence. As an example, a DAG may be used to model different kinds of information. As another example, an analysis engine can include one or more features of the NETICA framework (Norsys Software Corp., Vancouver, Canada), which includes features that generate and use networks to perform various kinds of inference where, for example, given a scenario with limited knowledge, appropriate values or probabilities may be determined for unknown variables. As yet another example, an analysis engine can include one or more features of the TENSOR FLOW (Google, Mountain View, Calif.) framework, which includes a software library for dataflow programming that provides for symbolic mathematics, which may be utilized for machine learning applications such as artificial neural networks (ANNs), etc.

Figure 15:
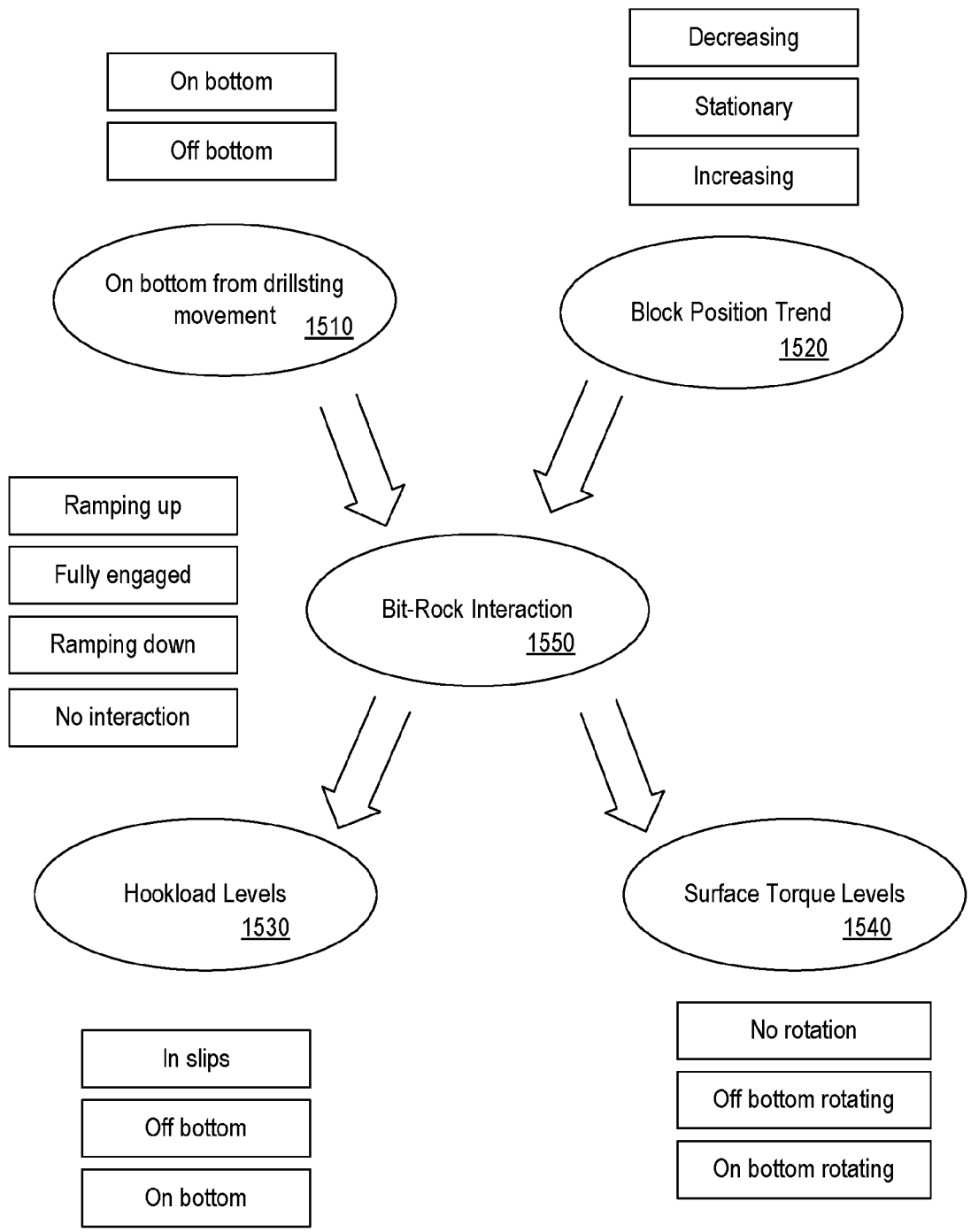
FIG. 15 illustrates an example of a system.

FIG. 15 shows an example of a system 1500 that includes an arrangement of features with respect to bit-rock interaction, which can be associated with states such as, for example, ramping up, fully engaged, ramping down and no interaction. Such an arrangement can be or be part of a Bayesian network that is defined to perform inference on bit-rock interaction. Such inferences can be to one or more of the states, which can be or include exclusive states in that where bit-rock interaction is of one state, one or more other states can be excluded.

In the system 1500, random variables include: set 1510 defined as on-bottom from drillstring movement: is either on or off bottom, and is computed based on block position movements while the drillstring is not in slips; set 1520 defined as block position trend: represents the block position movement dynamic, either going downwards (decreasing), upwards (increasing) or stationary; set 1530 defined as hookload levels: represents the hookload magnitude related to particular states: in slips, off bottom, on bottom; set 1540 defined as surface torque levels: represents the surface torque magnitude related to particular states: no rotation, off bottom rotating, on bottom rotating; and set 1550 defined as bit-rock interaction: represents the interaction between the drill bit and the rock at the bottom of the hole; can be: ramping up (i.e., weight on bit increasing), ramping down (i.e., weight on bit decreasing), fully engaged (weight on bit reached plateau value suitable for drilling), or no interaction.

As an example, rig sensor data can be used to compute virtual evidence (e.g., for various nodes not shown in FIG. 15), for example, as to the first two sets of variables listed (1510 on-bottom from drillstring movement and 1520 block position trend). On the other hand, the bit-rock interaction variable set 1550 can be defined to be unobserved (e.g., "hidden") and hence demand inference computations to get a posteriori probabilities of each possible state. As mentioned, a graph can include nodes (e.g., vertices) that can include parents and children. As mentioned, a virtual evidence (VE) node can be a child and can include an associated conditional probability data structure.

As to the edges of the arrangement of the system 1500 (e.g., which can be a portion of a larger network, etc.), and their directions, consider that the on-bottom state from drillstring movement as well as the block movement have a direct impact on the bit-rock interaction state. Specifically, on-bottom will favor states where the bit interacts with the formation (e.g., ramping up/down and fully engaged); whereas, off bottom will induce the no interaction state. Further, a block going down (lowering) is a favoring factor for either a ramping-up for interaction or fully engaged state; whereas, a block going up (raising or ramping-down) indicates impending off bottom condition; noting that a stationary block will also have a ramping-down effect. Finally, the bit-rock interaction state itself has an influence on the hookload and surface torque magnitude, hence the opposite edge direction. Specifically, a fully engaged bit tends to favor on bottom levels (rotating or not); whereas, other bit-rock interaction states will favor off bottom or in slips states measurement readings.

Examples of trial results are presented herein that utilize a drilling data set that includes hookload, surface torque and block position sampled at a rate of 1 second. The data set includes over 12000 data points.

Figure 16:
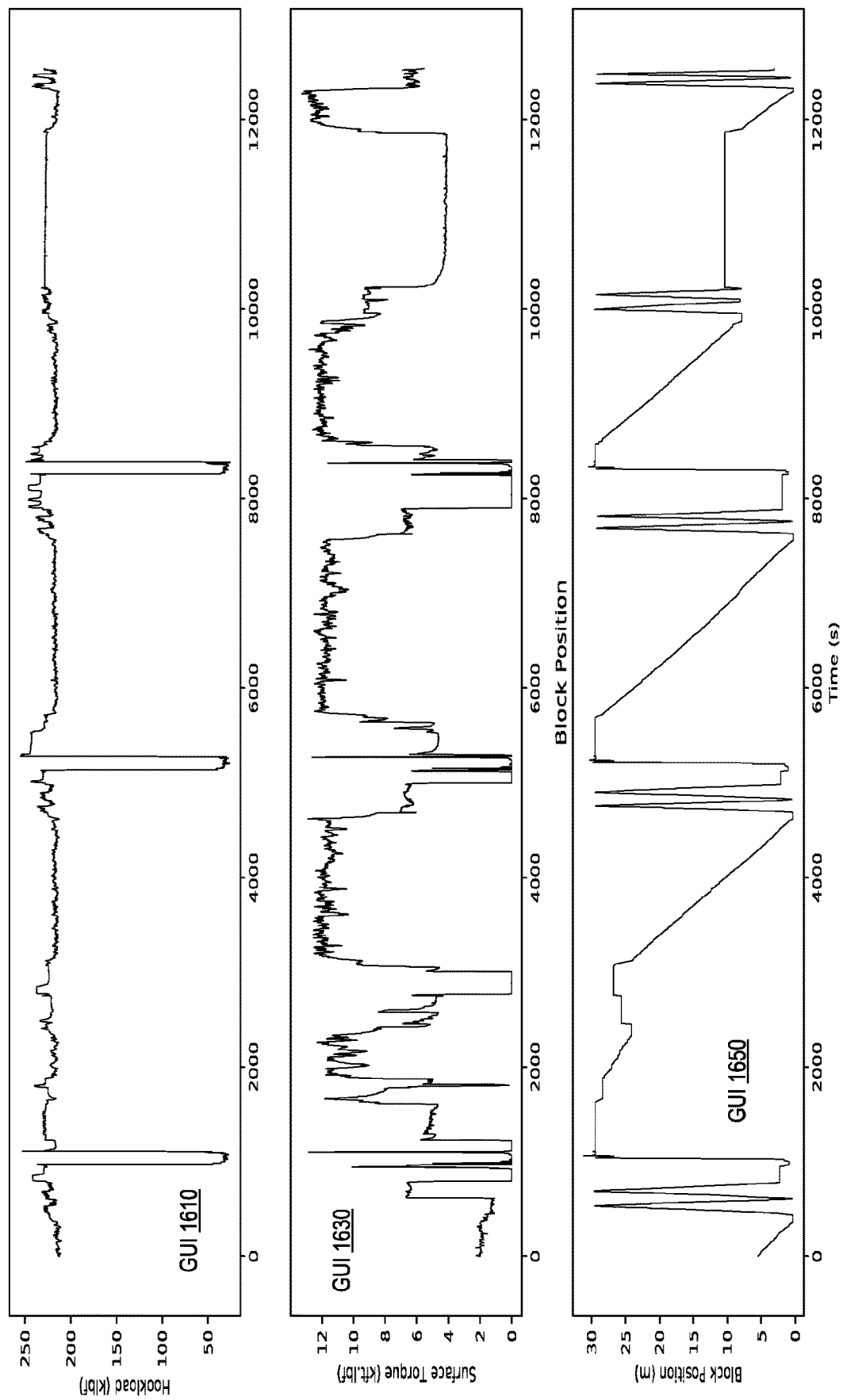
FIG. 16 illustrates examples of graphical user interfaces.

FIG. 16 shows example GUIs 1610, 1630 and 1640 of data, which may be GUIs that are rendered to a display or displays in real-time during ongoing operations. In such an approach, a user may view the multiple channels of data as operations are being performed. GUIs can be rendered via execution of instructions stored in memory of a device or devices where such instructions can be executable by one or more processors (e.g., CPU(s), GPU(s), core(s), etc.).

As to hookload and surface torque levels (see, e.g., variables 1530 and 1540 of the system 1500 of FIG. 15), a method can include use of a Gaussian mixture model for classifying states of observed hookload and torque to detect the bit interaction with formation. Such a GMM may be online in that it can process real-time data as may be streamed from equipment at a rigsite (e.g., to a computational framework, located locally or remotely or part locally and part remotely).

Figure 17:
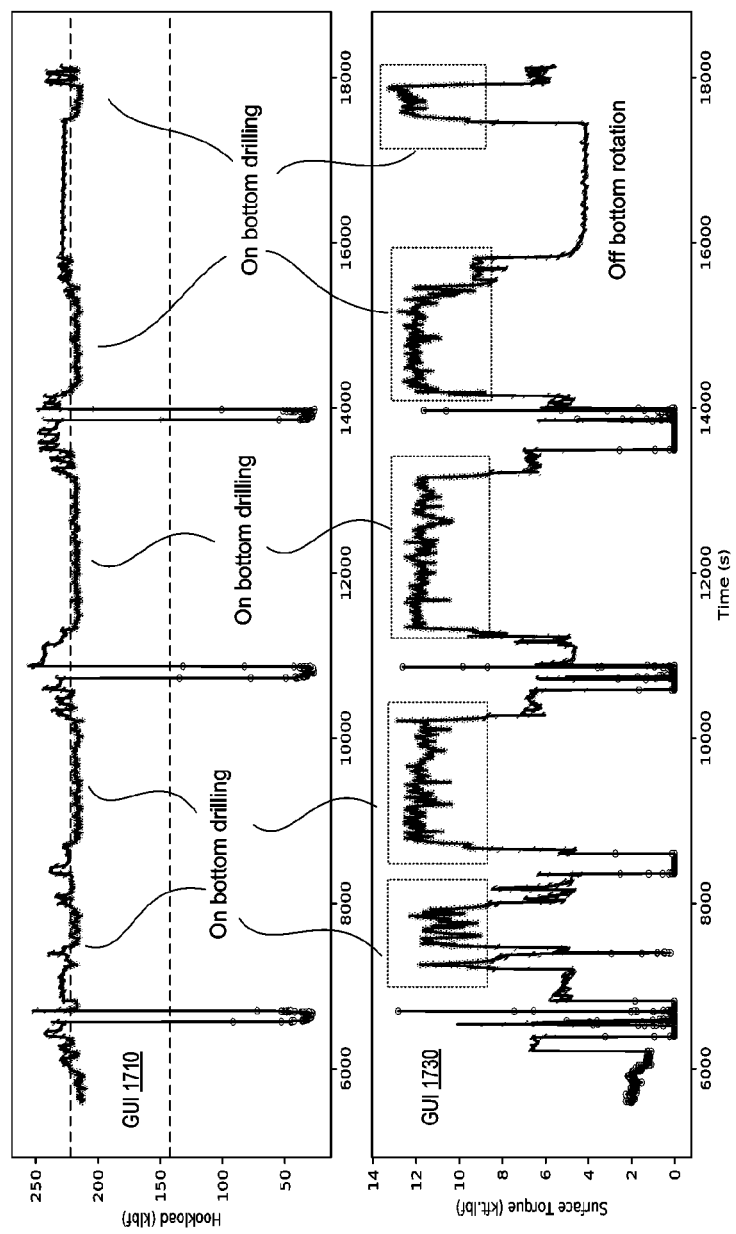
FIG. 17 illustrates examples of graphical user interfaces.

FIG. 17 shows GUIs 1710 and 1730 where indications are included as to on bottom drilling (e.g., On BD). The GUI 1710 can be compared to the information in the GUI 1200 of FIG. 12, which includes identification of two modes as corresponding to two different states that can be evidenced from hookload data. The GUI 1730 can be compared to the GUI 1300 of FIG. 13, which includes the indications of "On BD" as well as "NR".

Specifically, in FIG. 17, hookload data and surface torque data are classified using a GMM approach with three states. As to hookload data of the GUI 1710, the states include open circles that represent in slips, hatched circles without borders that represent off bottom and dotted circles without borders that represent on bottom. As to surface torque data of the GUI 1730, open circles represent no rotation, hatched circles without borders represent off bottom rotating, and dotted circles without borders represent on bottom rotating. Accordingly, a system can include acquiring data from multiple channels, analyzing the data in real-time and assigning a state to the data in real-time. In a GUI rendered to a display, color may be utilized to allow a user to readily view and determine what state or states exist for data from one or more of multiple channels. For example, in the GUIs 1710 and 1730, colors such as purple, green and yellow may be utilized for the three states of each channel.

As illustrated in the GUIs 1710 and 1730, use of a GMM approach to classify states provides acceptable performance. As a GMM is initialized with default parameters, it is possible to start using the GMM even before any learning starts. As a signal evolves over time, parameter learning in a GMM can adapt to the changes and appropriately classify data within a data stream.

As to the types of data in FIG. 17, such data are known to evolve relatively smoothly over time due to underlying physics associated with the actual operations. An abrupt change may be an indication of an operational issue, which may include an issue such as an equipment failure. Sequential learning of a GMM can be used for tracking distributions that evolve; however, where a data stream starts evolving randomly or with large offsets over time, that may be an indication of one or more types of issues.

As to block position trend, probabilities of the block position increasing, decreasing or remaining stationary can be computed with a change detection engine.

Figure 18:
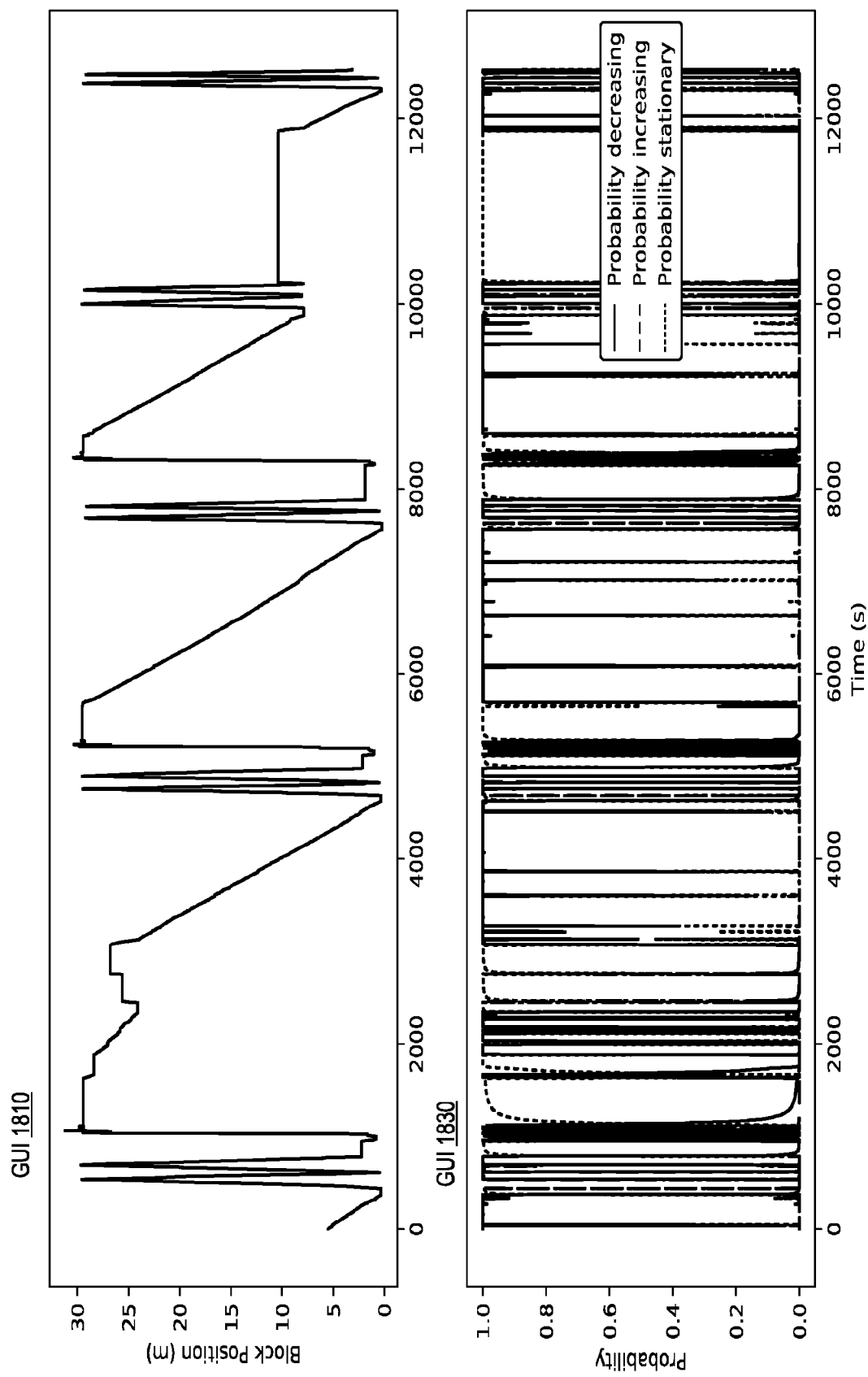
FIG. 18 illustrates examples of graphical user interfaces.

FIG. 18 shows example GUIs 1810 and 1830 for block position (1810) and probability (1830) with respect to time, per the data samples as acquired at a sampling rate of approximately 1 Hz (e.g., one sample per second). The GUIs 1810 and 1830 demonstrate how trend probabilities can be learned and determined from sensor data, for example, streaming block position sensor data. As an example, the information of the GUI 1830 of FIG. 18 may be utilized in the system 1500, for example, at the variable set 1520 for block position trend.

As mentioned, the system 1500 may be a computational framework or include a computational framework that can provide for control of one or more operations at a rigsite. As an example, one or more control signals may be issued responsive to one or more determinations of the system 1500. Such determinations may originate at one or more of 1510, 1520, 1530, 1540 and 1550; noting that the determinations at 1550 can be relevant to operations, particularly where one or more of the bit-rock interaction states is "hidden" (e.g., not amenable to reliable observation). As an example, a control signal may call for control of a drillstring responsive to a determined bit-rock interaction state, which may act to change a measurement of a channel or channels (e.g., block position, hookload, torque, etc.). In such an example, the system 1500 can receive data where such data may allow a user to confirm that an appropriate control effect is realized or being reasonably realized responsive to issuance of the control signal. In such an approach, the system 1500 can provide for control and feedback as to the consequences of issuance of one or more control signals.

Figure 19:
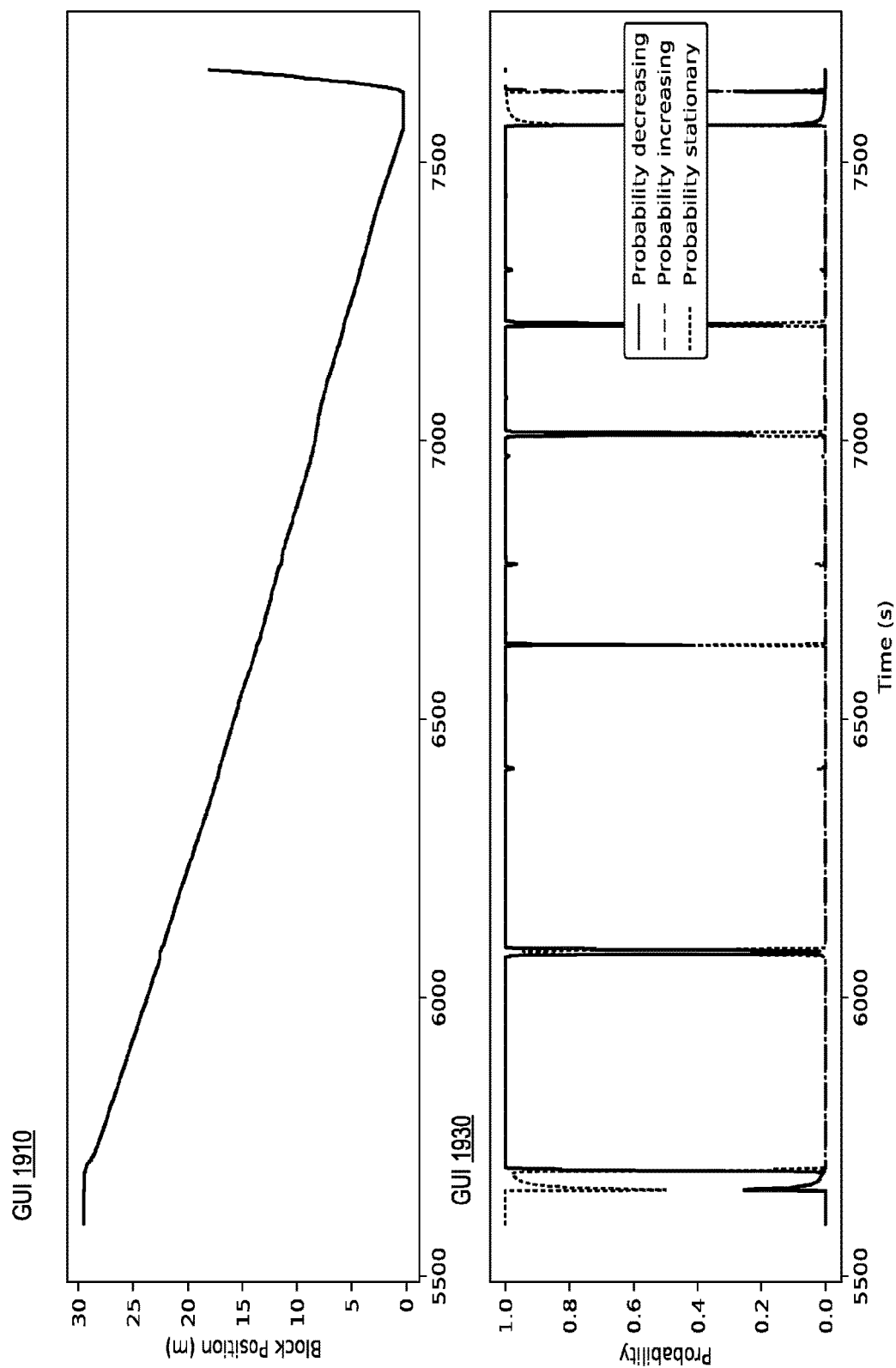
FIG. 19 illustrates examples of graphical user interfaces.

FIG. 19 shows example GUIs 1910 and 1930, which are zoomed-in versions of the GUIs 1810 and 1830 of FIG. 18. Such zooming functionality may be provided such that a user can readily discern the operations being performed and/or assess the functioning of the system 1500 (e.g., or a portion thereof), which may be in real-time. As an example, a display may include a presentation of GUIs such as those of FIG. 18 and a presentation of GUIs such as those of FIG. 19 where the zoomed-in versions of FIG. 19 are for current time so a user can readily see what is happening in real-time over a period of minutes (e.g., how one or more operations may be "trending", etc.).

As to on and off bottom from drillstring movement, the block position can be utilized to track the drillstring movement when not in slips. An initial on bottom instant may be provided externally (e.g., either by a user or inferred from the bit and hole depth measurements as explained with respect to FIG. 11, etc.). In such an example, a measured distance to bottom can then be computed, and transformed into complementary probabilities of being on and off bottom with, for example, a softmax function.

A softmax function can be a normalized exponential function, which can be a generalization of the logistic function that "squashes" a K-dimensional vector z of arbitrary real values to a K-dimensional vector GM of real values, where each entry may be in a defined range such as in the range (0, 1) where the entries add up to unity.

Figure 20:
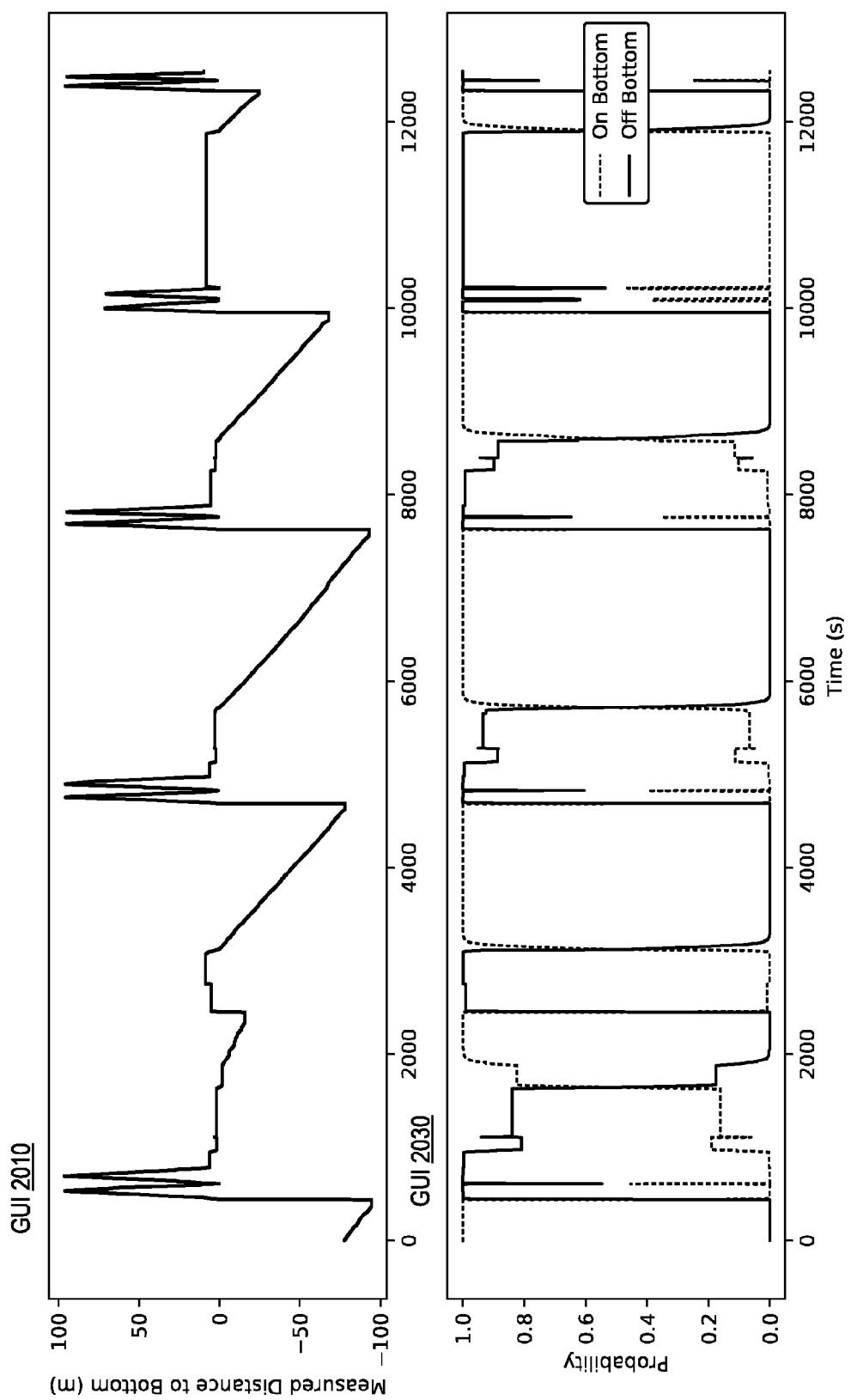
FIG. 20 illustrates examples of graphical user interfaces.

FIG. 20 shows example GUIs 2010 and 2030 of measured distance to bottom (2010) and on and off bottom probabilities derived from measured distance to bottom (2030).

As to bit-rock interaction, as explained with respect to the system 1500 of FIG. 15, corresponding states can be inferred via a Bayesian network that can take various inputs, noting that the arrows in FIG. 15 are shown as indicating physical connections and not necessarily data flow connections. The system 1500 can include nodes (e.g., vertices) as may be present in a BNN.

Various observations can be injected into a Bayesian network that is part of a computational framework for computing probabilities for each of a plurality of bit-rock interaction states.

Figure 21:
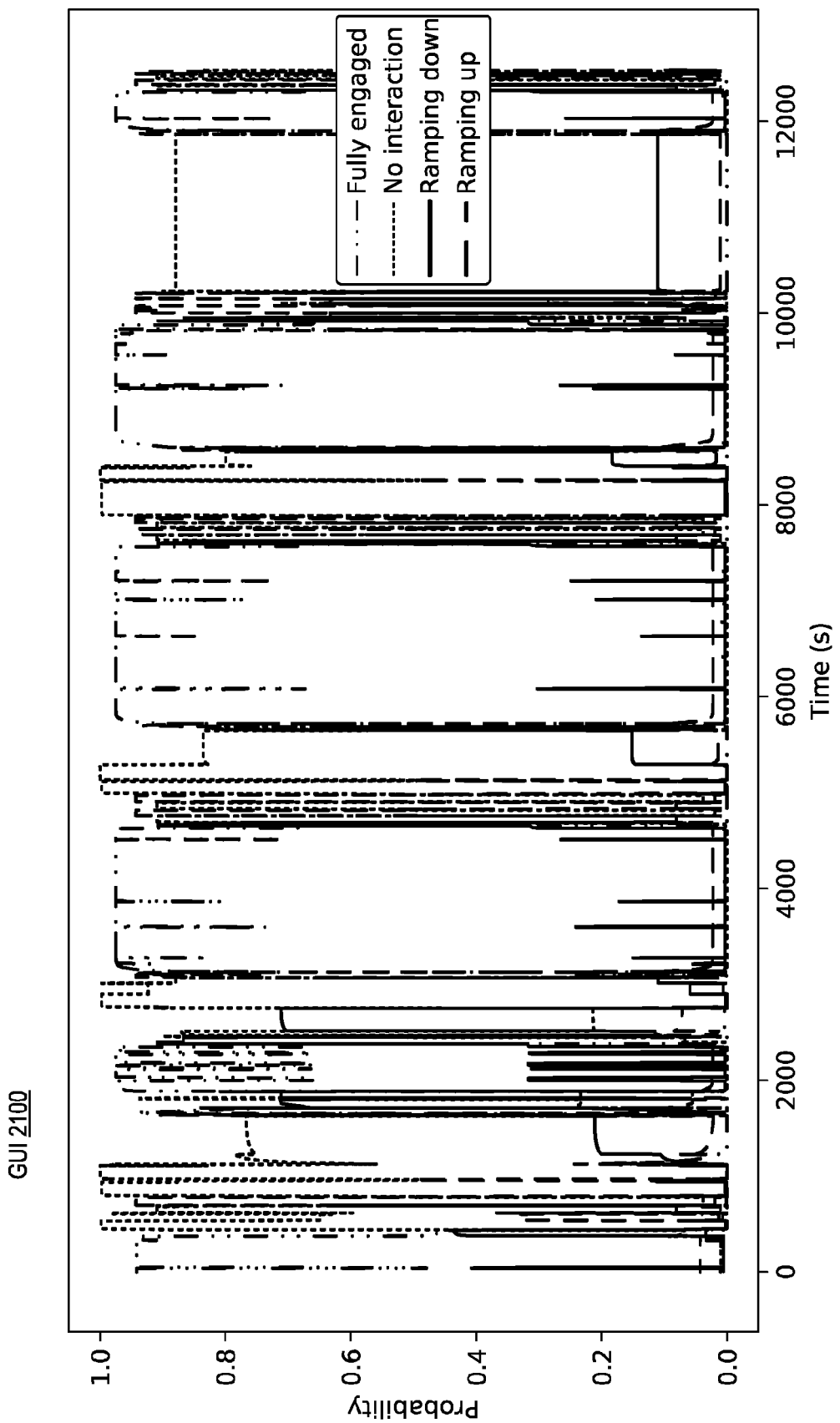
FIG. 21 illustrates an example of a graphical user interface.

FIG. 21 shows an example GUI 2100 of probability versus time where probabilities are plotted for four bit-rock interaction states. Such probabilities can be determined using, for example, one or more GMM classifiers (e.g., as applied to one or more of hookload channel data, torque channel data, etc.) and one or more change detectors (e.g., as applied to one or more of block position channel data, measured distance to bottom channel data/derived data, etc.). For example, information associated with sets 1510 and 1520 can be input via one or more change detectors that output probabilities as to states (e.g., trend states) and information associated with sets 1530 and 1540 can be input via one or more PMMs (e.g., GMMs) that output states (e.g., level states). As mentioned, trend states may be states with conditions that directly affect bit-rock interaction and level states may be states with conditions that are affected by bit-rock interaction.

Figure 22:
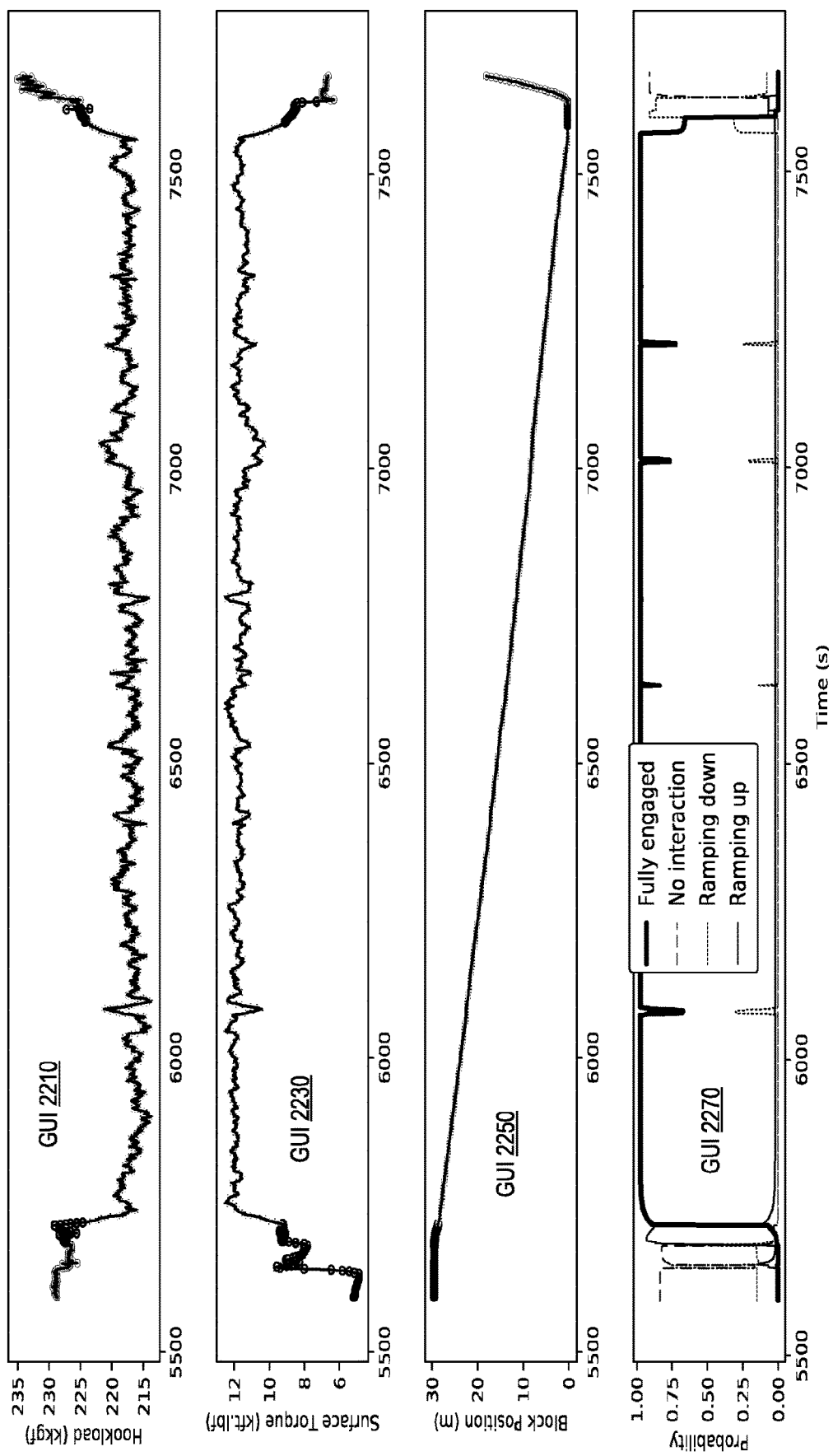
FIG. 22 illustrates examples of graphical user interfaces.

FIG. 22 shows a series of GUIs 2210, 2230, 2250 and 2270 for hookload channel data, surface torque channel data, block position channel data and probability of being in one or more bit-rock interaction states.

The information in FIG. 22 corresponds to a zoomed-in section of hookload, surface torque and block position channels, which may be coded (e.g., via color, etc.) by inferred bit-rock interaction state. For example, consider a color coding scheme with blue: no interaction, red: ramping up, green: fully engaged, purple: ramping down. In FIG. 22, various types of circles are utilized to indicate the different inferred bit-rock interaction states as being plotted as markers over the data. Some circles include borders while others include shading, hatching, etc., without borders. The markers can be utilized to compare across the different types of data to understand how data are changing or not with respect to time with respect to inferred bit-rock interaction state(s).

In FIG. 22, the GUI 2270 includes a legend that indicates fully engaged, no interaction, ramping down and ramping up as, for example, associated with the bit-rock interaction 1550 of the system 1500 of FIG. 15. The GUIs 2210 (hookload), 2230 (surface torque) and 2250 (block position) can be associated with the hookload levels 1530, the surface torque levels 1540 and the block position trend 1520 of the system 1500 of FIG. 15, respectively.

The various trials demonstrate that a GMM can model complex signals with acceptable approximation to real states. Such an approach allows for a clustering of the signal data to infer various underlying states from each channel. Bayesian networks are shown to be suited to perform data fusion among disparate observations where, for example, predominant factors and causality relationships can be captured in the model graph (e.g., in a DAG, etc.). The probabilistic nature of Bayesian networks offers a more balanced, less categorical, answer for a posteriori beliefs. As explained, a system can utilize a "virtual" evidence concept that allows for observations to be continuous in the form of probabilities, which enables a smoother influence on the overall inferred beliefs of the Bayesian network.

As an example, a system can be supplemented with various features. For example, consider a noise filter applied to one or more channels to facilitate clustering with a GMM. As another example, consider one or more rules that may be implemented to discern more complicated hidden states, which might not be readily captured (e.g., at a level sufficient for recognition). For instance, a hookload measurement may tend to drop when the drillstring is lowered in the well, even far from bottom, where there is a presence of friction (hole drag) that acts upon the drillstring. Such a phenomenon may be addressed by one or more rules, which may include data filtering or ignoring data during certain transitions such that behaviors that are not germane directly to bit-rock interactions can be diminished to more reliably generate GMMs (or detection engines) that operate to infer particular bit-rock interaction states. As to a Bayesian network, a method can include tuning as to conditional probabilities right. As an example, tuning may be facilitated from domain knowledge (e.g., manual and/or semi-automated tuning based on knowledge from one or more offset wells, etc.). As an example, a method can include learning one or more of such prior probabilities from historical data and/or ongoing offset well data (e.g., for one or more ongoing operations at one or more other rigsites). For example, in a given field, tuning for one well may be utilized for tuning for another well where the two wells are drilled at least in part in a common formation (e.g., lithology, reservoir, caprock, etc.).

As an example, the system 1500 of FIG. 15 can be implemented to perform a method for determining real-time state inferences of a well construction process. As explained, various observations may be extracted from raw signals in order to generate evidence to be fed into a Bayesian network, with the purpose of estimating a bit-rock interaction state. As explained, a clustering method based on a Gaussian Mixture Model (GMM) can be implemented for a channel or channels, where each channel may have its own GMM.

Figure 23:
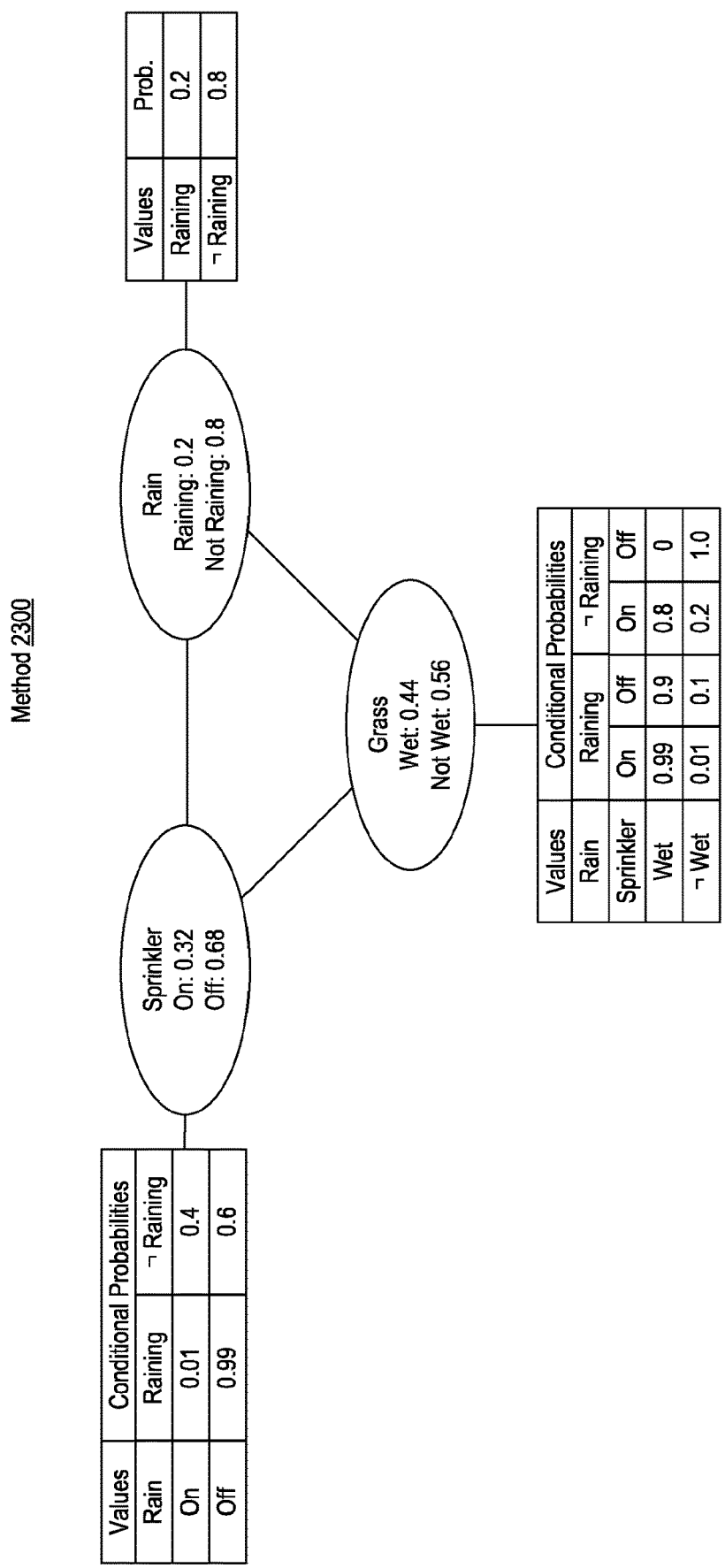
FIG. 23 illustrates an example of a method that includes a Bayesian belief network.
Figure 24:
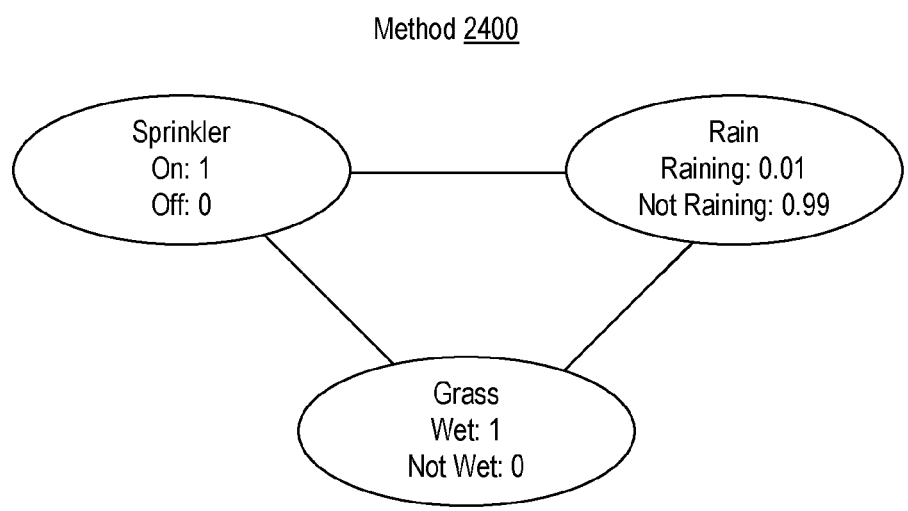
FIG. 24 illustrates an example of a method that includes a Bayesian belief network.

FIGS. 23, 24 and 25 pertain to various examples of methods that include Bayesian belief networks (BBNs). The methods are described with respect to particular scenarios. Bayesian belief networks are suited for representing a domain of interest and combining observations in a probabilistic manner. As mentioned, they can be represented as one or more directed acyclic graphs (DAGs), with nodes corresponding to random variables (observed or not) and edges indicating the influence of nodes to one another.

FIG. 23 shows an example of a method 2300 that includes a BBN, which includes no observations. In FIG. 23, the three random variables are defined as (1) Rain, which represents the current weather, either raining or not; (2) Sprinkler, which represents the state of a garden sprinkler system being on or off; and (3) Grass, which represents the state of the lawn in the garden, wet or not. In the model, edges are defined to model the flow of influence, or causality, between the three variables, where edges are defined as: (1) The edge from Rain to Sprinkler implies that the smart sprinkler system has a capability to receive weather information and turn itself on or off depending on forecasts; (2) The edge from Rain to Grass represents the obvious effect of the rain making the grass wet; (3) The edge from Sprinkler to Grass represents the similar obvious effect the sprinkler system has on the grass getting wet. As shown in FIG. 23, for each node, a table is defined with prior probabilities for each of the node states. If the node is under the influence of one or several other nodes (i.e., an edge pointing towards the node in question), the probabilities are conditioned by the states of the influential node(s).

Based on available data, the state of the random variables (nodes) can be observed or not. If observed, the variable value is set to the corresponding state with a probability of 1. It is also possible to infer the state of unobserved variables, for example, computing the a posteriori probability for each unobserved variable states. This can be achieved by applying Bayes rule across the network.

FIG. 24 shows an example of a method 2400 where both Grass (Wet) and Sprinkler (On) variables are observed. Based on the domain representation and the computed inference, the probabilities of whether it is raining or not have substantially moved towards a strong belief it is not raining (99%).

Furthermore, the case where variables observations are not certain can be handled by adding a node to represent the virtual evidence for the variable in question.

FIG. 25 shows an example of a method 2500 where a node is added to represent virtual evidence with a conditional probability table. Such an approach allows for handling uncertainty of the observation of the sprinkler system state, like a neighbor who would observe the garden from far through a window. This neighbor would have a belief of the sprinkler state based on its true on/off state, without being certain. In such an example, one can see the impact of the uncertainty on the Sprinkler observation, as a slight reduction of the belief that it is not raining (91%).

Virtual evidence can handle observation uncertainty drawn, for example, from one or more noisy sensors, one or more indirect measurements, etc.

As explained, a well construction process automation system can provide for tracking of the state or states of equipment and/or operations with a degree of confidence as to safe and efficient operations. Robust state detection can be performed in a manner to handle uncertain models and data from imperfect sensors. As explained, a system such as the system 1500 of FIG. 15 can provide for practical implementation of well construction state inference, for instance bit interacting with rock and slips status.

As an example, a probabilistic mixture model (PMM) can be learned from a windowed input sensor data stream. For example, consider one or more of surface torque and hook load, which may take into account noise and suitable priors. Such models can be trained (e.g., via learning) and used for online classification of observations related to the underlying state of operations (e.g. on bottom drilling versus off bottom rotating). A system can include features for determining multiple classified observables from different types of measurements where, for example, such classified observables can be fused into states using a temporal Bayesian network that provide for robust state detection under uncertainty. Such a system can operate via drilling mechanics knowledge as to interpretation of classification and configuration and/or tuning of a Bayesian network model.

As to types of sensor data, examples can include hookload, surface torque, stand-pipe pressure, block position, etc. Various examples can provide for the inference of elementary states such as, for example, slips status (e.g., in/out of slips), and bit interaction with rock (e.g., no interaction, bit fully engaged with formation, in transition).

The use of input data to continuously learn a PMM can allow for the tracking of levels. As mentioned, hookload can be modeled as the mixture of several distributions evolving as the well progresses via various well construction operations where hookload may be correlated to the drill string being in slips, out of slips off bottom, or on bottom rotating.

In an example, clustering using hookload (HKLD) sensor data can involve using a GMM with a three hour moving window and four clusters. In a trial example, a cluster was identified at approximately 50 klbf related to a hookload level when a drillstring is in slips, and additional clusters with identified centers between approximately 150 klbf and 250 klbf, interpreted as being on bottom drilling and off bottom.

Observations inferred from one or more mixture models can have various levels of confidence. A system that utilizes a Bayesian network can allow for their fusion into a robust system state. For example, different observations can be made when going on bottom, whether in rotary or slide drilling mode.

Figure 26:
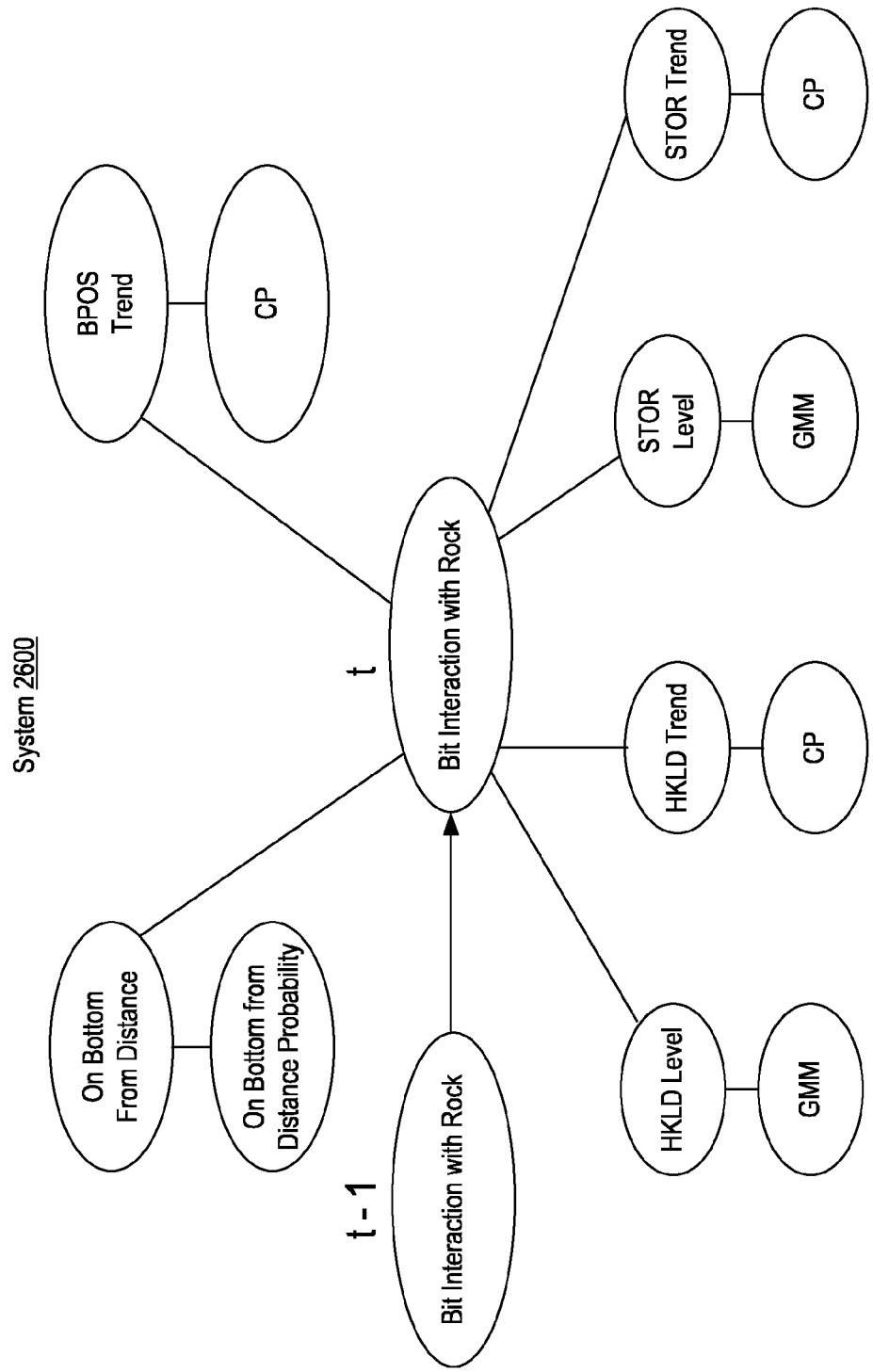
FIG. 26 illustrates an example of a system.

FIG. 26 shows an example of a system 2600 that includes a Bayesian network that can combine observations drawn from sensor data such as sensor data that includes HKLD and STOR sensor data, as well as, for example, data as to block movements, estimated distance to bottom of hole and state (e.g., at a previous timestamp or previous timestamps).

As an example, a system can be implemented using one or more processors and memory accessible thereto where the system includes one or more interfaces that are operatively coupled to one or more transmission media (e.g., wire, wireless, etc.) for acquiring sensor data. As an example, such a system can be operatively coupled to one or more display such that information can be rendered thereto (e.g., one or more GUIs, etc.). As an example, a system can include one or more input devices or input mechanisms (e.g., touchscreen, stylus, mouse, trackball, voice via microphone, etc.). As an example, a user may interact with a GUI or GUIs via one or more of such input devices and/or input mechanisms. As an example, a system can include an interface or interfaces that can transmit signals (e.g., commands, instructions, etc.) to equipment such as field equipment that can include rigsite equipment that can cause the equipment or a piece thereof to operate in a particular manner (e.g., to perform an action, alter an action, halt an action, etc.). As an example, a system can be implemented in a drilling operation where the system can be a control system that acts to control one or more actions associated with drilling. In such an example, the system can include a Bayesian network backed by mixture model where the system operates in real-time, adaptively, to detect one or more system states from drilling time series, which can include complex temporally correlated patterns.

Figure 27:
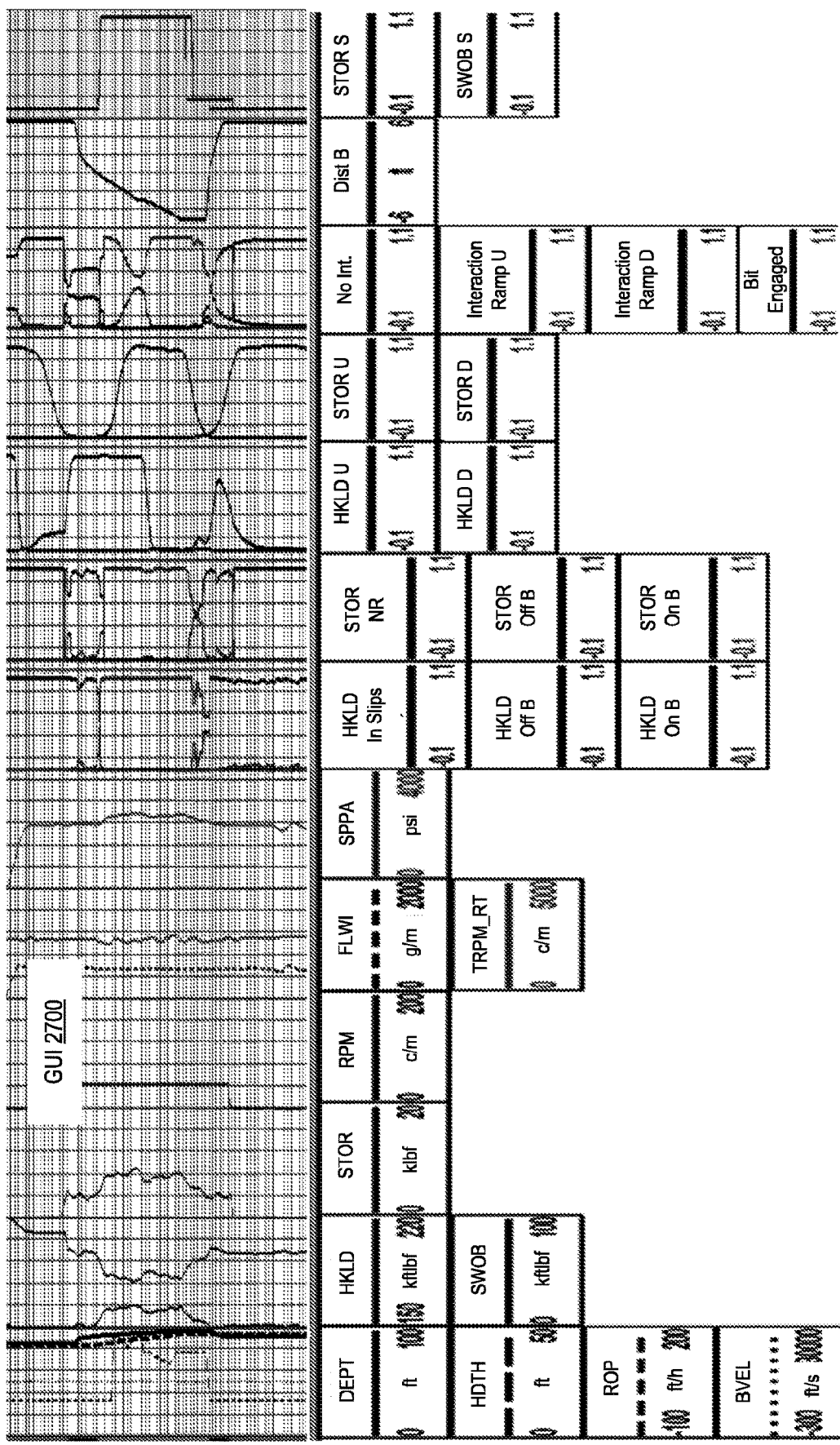
FIG. 27 illustrates an example of a graphical user interface.

FIG. 27 an example GUI 2700 that shows various types of data that may be utilized, as acquired during one or more drilling operations. Such data can include, for example, one or more of HKLD data, STOR data, etc. As shown, information may be organized with respect to such data for output to a display, for example, as probabilities that data belong to a HKLD cluster, a STOR cluster, etc., and/or as probabilities for an underlying model on HKLD to be increasing as well as decreasing (e.g., as well as for STOR) and/or as probabilities of each bit interaction with rock state after fusion of observables.

By learning from data and, for example, using priors from domain experts, a system can perform inference in a manner that operates optionally without user tuned thresholds or parameters. A probabilistic Bayesian approach can provides a framework for dealing with uncertainty in drilling systems and can optionally be extended with additional observations drawn from one or more other measurements (e.g., new measurements, existing measurements, periodic measurements, etc.).

Figure 28:
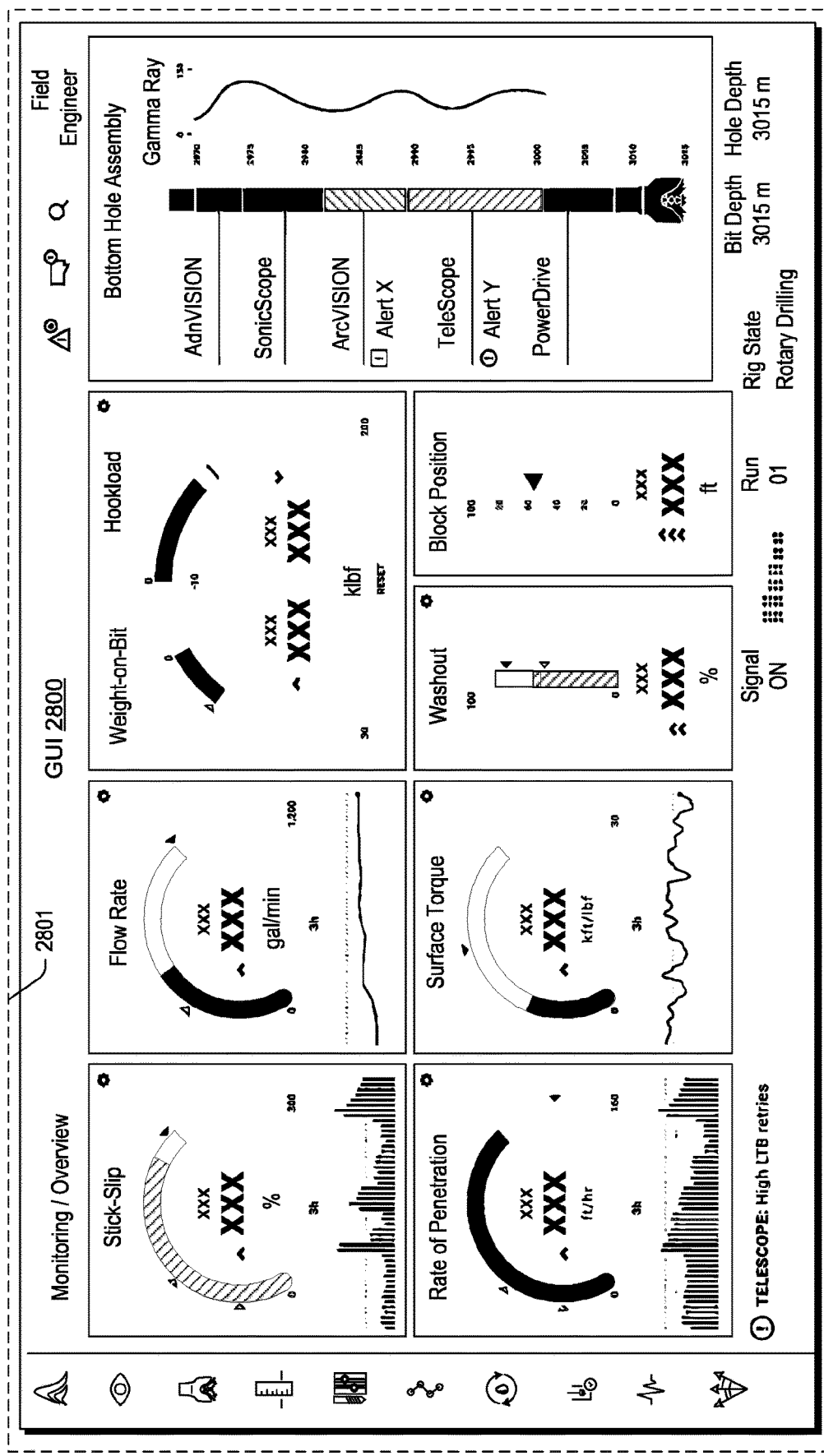
FIG. 28 illustrates an example of a graphical user interface.

FIG. 28 shows an example of a GUI 2800 that is rendered to a display 2801, as represented by a dashed line. As shown, the GUI 2800 can include various types of information as based on various types of data. For example, weight on bit (WOB) and hookload (HKLD) information can be rendered, block position (BPOS), surface torque (STOR), flow rate, rate of penetration (ROP), stick-slip, etc. As shown, a graphic of a portion of a drillstring that includes a bit can be rendered, along with, for example, information such as bit depth and hole depth. As shown, the GUI 2800 includes information as to rig state, which is indicated to be "rotary drilling", which can be a state for which the bit is engaged with rock at the bottom of a borehole. As an example, the system 1500 of FIG. 15 or the system 2600 of FIG. 26 can be utilized to output an inference, which may be an inference as to a relationship between a bit and rock. In such an example, a GUI such as the GUI 2800 may render to a display information as to the inference. For example, consider the rig state field being a state that is an inferred state as output by the system 1500 of FIG. 15, the system 2600 of FIG. 26 or a method such as the method 1000 of FIG. 10.

As an example, modes and/or trends may be rendered. For example, consider a mode rendered proximate to the hookload information, a mode rendered next to the surface torque information, and/or a trend rendered proximate to the block position information. As an example, the GUI 2800 can include one or more graphical controls that allow for interaction therewith to, for example, cause the rendering of a GUI such as the GUI 1200 of FIG. 12, which shows modes identified via learning for a GMM. In such an example, a user may click on the hookload window and cause the rendering of one or more of the plots shown in the GUI 1200 of FIG. 12. In such an approach, a user may see what modes are being recognized (e.g., learned) from the data and utilized by a GMM analysis of the data in a process that can infer a relationship between a bit and rock. Such an approach may provide a user with some degree of confidence that a system such as the system 1500 of FIG. 15 is operating properly.

As another example, consider a block position graphical control that is proximate to the block position window and selectable by a user interaction therewith to cause rendering of a detection engine's output such as that of the GUI 1400 of FIG. 14. In such an example, a user can assess how the detection engine is operating with respect to probabilities of one or more trends. Such an approach may provide a user with some degree of confidence that a system such as the system 1500 of FIG. 15 is operating properly.

As an example, a method can include acquiring data during rig operations where the rig operations include operations that utilize a bit to drill rock and where the data include different types of data; analyzing the data utilizing a probabilistic mixture model for modes, a detection engine for trends and a network model for an inference based at least in part on at least one of a mode and a trend; and outputting information as to the inference where the inference characterizes a relationship between the bit and the rock. In such an example, the probabilistic mixture model can be or include a Gaussian mixture model. For example, consider a Gaussian mixture model that includes multiple modes where each of the modes represents an operational state of the rig operations.

As an example, outputting information as to an inference can include rendering information to a display, which may be in the form of a GUI. For example, a coded plot may be rendered that indicates a relationship between bit and rock where the relationship is an inferred relationship. In such an example, one or more types of information may be rendered, which may include information as in one or more of the GUIs described herein. As an example, consider the GUIs 2210, 2230, 2250 and 2270 of FIG. 22 where the GUI 2270 includes information as to relationships between a bit and rock (e.g., fully engaged, no interaction, ramping down and ramping up). In the examples of FIG. 22, coding may be utilized with respect to one or more of the inferences, the hookload, the surface torque and the block position (e.g., with respect to time). Such an approach can allow a user (e.g., a driller) to understand operations. As an example, the GUI 2270 can be associated with one or more control mechanisms that can issue one or more control signals to one or more pieces of equipment at a rigsite. Such an approach may help to improve drilling as to, for example, one or more of rate of penetration (ROP), longevity of downhole equipment, and reduction of non-productive time (NPT). Such an approach may help to reduce tripping (e.g., tripping out to replace a piece of equipment on a drillstring such as a bit, etc.).

As an example, a detection engine can output a probability of an operational trend of rig operations (e.g., operations with respect to time). For example, consider data that include block position data for a block of a rig performing rig operations and where the operational trend includes a block position trend of the block of the rig. In such an example, the block position trend can be a member selected from a group that includes decreasing block position and increasing block position.

As an example, data can include hookload data and a probabilistic mixture model can include modes that include an on bottom mode and an off bottom mode.

As an example, data can include torque data and a probabilistic mixture model can include modes that include an off bottom rotating mode and an on bottom rotating mode.

As an example, an inference can be an inference selected from a group that includes a bit being engaged with rock at a bottom of a borehole and the bit having no interaction with the rock at the bottom of the borehole.

As an example, a method can include issuing a control signal based at least in part on an inference. For example, issuing can issue the control signal to equipment at a rigsite where rig operations are being performed. As an example, a method can include controlling at least one piece of equipment to perform at least one of a plurality of rig operations based at least in part on an issued control signal that is based at least in part on an inference.

As an example, a method can include acquiring data in real-time and outputting information in near real-time (e.g., accounting for computational delay and/or other electronic delays, which may be of the order of ten minutes or less). In such an example, a method can include controlling at least one of a plurality of rig operations based at least in part on the information and acquiring additional data that includes information responsive to the controlling. In such an example, a controller or control system can effectuate a control loop, where the control loop involves use of one or more PMMs and one or more BNNs and, for example, one or more detection engines.

As an example, a system can include a processor; memory accessible to the processor; processor-executable instructions stored in the memory and executable by the processor to instruct the system to: acquire data during rig operations where the rig operations include operations that utilize a bit to drill rock and where the data include different types of data; analyze the data utilizing a probabilistic mixture model for modes, a detection engine for trends and a network model for an inference based at least in part on at least one of a mode and a trend; and output information as to the inference where the inference characterizes a relationship between the bit and the rock. In such an example, the probabilistic mixture model (PMM) can be or include a Gaussian mixture model (GMM). In such a system, as an example, a detection engine can output a probability of an operational trend of the rig operations.

As an example, one or more computer-readable storage media can include computer-executable instructions, executable to instruct a computer to: acquire data during rig operations where the rig operations include operations that utilize a bit to drill rock and where the data include different types of data; analyze the data utilizing a probabilistic mixture model for modes, a detection engine for trends and a network model for an inference based at least in part on at least one of a mode and a trend; and output information as to the inference where the inference characterizes a relationship between the bit and the rock. In such an example, the probabilistic mixture model (PMM) can be or include a Gaussian mixture model (GMM). As an example, a detection engine can output a probability of an operational trend of rig operations (e.g., with respect to time).

Figure 29:
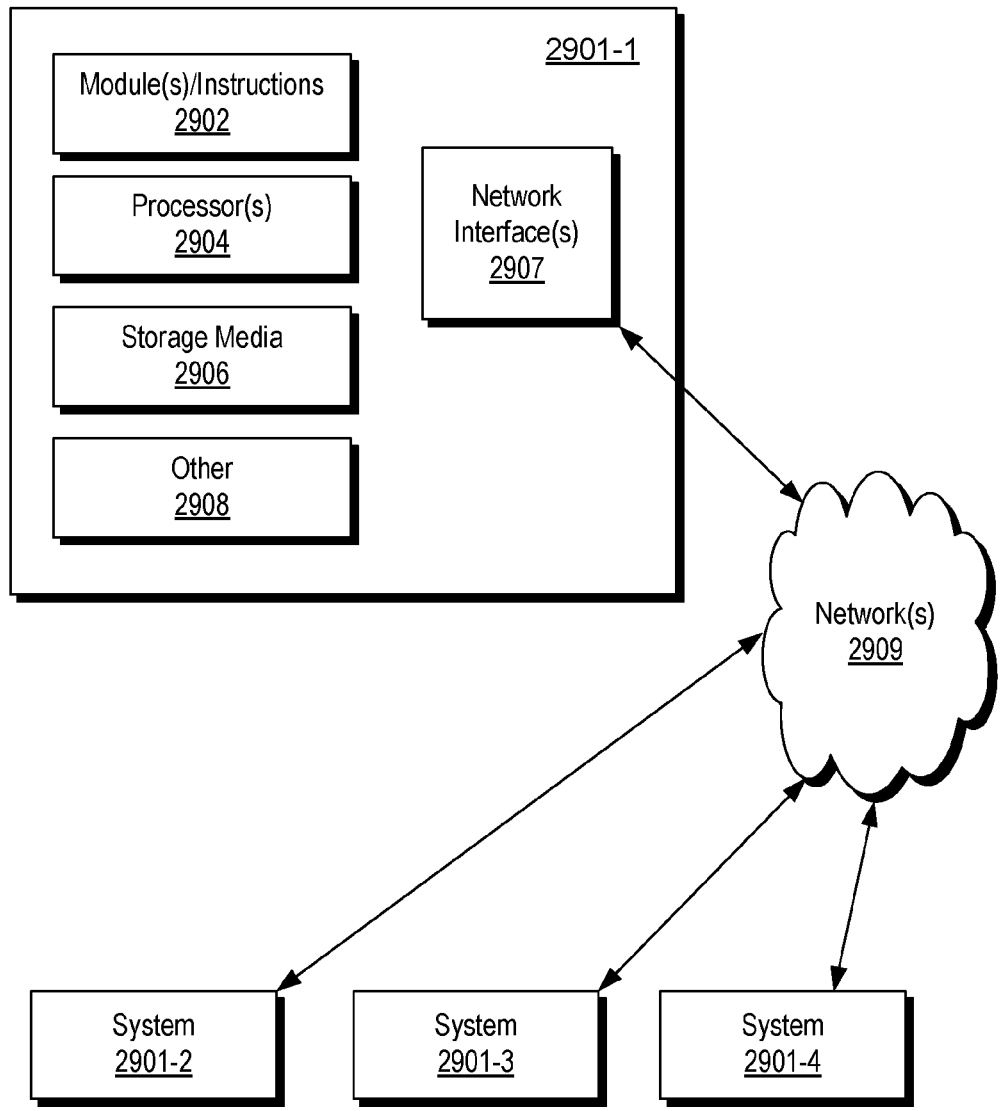
FIG. 29 illustrates examples of computing and networking equipment.

In some embodiments, a method or methods may be executed by a computing system. FIG. 29 shows an example of a system 2900 that can include one or more computing systems 2901-1, 2901-2, 2901-3 and 2901-4, which may be operatively coupled via one or more networks 2909, which may include wired and/or wireless networks.

As an example, a system can include an individual computer system or an arrangement of distributed computer systems. In the example of FIG. 29, the computer system 2901-1 can include one or more modules 2902, which may be or include processor-executable instructions, for example, executable to perform various tasks (e.g., receiving information, requesting information, processing information, simulation, outputting information, etc.).

As an example, a module may be executed independently, or in coordination with, one or more processors 2904, which is (or are) operatively coupled to one or more storage media 2906 (e.g., via wire, wirelessly, etc.). As an example, one or more of the one or more processors 2904 can be operatively coupled to at least one of one or more network interface 2907. In such an example, the computer system 2901-1 can transmit and/or receive information, for example, via the one or more networks 2909 (e.g., consider one or more of the Internet, a private network, a cellular network, a satellite network, etc.).

As an example, the computer system 2901-1 may receive from and/or transmit information to one or more other devices, which may be or include, for example, one or more of the computer systems 2901-2, etc. A device may be located in a physical location that differs from that of the computer system 2901-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 2906 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 30:
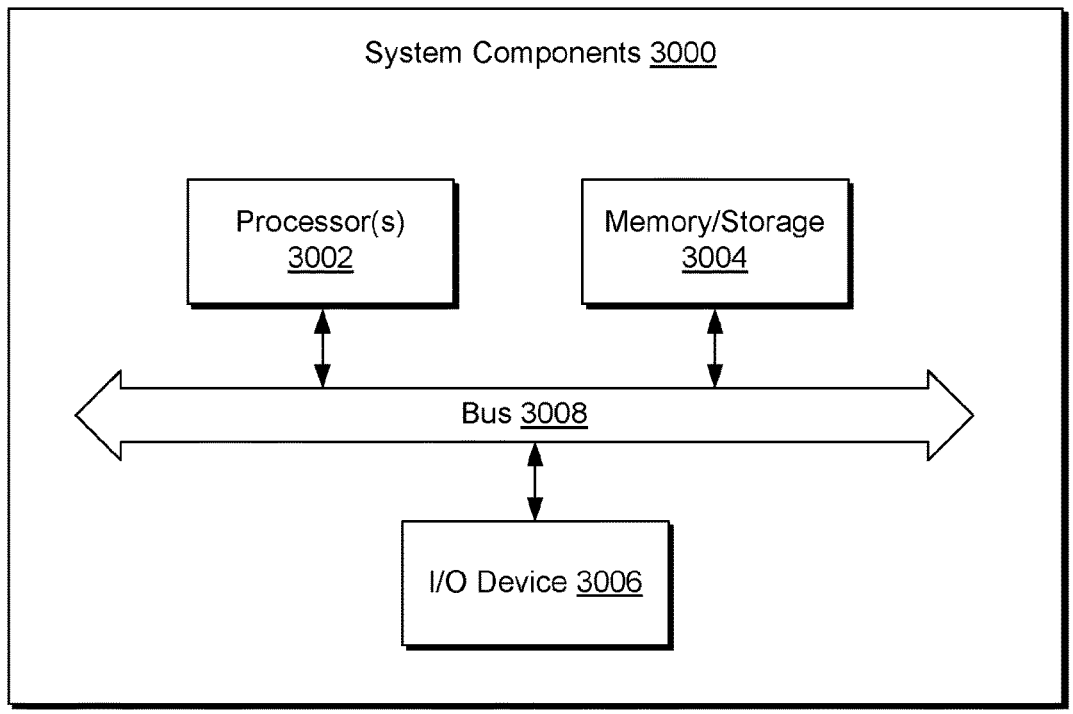
FIG. 30 illustrates example components of a system and a networked system.
Figure 30:
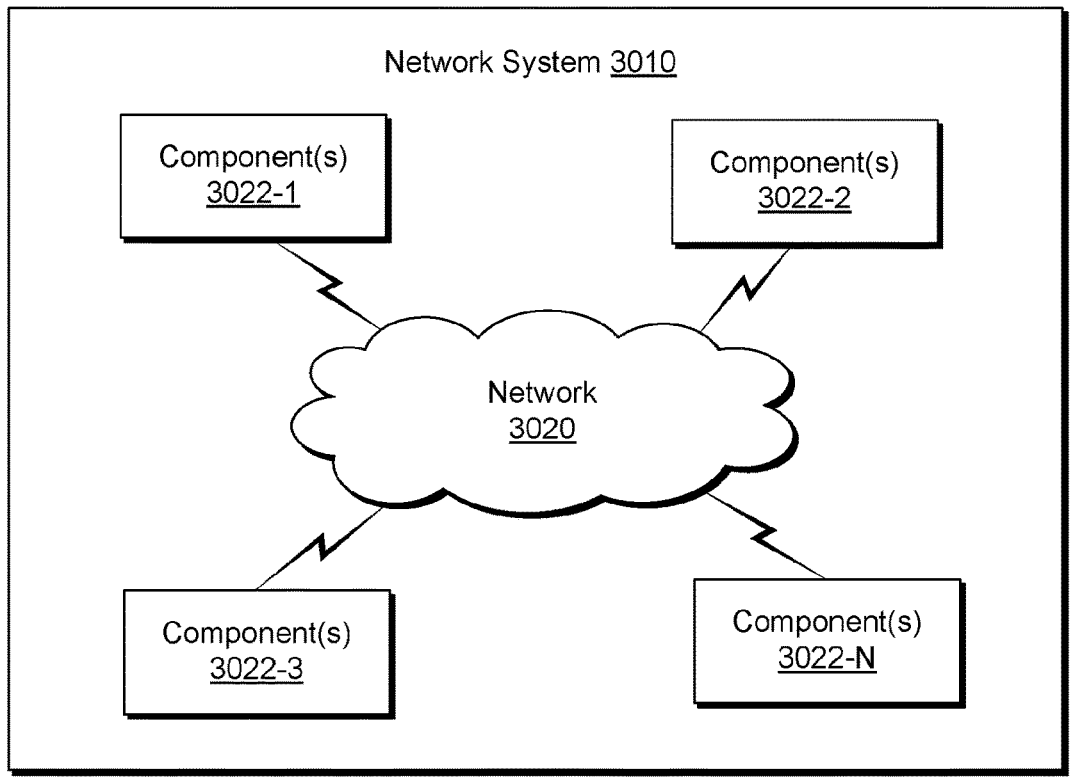

FIG. 30 shows components of a computing system 3000 and a networked system 3010. The system 3000 includes one or more processors 3002, memory and/or storage components 3004, one or more input and/or output devices 3006 and a bus 3008. According to an embodiment, instructions may be stored in one or more computer-readable storage media (e.g., memory/storage components 3004). Such instructions may be read by one or more processors (e.g., the processor(s) 3002) via a communication bus (e.g., the bus 3008), which may be wired or wireless. The one or more processors may execute such instructions to implement (wholly or in part) one or more attributes (e.g., as part of a method). A user may view output from (e.g., via a display) and interact with a process via an I/O device (e.g., the device 3006). According to an embodiment, a computer-readable storage medium may be a storage component such as a physical memory storage device, for example, a chip, a chip on a package, a memory card, etc.

According to an embodiment, components may be distributed, such as in the network system 3010. The network system 3010 includes a network 3020 and components 3022-1, 3022-2, 3022-3, . . . 3022-N. For example, the components 3022-1 may include the processor(s) 3002 while the component(s) 3022-3 may include memory accessible by the processor(s) 3002. Further, the component(s) 3022-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words "means for" together with an associated function.

The invention claimed is:

1. A method comprising:
acquiring data during rig operations wherein the rig operations comprise operations that utilize a bit to drill rock and wherein the data comprise different types of data;
analyzing the data utilizing a probabilistic mixture model for modes represented as clusters, a detection engine for trends and a network model for an inference based at least in part on at least one of a mode and a trend, wherein the probabilistic mixture model predicts cluster membership and evolves cluster parameters with respect to time using at least a portion of the data; and
outputting information as to the inference wherein the inference characterizes a relationship between the bit and the rock.

2. The method of claim 1 wherein the probabilistic mixture model comprises a Gaussian mixture model.

3. The method of claim 2 wherein the Gaussian mixture model comprises multiple modes wherein each of the modes represents an operational state of the rig operations.

4. The method of claim 1 wherein the detection engine outputs a probability of an operational trend of the rig operations.

5. The method of claim 4 wherein the data comprise block position data for a block of a rig performing the rig operations and wherein the operational trend comprises a block position trend of the block of the rig.

6. The method of claim 5 wherein the block position trend comprises a member selected from a group that comprises decreasing block position and increasing block position.

7. The method of claim 1 wherein the data comprise hookload data of a hookload data channel and wherein the probabilistic mixture model is a hookload data channel probabilistic mixture model that predicts cluster membership by utilizing conditional probability to determine whether each hookload data point of the hookload data belongs to one of the modes wherein the modes comprise an on bottom mode represented as an on bottom cluster and an off bottom mode represented as an off bottom cluster.

8. The method of claim 1 wherein the data comprise torque data of a torque data channel and wherein the probabilistic mixture model is a torque data channel probabilistic mixture model that predicts cluster membership by utilizing conditional probability to determine whether each torque data point of the torque data belongs to one of the modes wherein the modes comprise an off bottom rotating mode represented as an off bottom rotating cluster and an on bottom rotating mode represented as an on bottom rotating cluster.

9. The method of claim 1 wherein the inference comprises an inference selected from a group that comprises the bit being engaged with the rock at a bottom of a borehole and the bit having no interaction with the rock at the bottom of the borehole.

10. The method of claim 1 comprising issuing a control signal based at least in part on the inference.

11. The method of claim 10, wherein the issuing issues the control signal to equipment at a rigsite where the rig operations are being performed.

12. The method of claim 1 comprising acquiring the data in real-time and outputting the information in near real-time.

13. The method of claim 12 comprising controlling at least one of the rig operations based at least in part on the information and acquiring additional data that comprises information responsive to the controlling.

14. The method of claim 1, comprising providing the probabilistic mixture model as a trained probabilistic mixture model that comprises initial cluster parameters, wherein the evolved cluster parameters account for cluster parameter changes in one or more of number of clusters, cluster mean, cluster variance and cluster weight.

15. A system comprising:
a processor;
memory accessible to the processor;
processor-executable instructions stored in the memory and executable by the processor to instruct the system to:
acquire data during rig operations wherein the rig operations comprise operations that utilize a bit to drill rock and wherein the data comprise different types of data;
analyze the data utilizing a probabilistic mixture model for modes represented as clusters, a detection engine for trends and a network model for an inference based at least in part on at least one of a mode and a trend, wherein the probabilistic mixture model predicts cluster membership and evolves cluster parameters with respect to time using at least a portion of the data; and
output information as to the inference wherein the inference characterizes a relationship between the bit and the rock.

16. A non-transitory computer-readable storage medium comprising a plurality of computer-readable instructions for:
acquiring data during rig operations wherein the rig operations comprise operations that utilize a bit to drill rock and wherein the data comprise different types of data;
analyzing the data utilizing a probabilistic mixture model for modes represented as clusters, a detection engine for trends and a network model for an inference based at least in part on at least one of a mode and a trend, wherein the probabilistic mixture model predicts cluster membership and evolves cluster parameters with respect to time using at least a portion of the data; and
outputting information as to the inference wherein the inference characterizes a relationship between the bit and the rock.

17. The non-transitory computer-readable medium of claim 16, wherein the inference comprises an inference selected from a group that comprises the bit being engaged with the rock at a bottom of a borehole and the bit having no interaction with the rock at the bottom of the borehole.

18. The non-transitory computer-readable medium of claim 16, comprising issuing a control signal based at least in part on the inference.

19. The non-transitory computer-readable medium of claim 18, wherein the issuing issues the control signal to equipment at a rigsite where the rig operations are being performed.

20. The non-transitory computer-readable medium of claim 16, comprising acquiring the data in real-time and outputting the information in near real-time.

* * * * *